Dec. 22, 1959 T. B. KEESLING 2,918,098
FRUIT ORIENTATOR, SPLITTER AND PITTER
Filed March 3, 1953 45 Sheets-Sheet 2
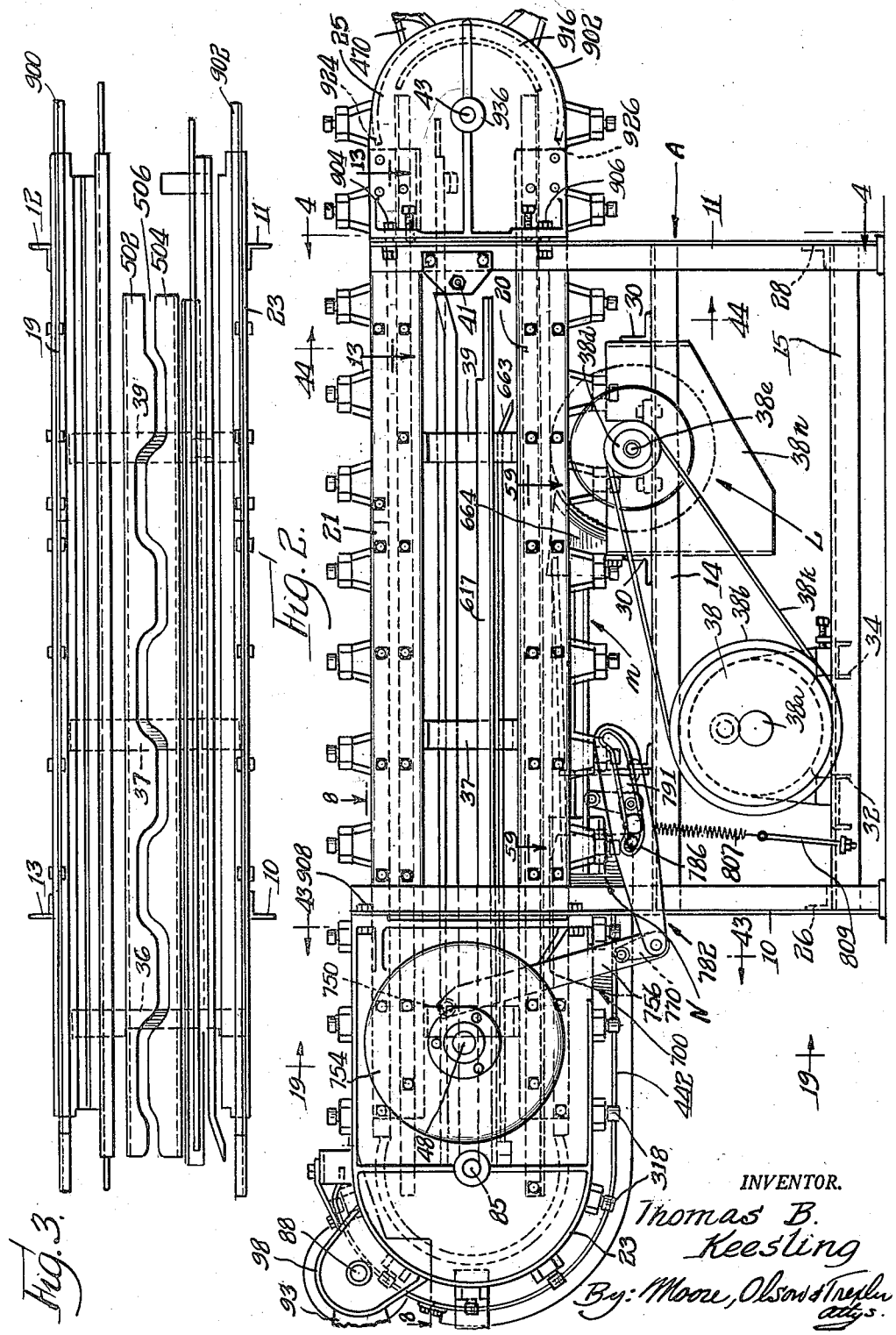
INVENTOR.
Thomas B. Keesling
By: Moore, Olson & Trexler
attys.

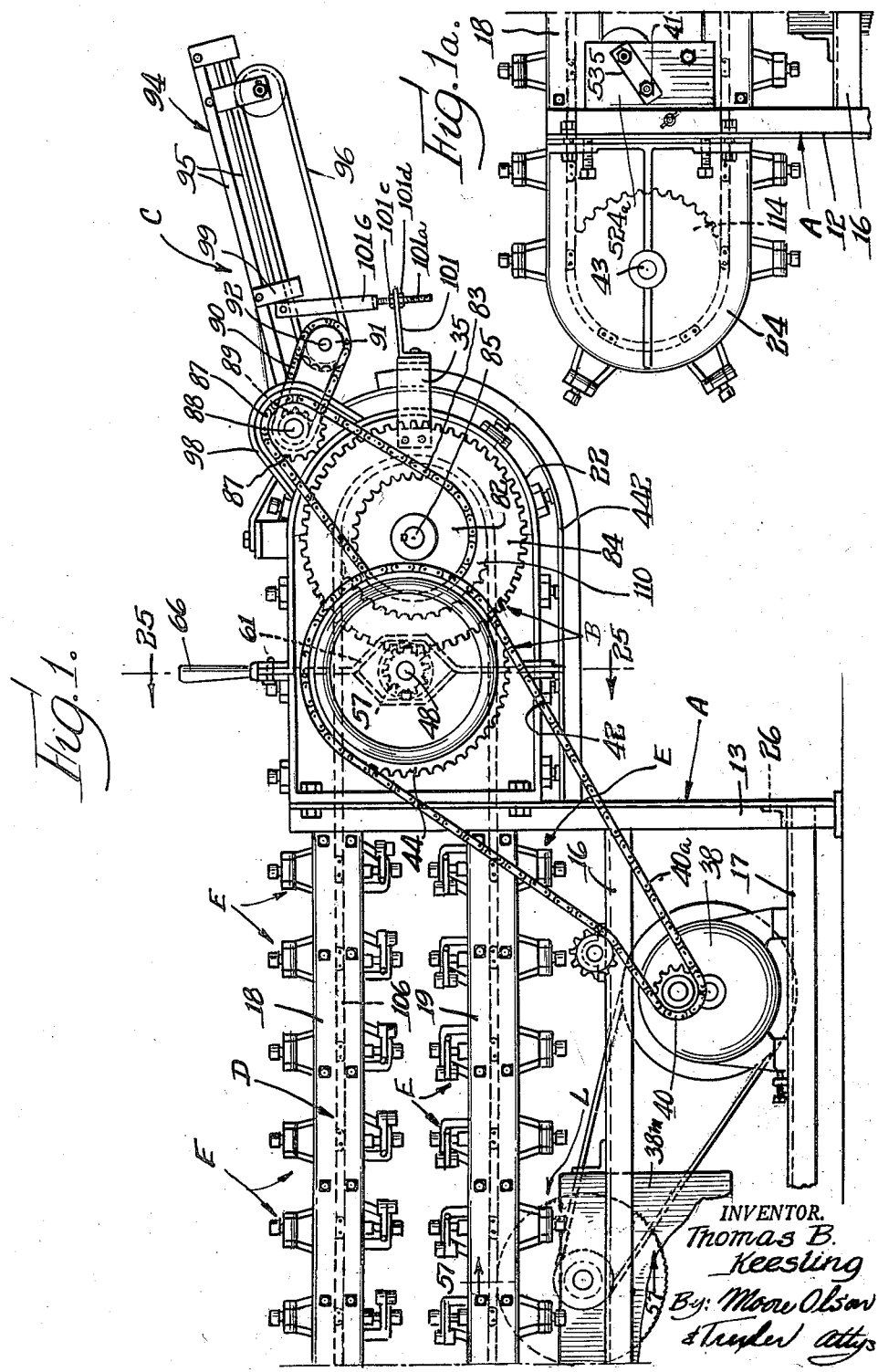

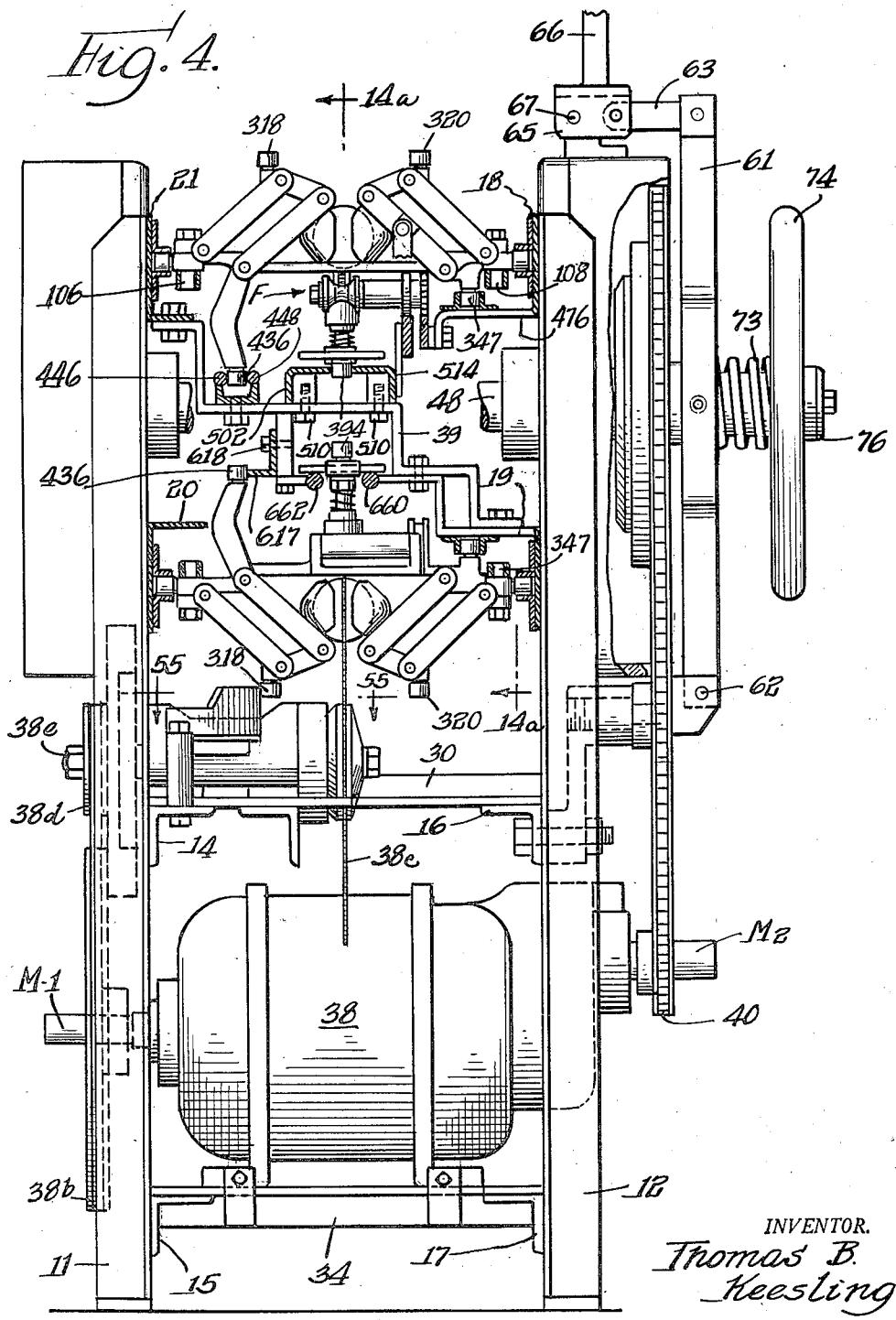

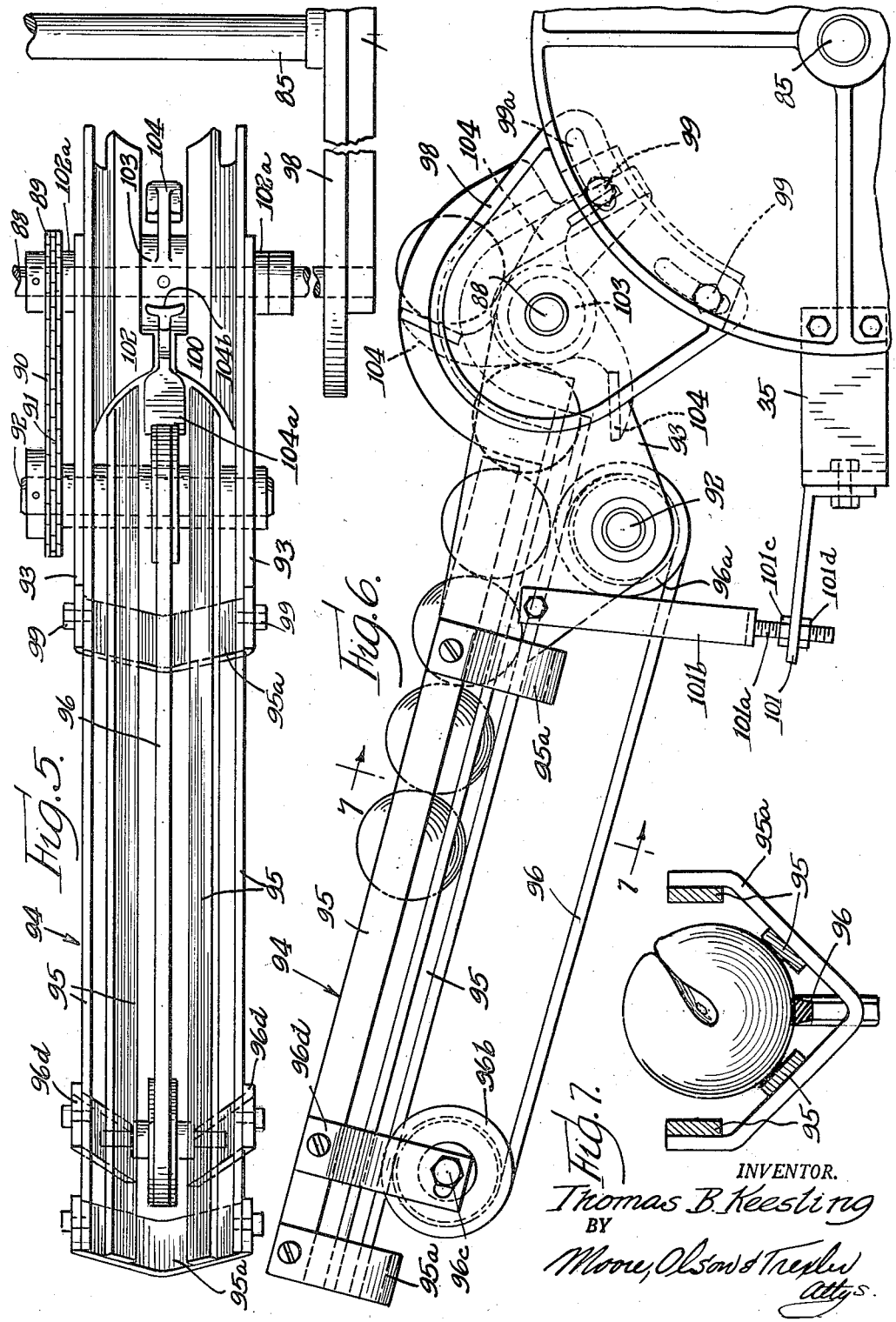

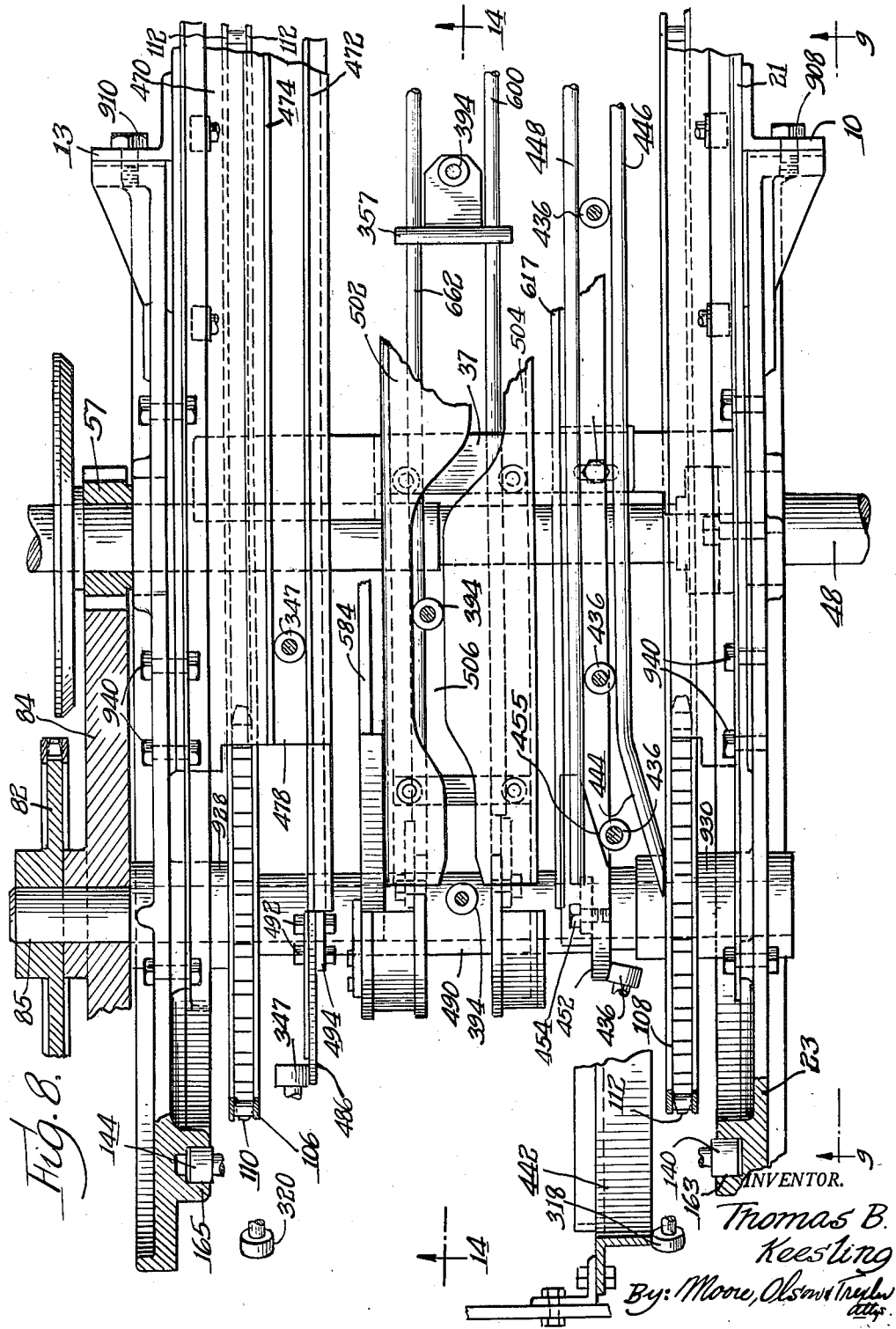

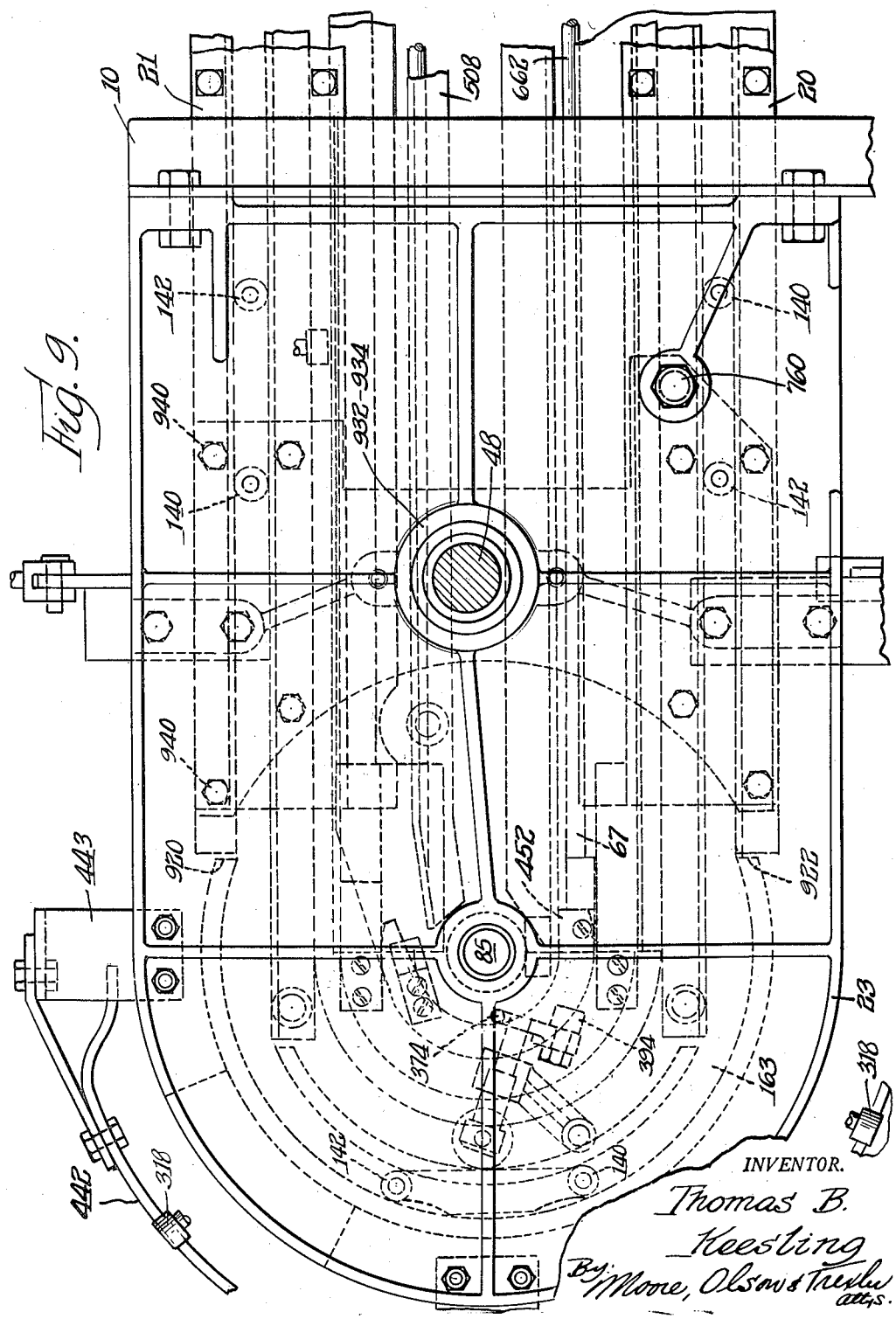

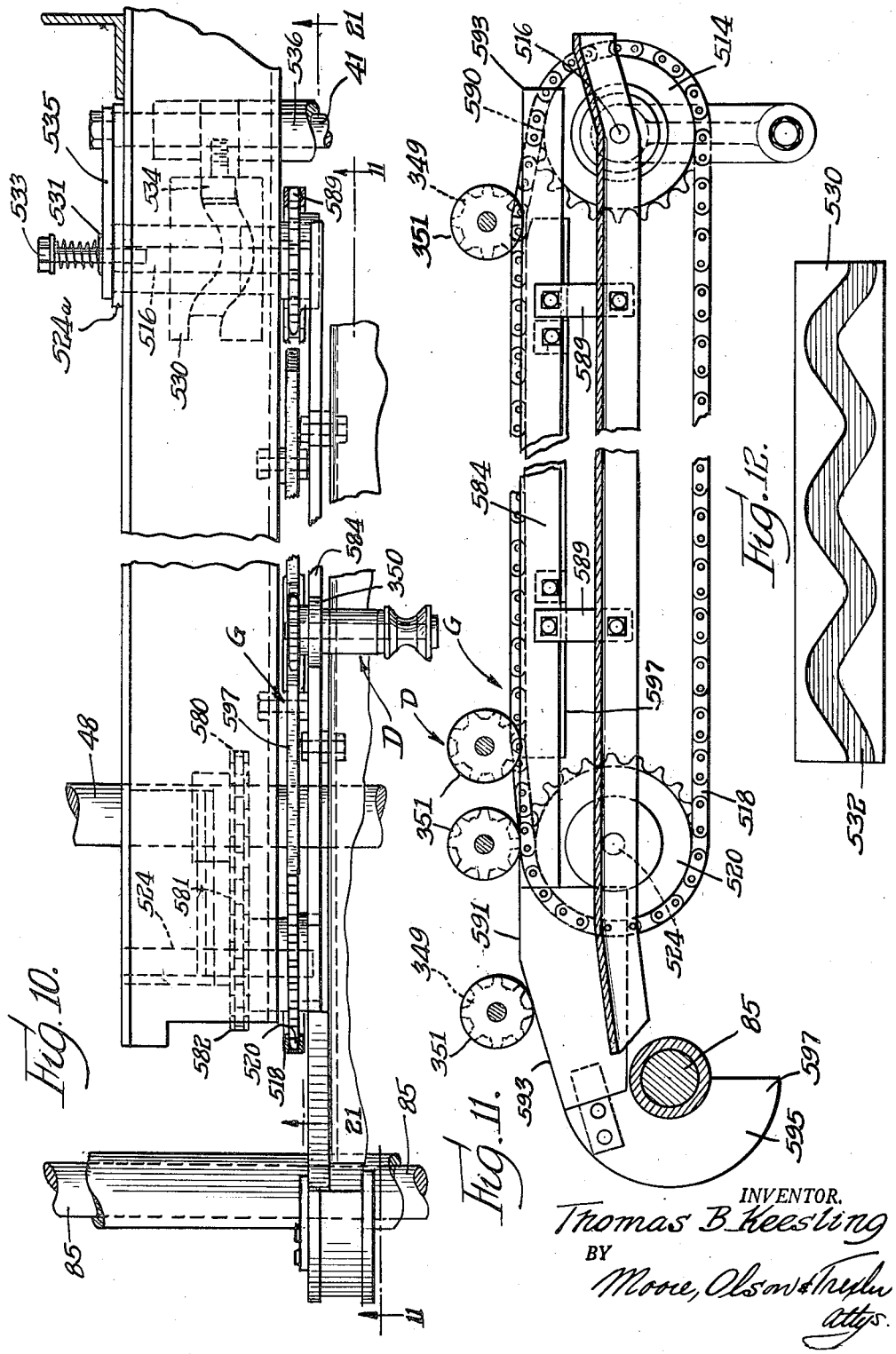

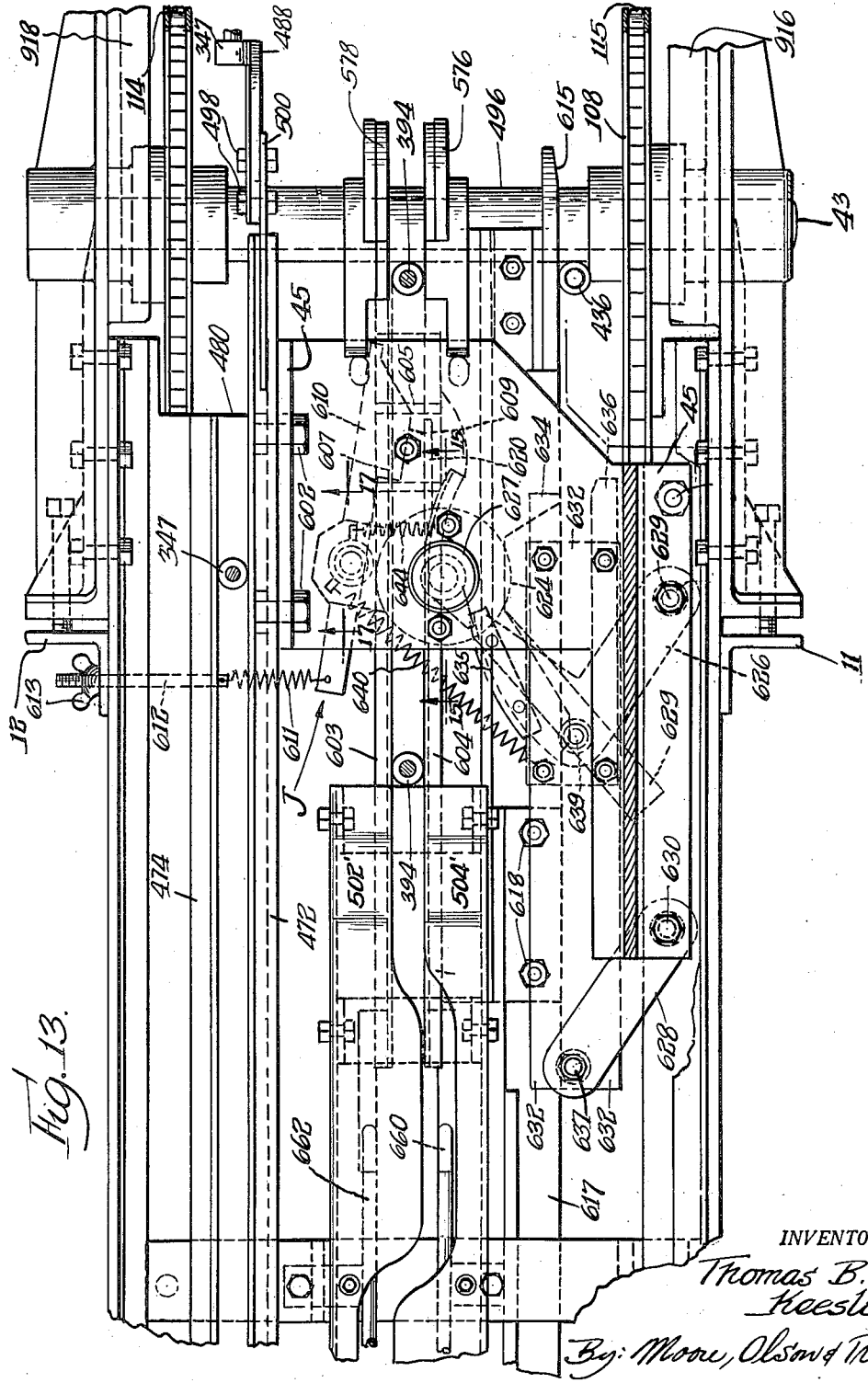

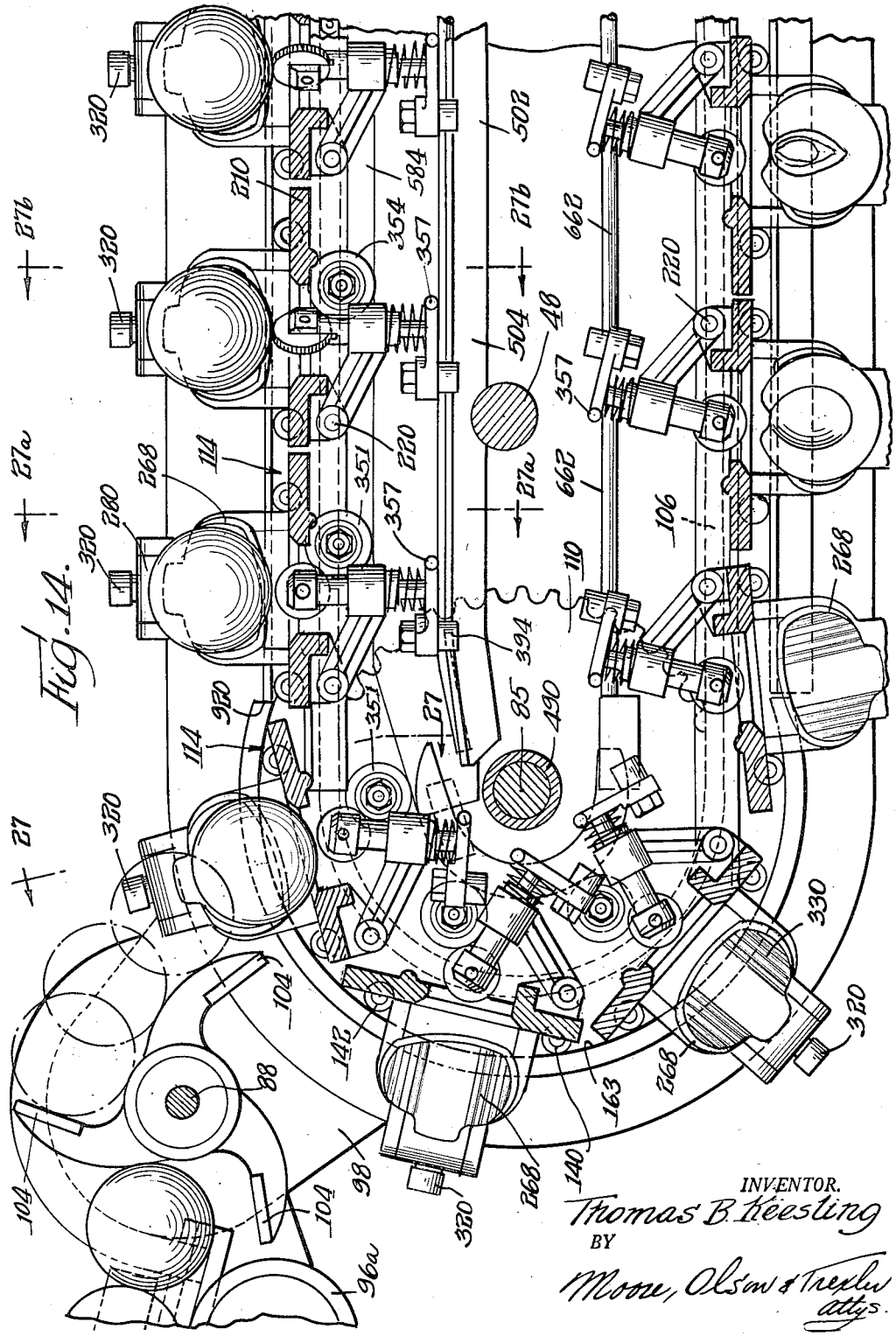

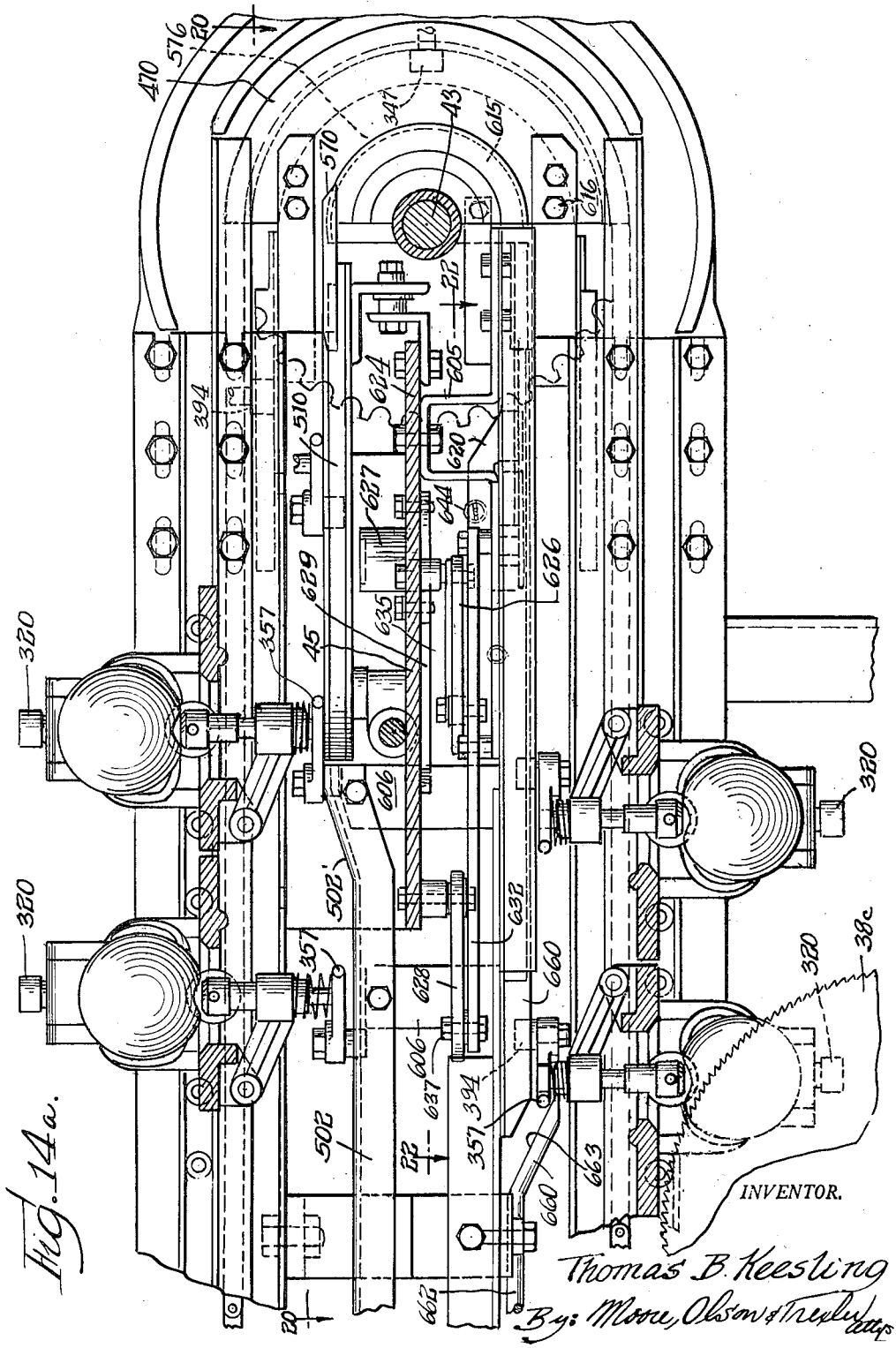

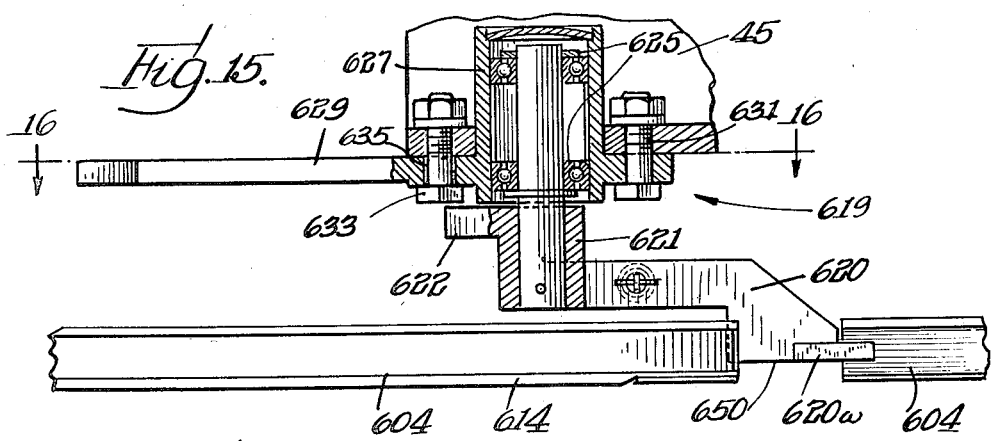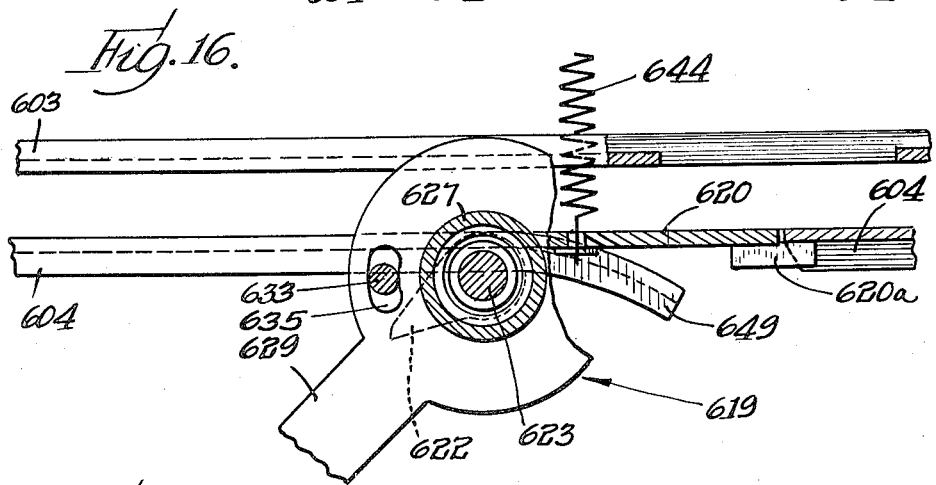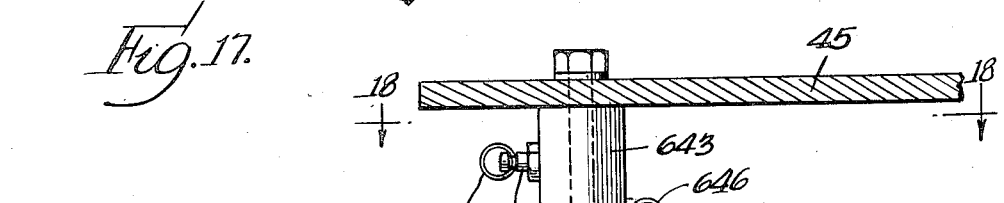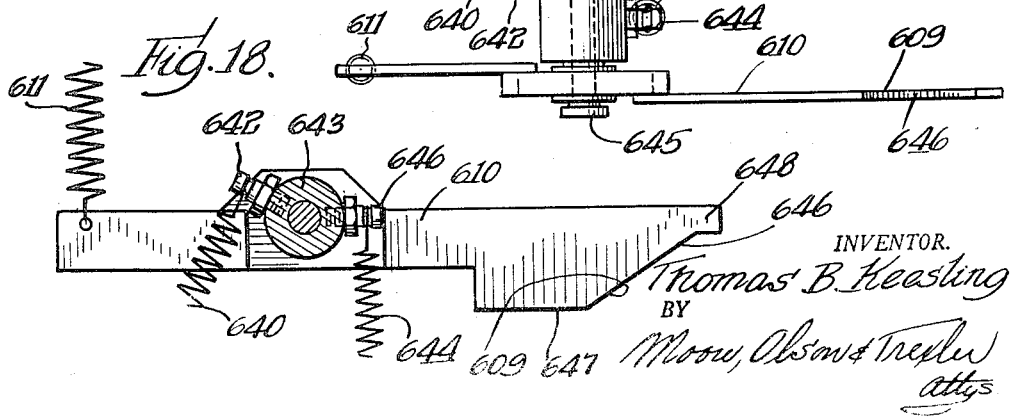

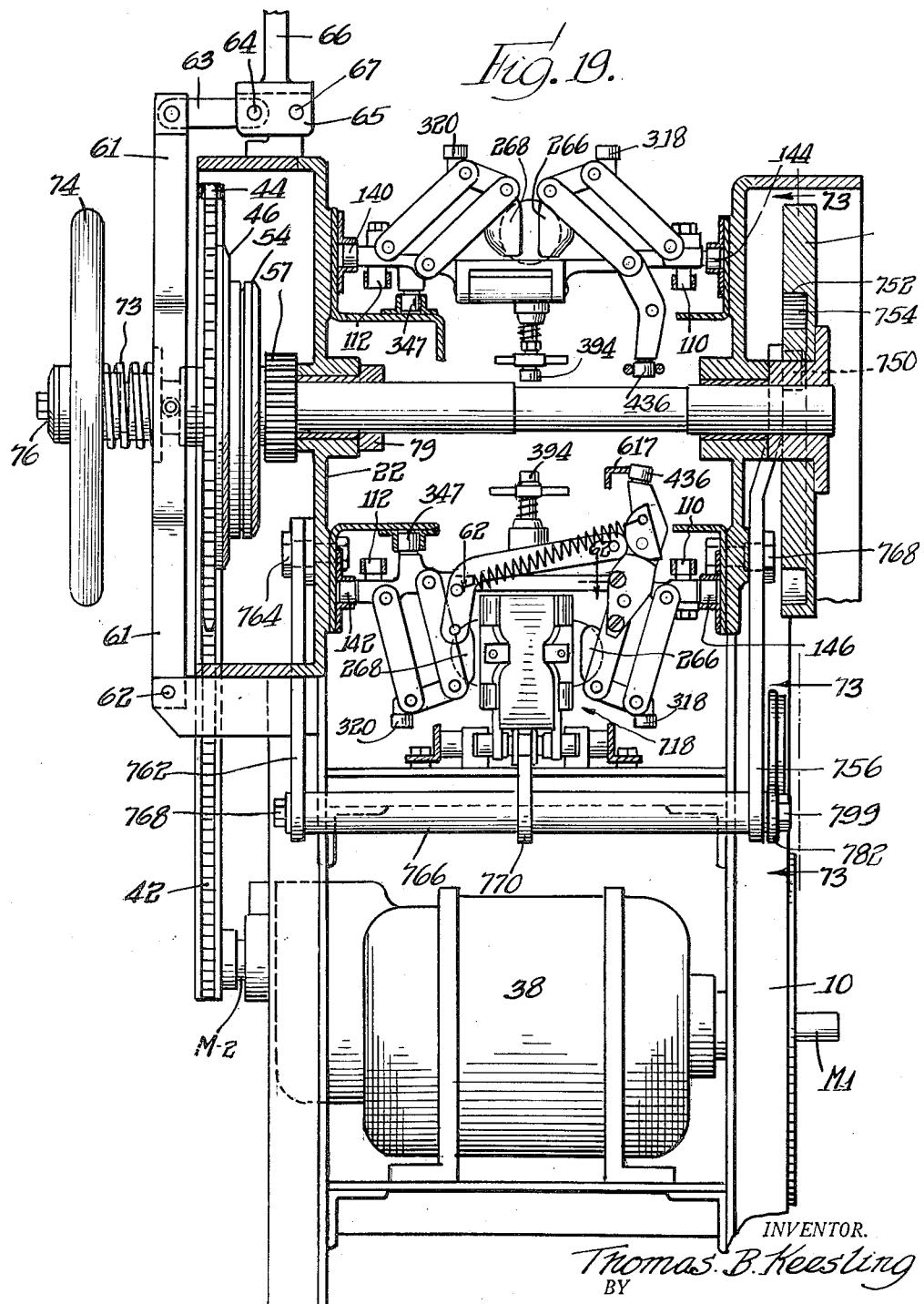

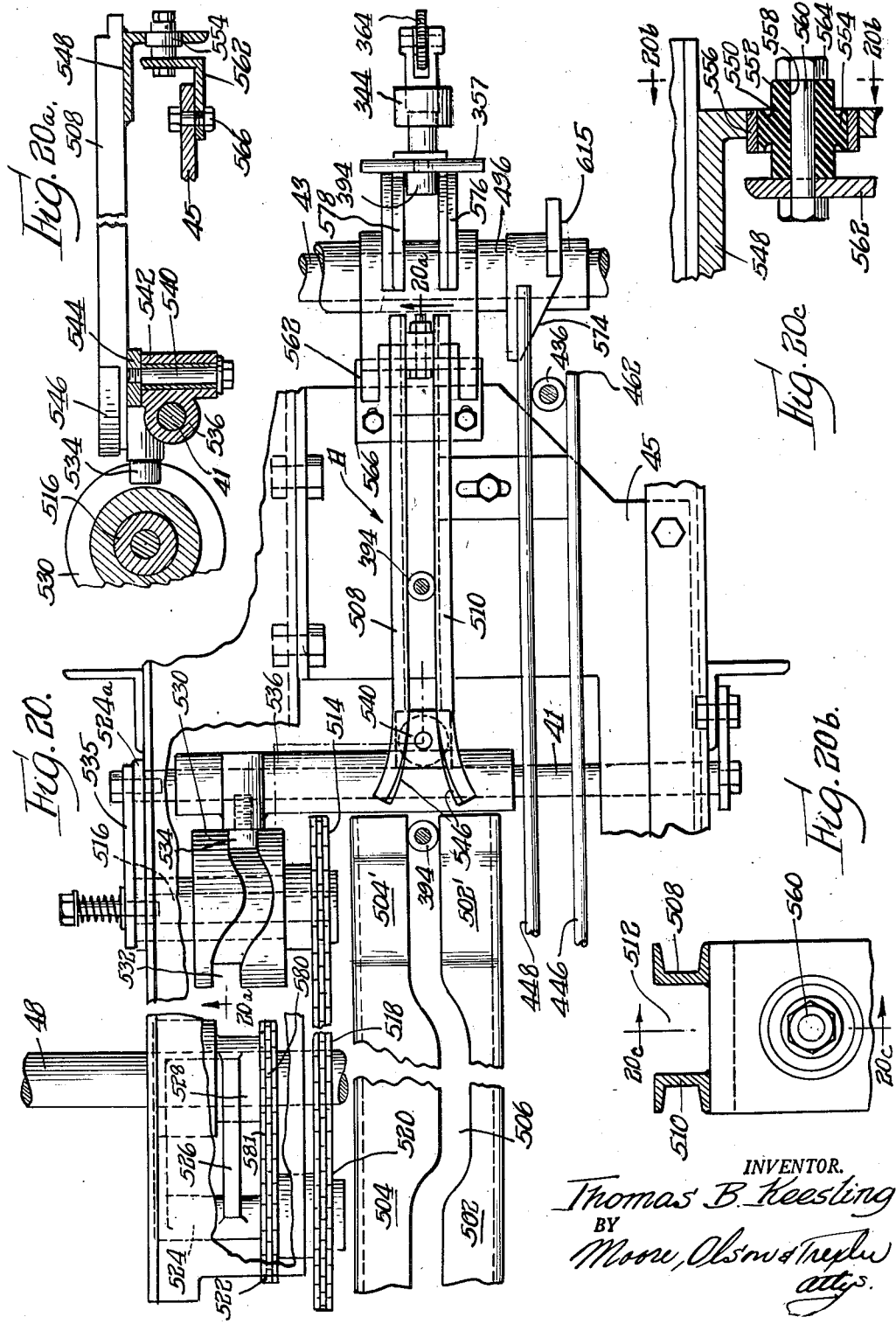

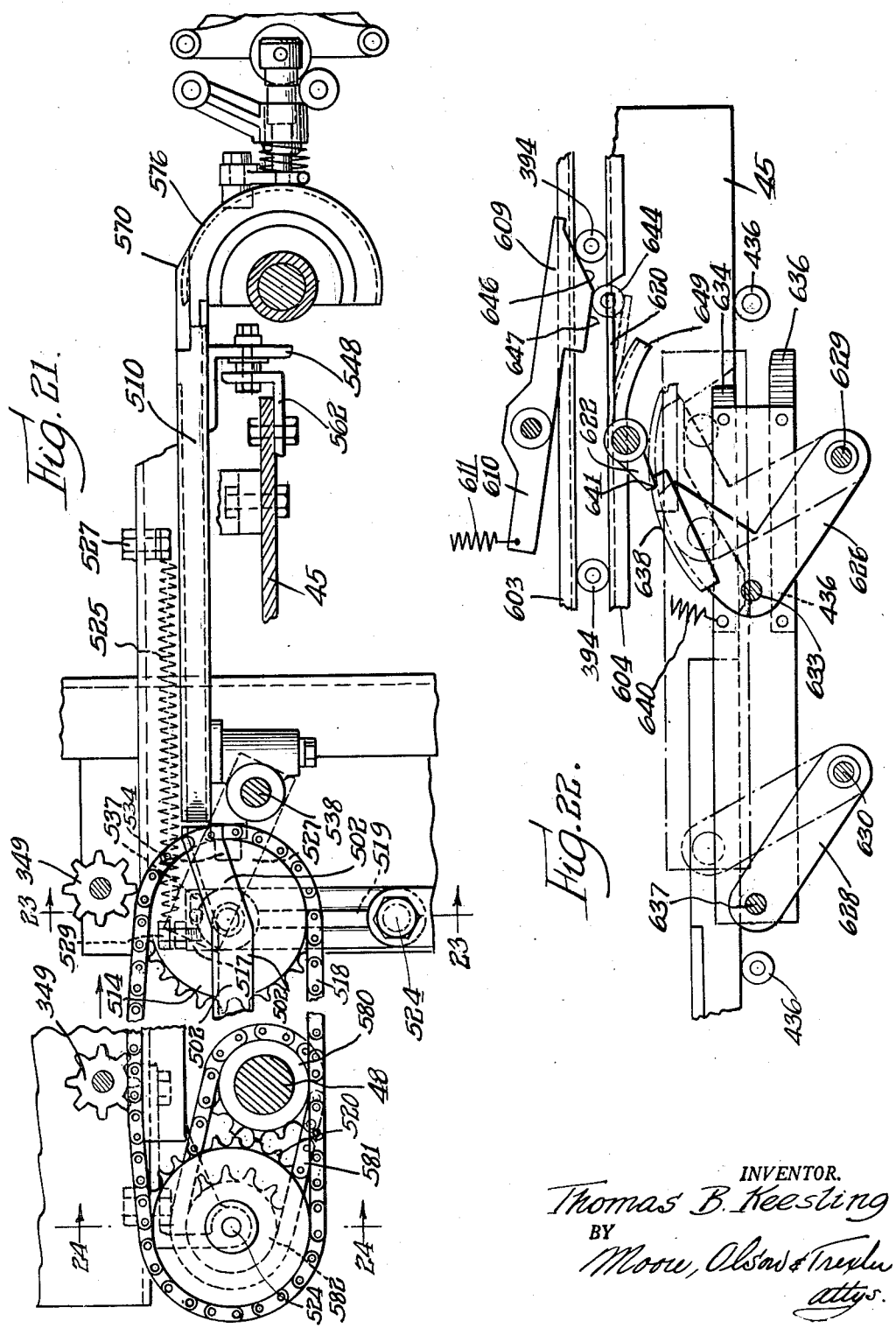

Dec. 22, 1959  T. B. KEESLING  2,918,098
FRUIT ORIENTATOR, SPLITTER AND PITTER
Filed March 3, 1953  45 Sheets-Sheet 15
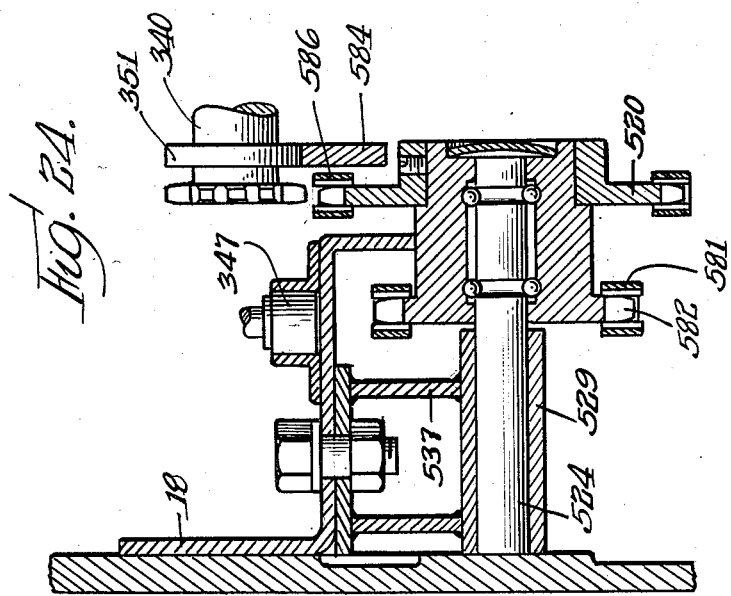
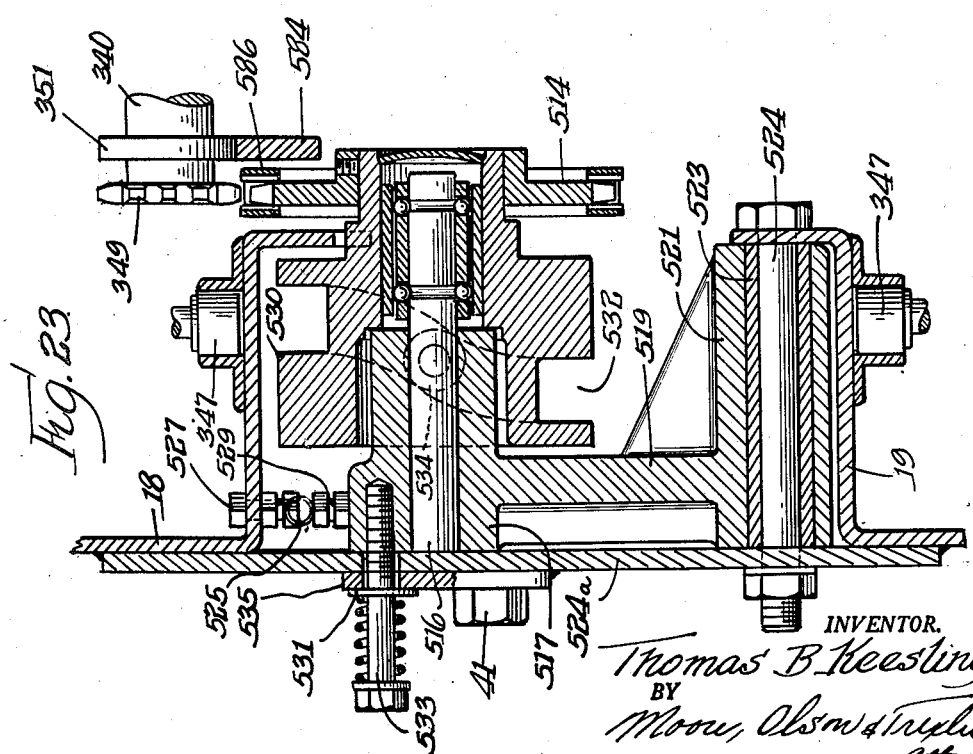
INVENTOR.
Thomas B. Keesling
BY
Moore, Olson & Trexler
attys.

Dec. 22, 1959 T. B. KEESLING 2,918,098
FRUIT ORIENTATOR, SPLITTER AND PITTER
Filed March 3, 1953 45 Sheets-Sheet 16
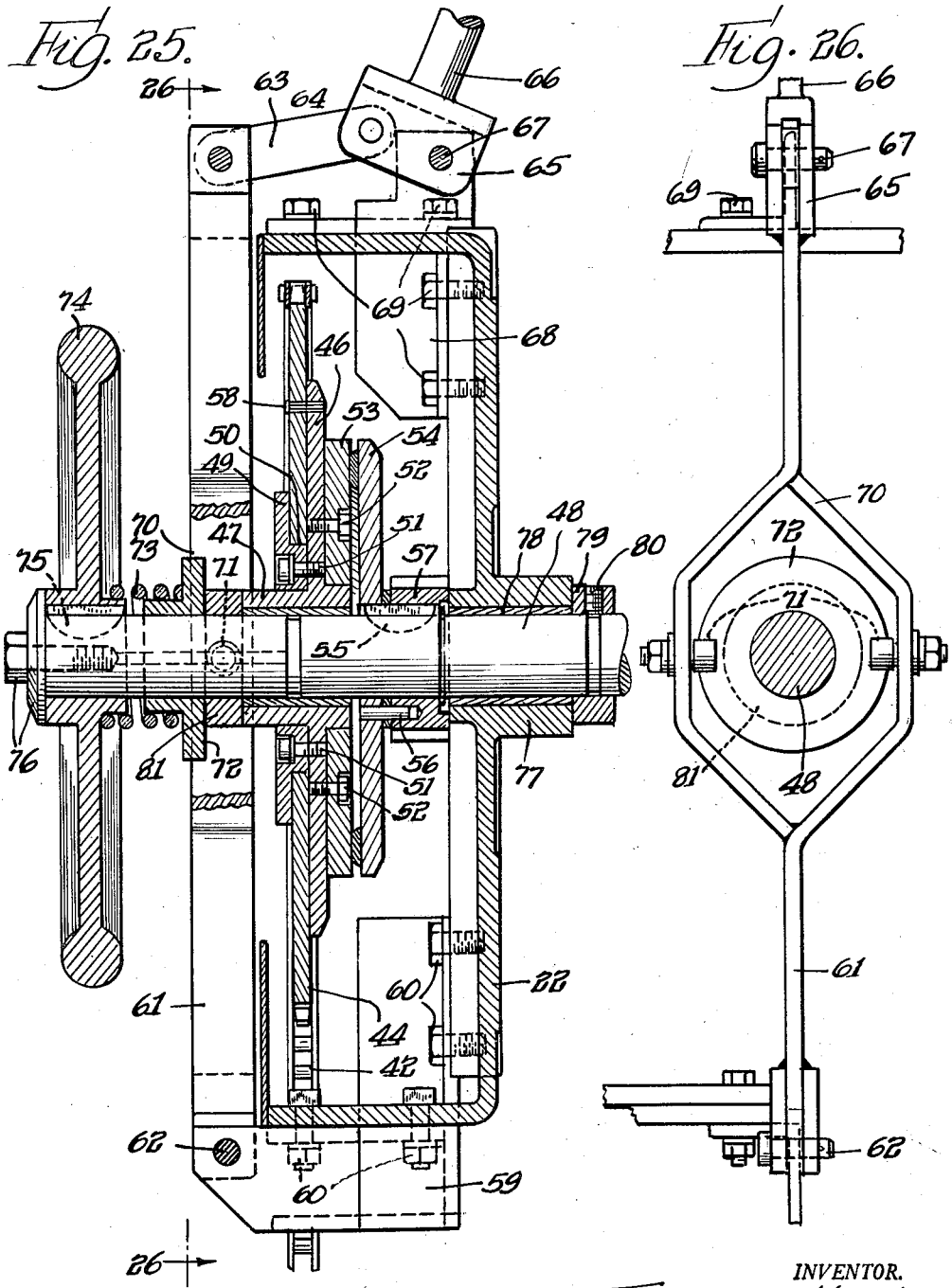
INVENTOR.
Thomas B. Keesling
BY
Moore, Olson & Trexler
attys.

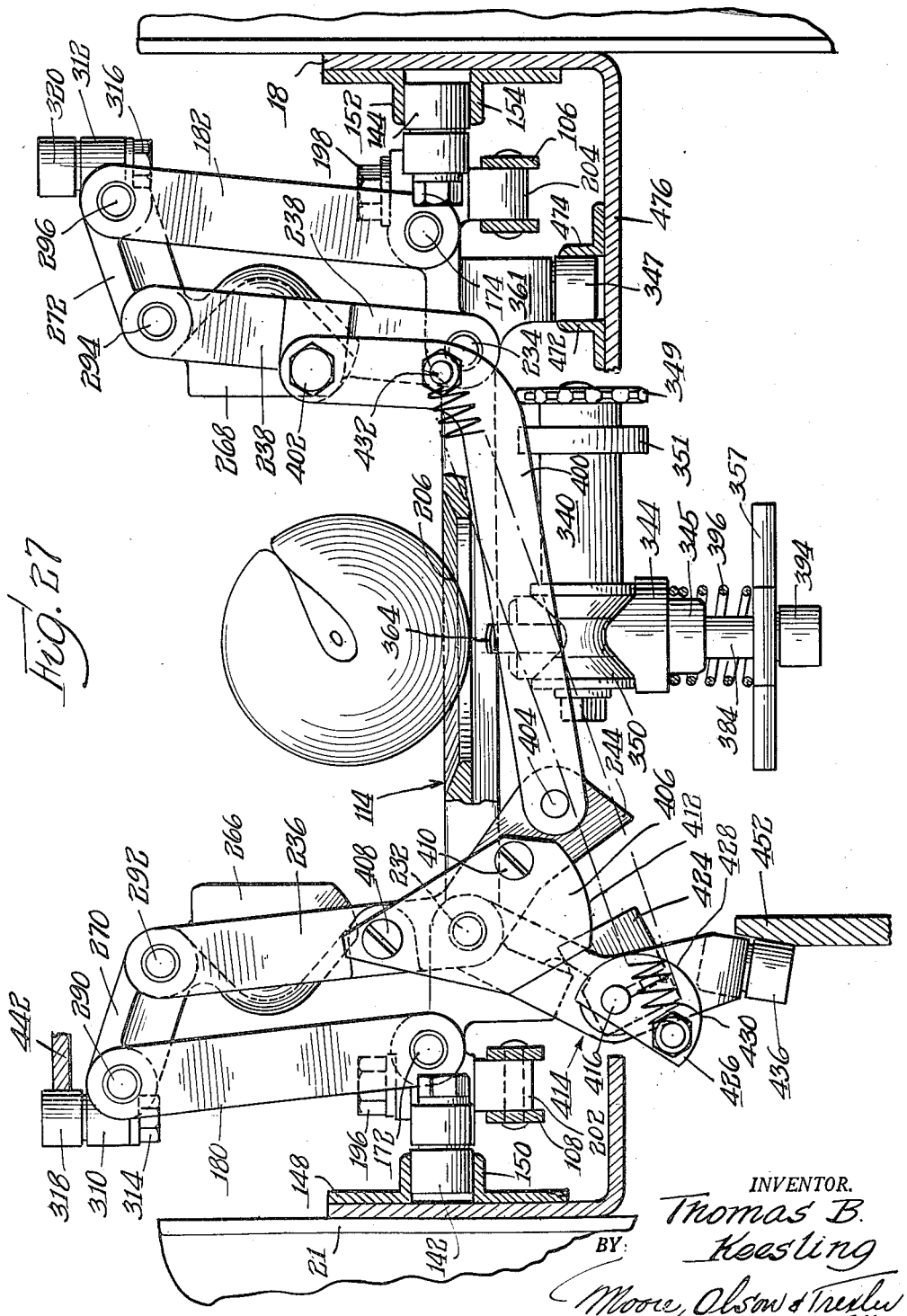

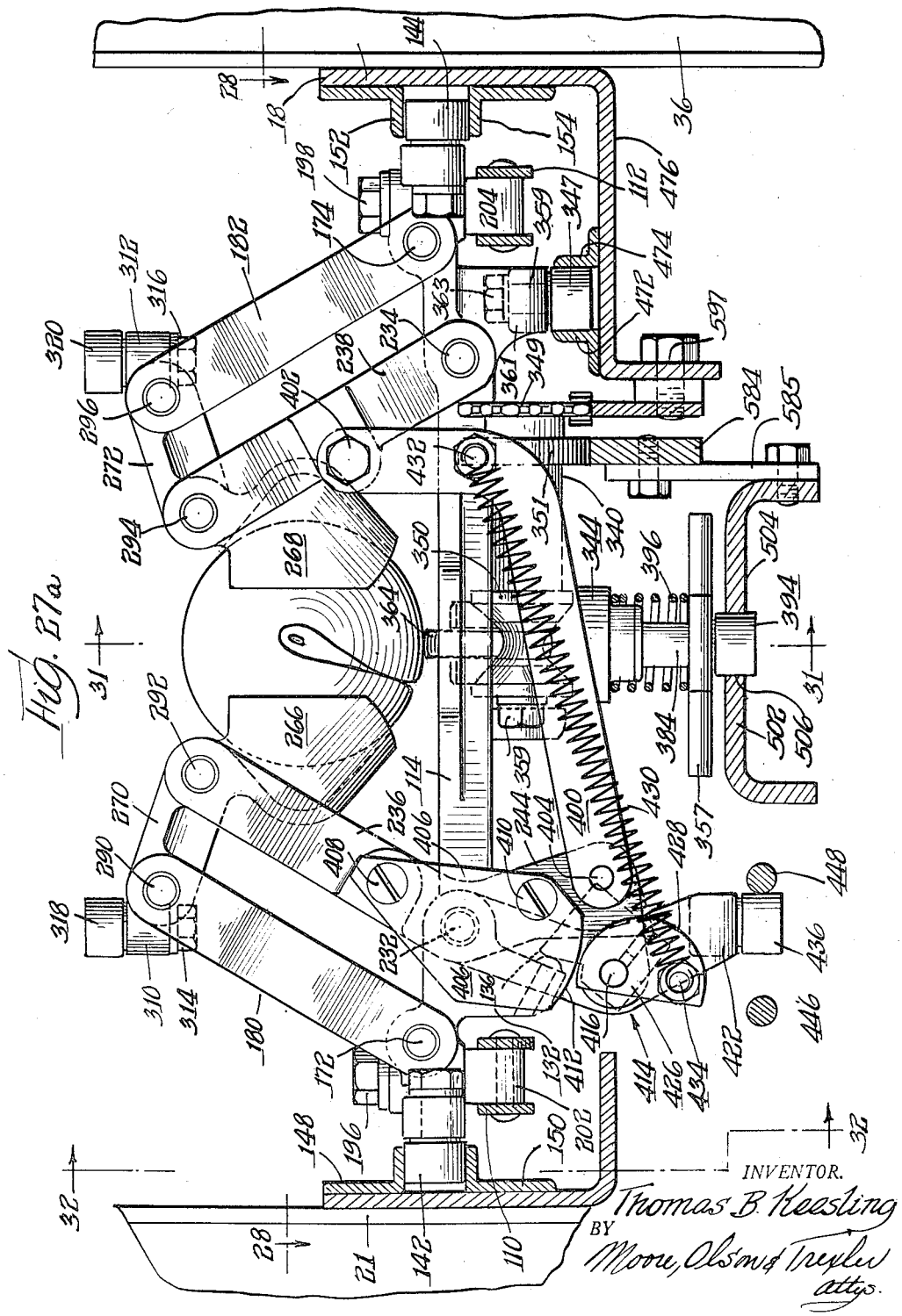

Dec. 22, 1959      T. B. KEESLING      2,918,098
FRUIT ORIENTATOR, SPLITTER AND PITTER
Filed March 3, 1953      45 Sheets-Sheet 19
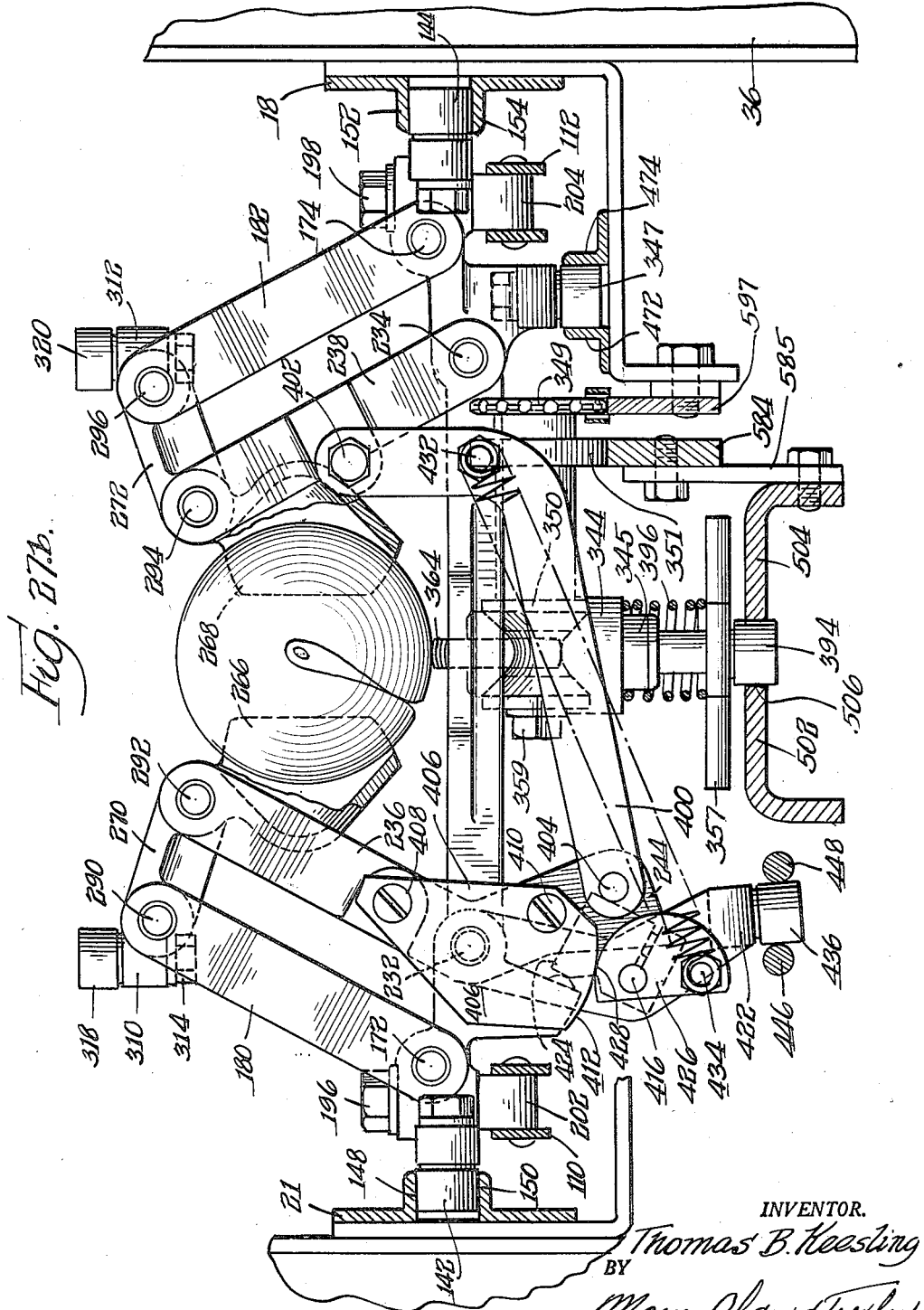
INVENTOR.
Thomas B. Keesling
BY
Moore, Olson & Trexler
attys.

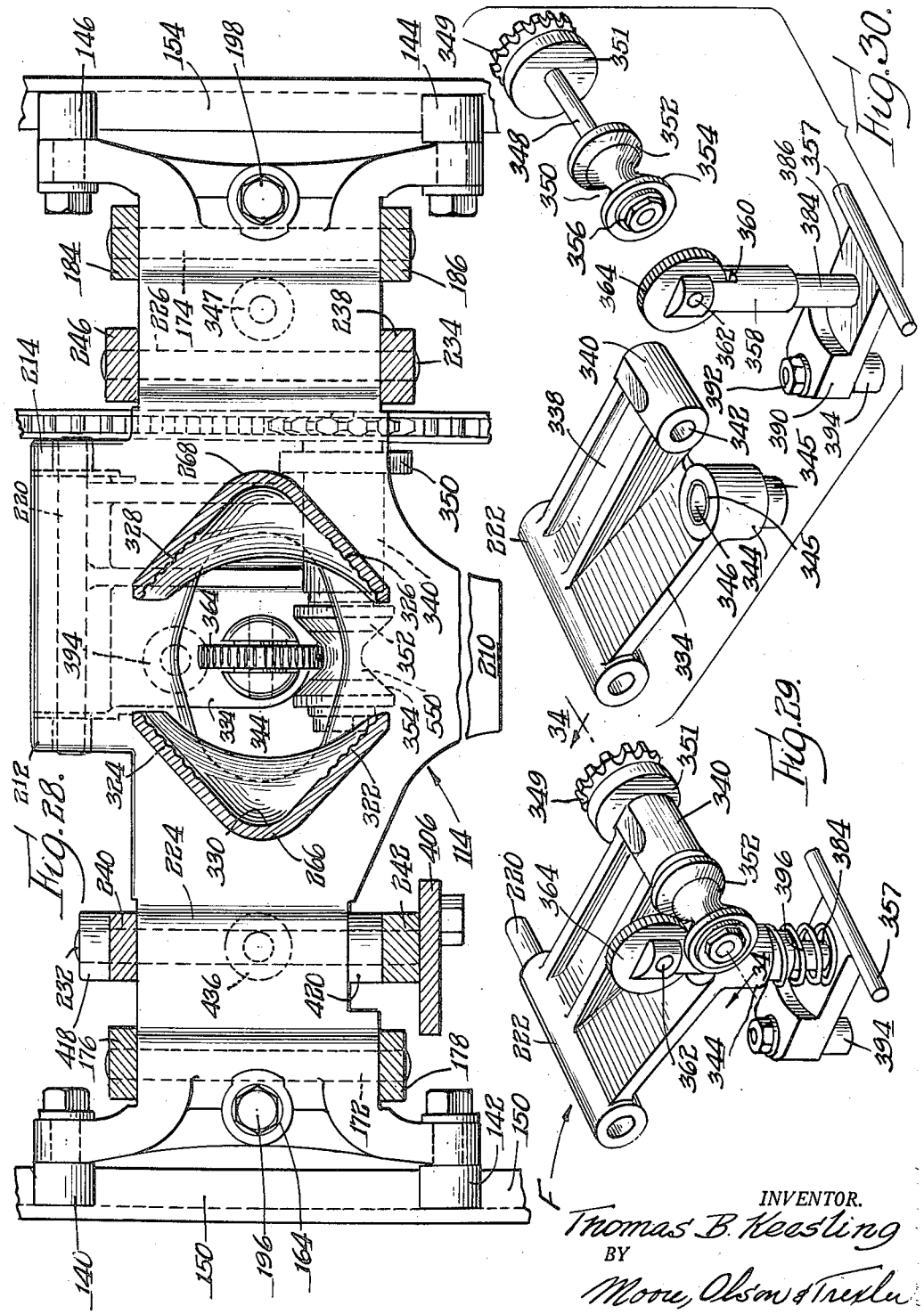

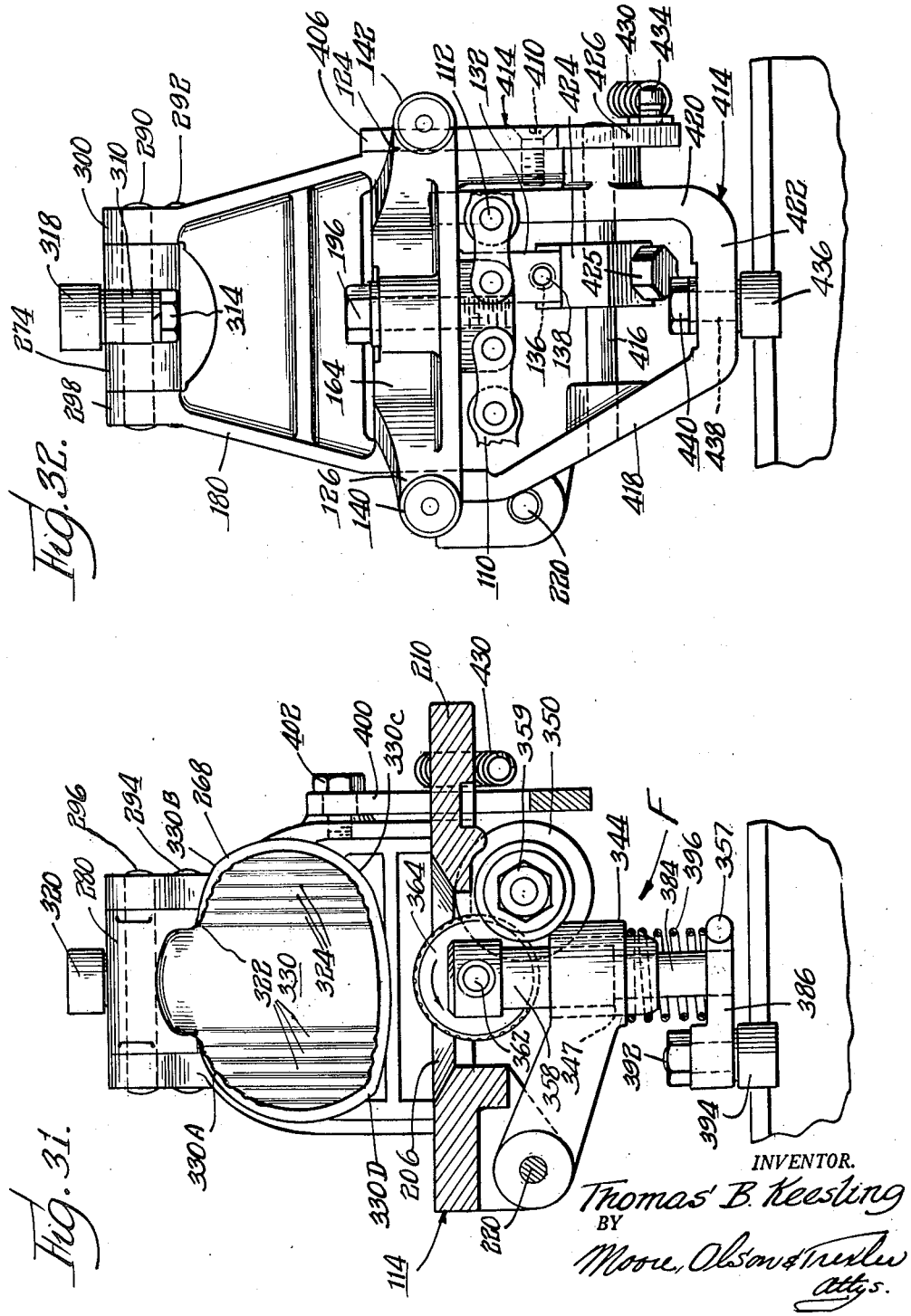

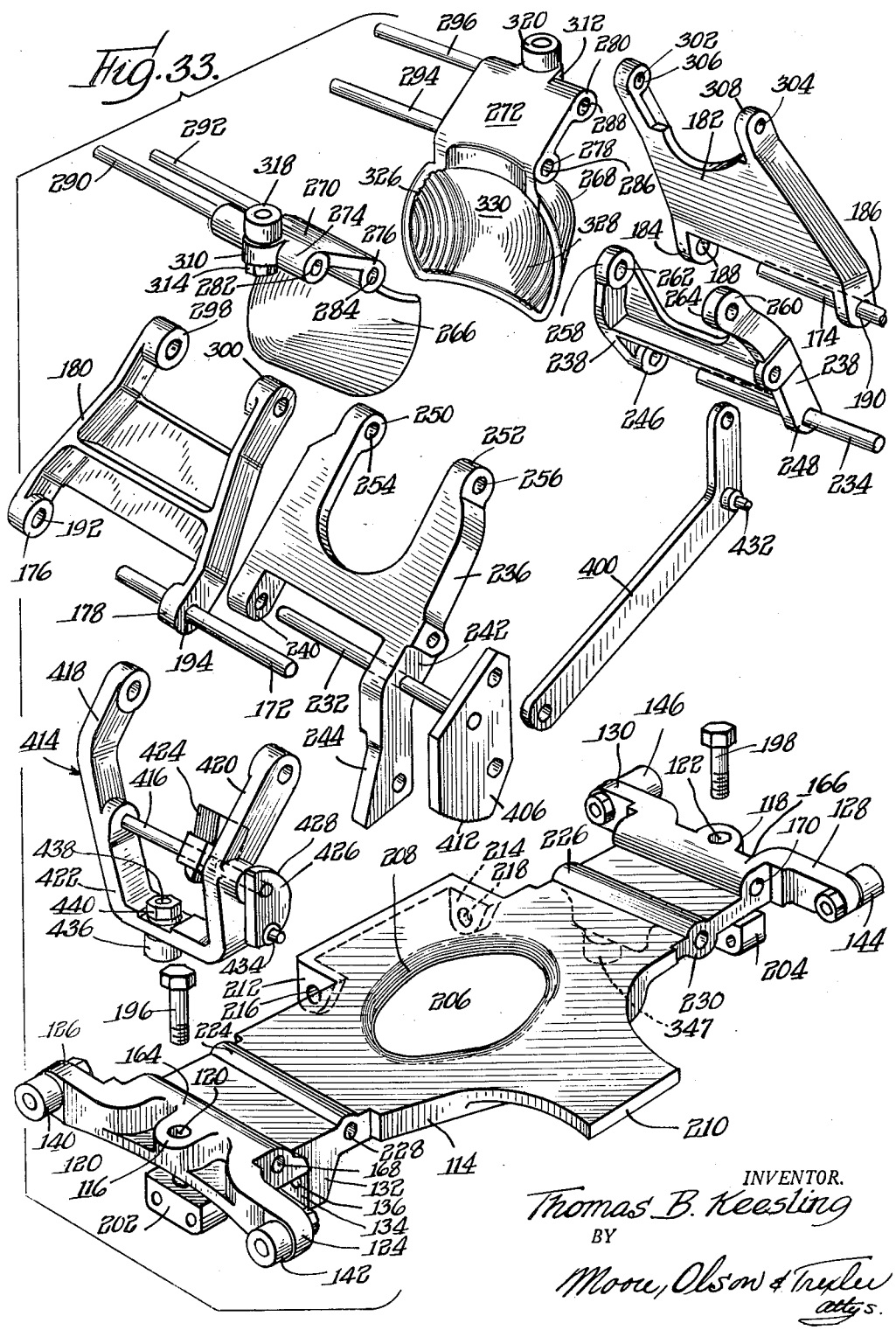

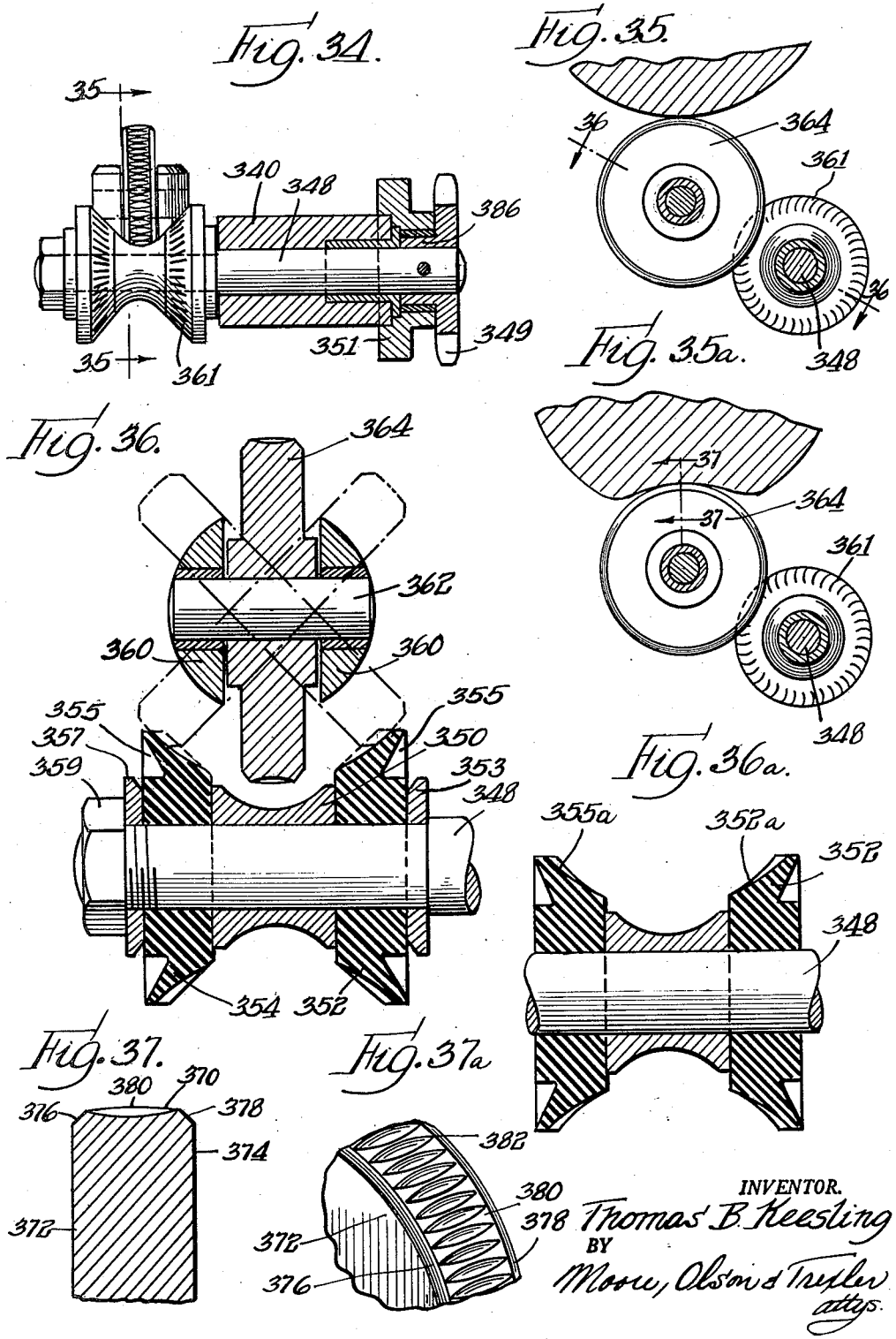

Dec. 22, 1959     T. B. KEESLING     2,918,098
FRUIT ORIENTATOR, SPLITTER AND PITTER
Filed March 3, 1953     45 Sheets-Sheet 24
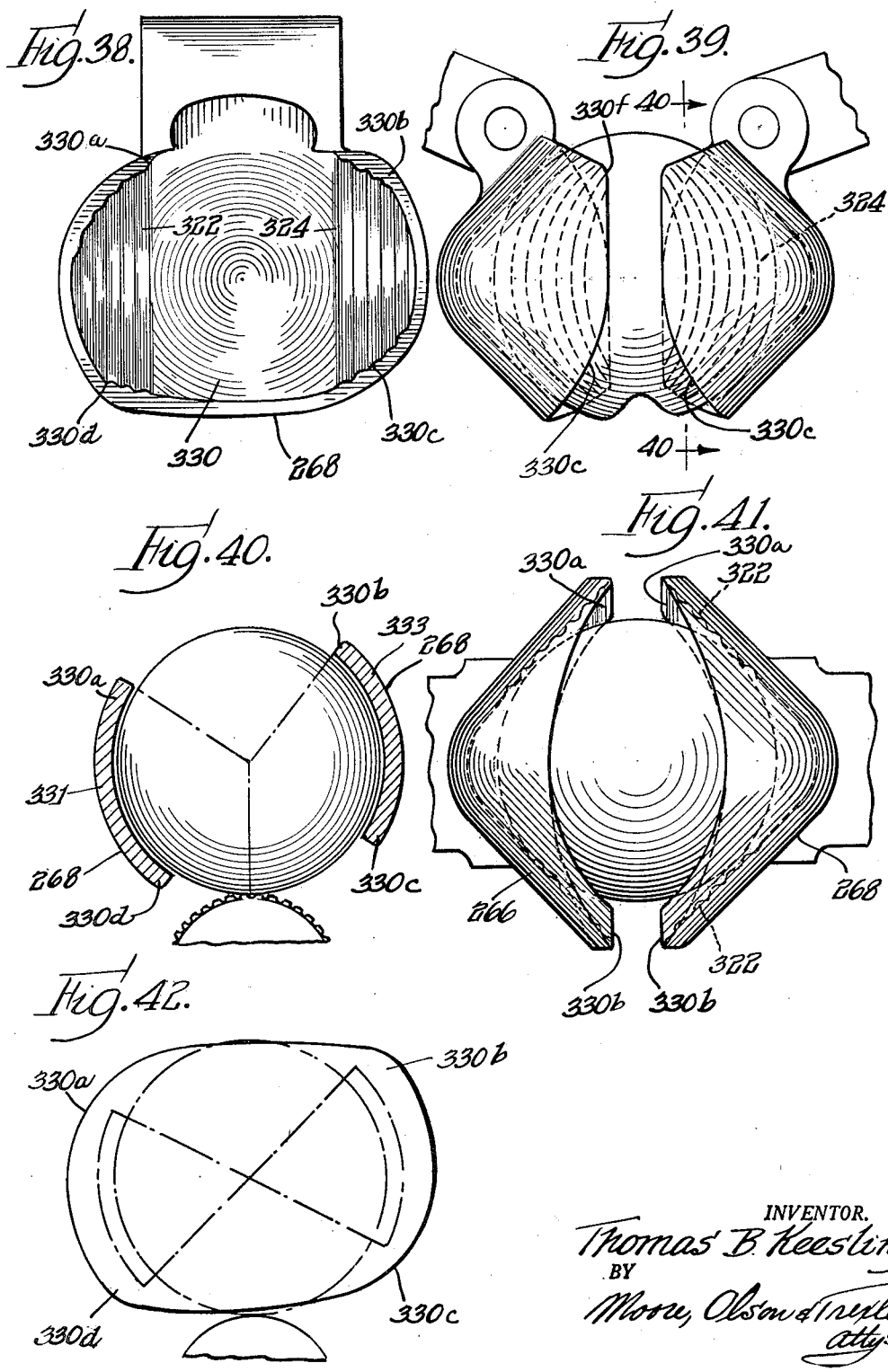
INVENTOR.
Thomas B. Keesling
BY
Moore, Olson & Trexler
attys.

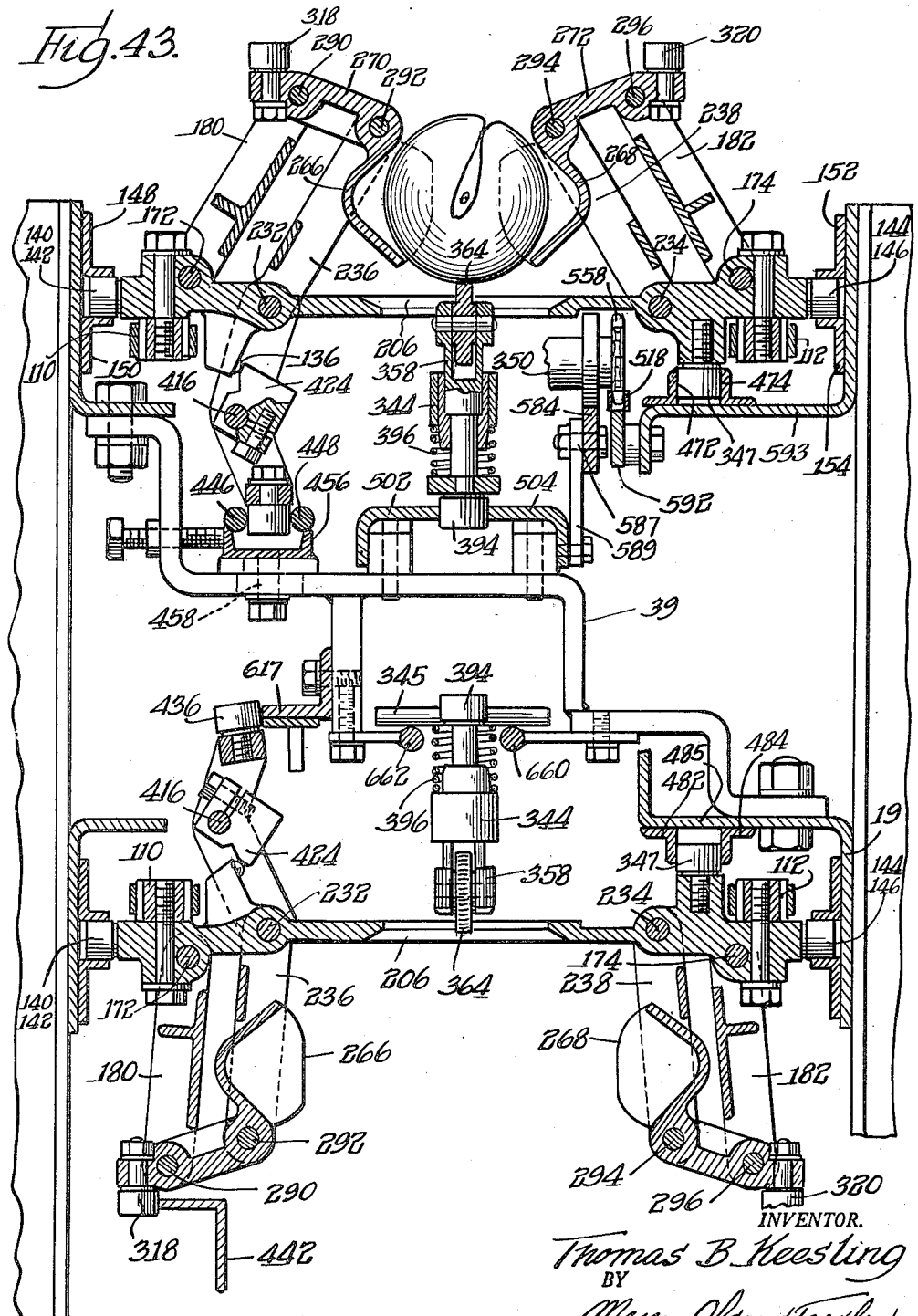

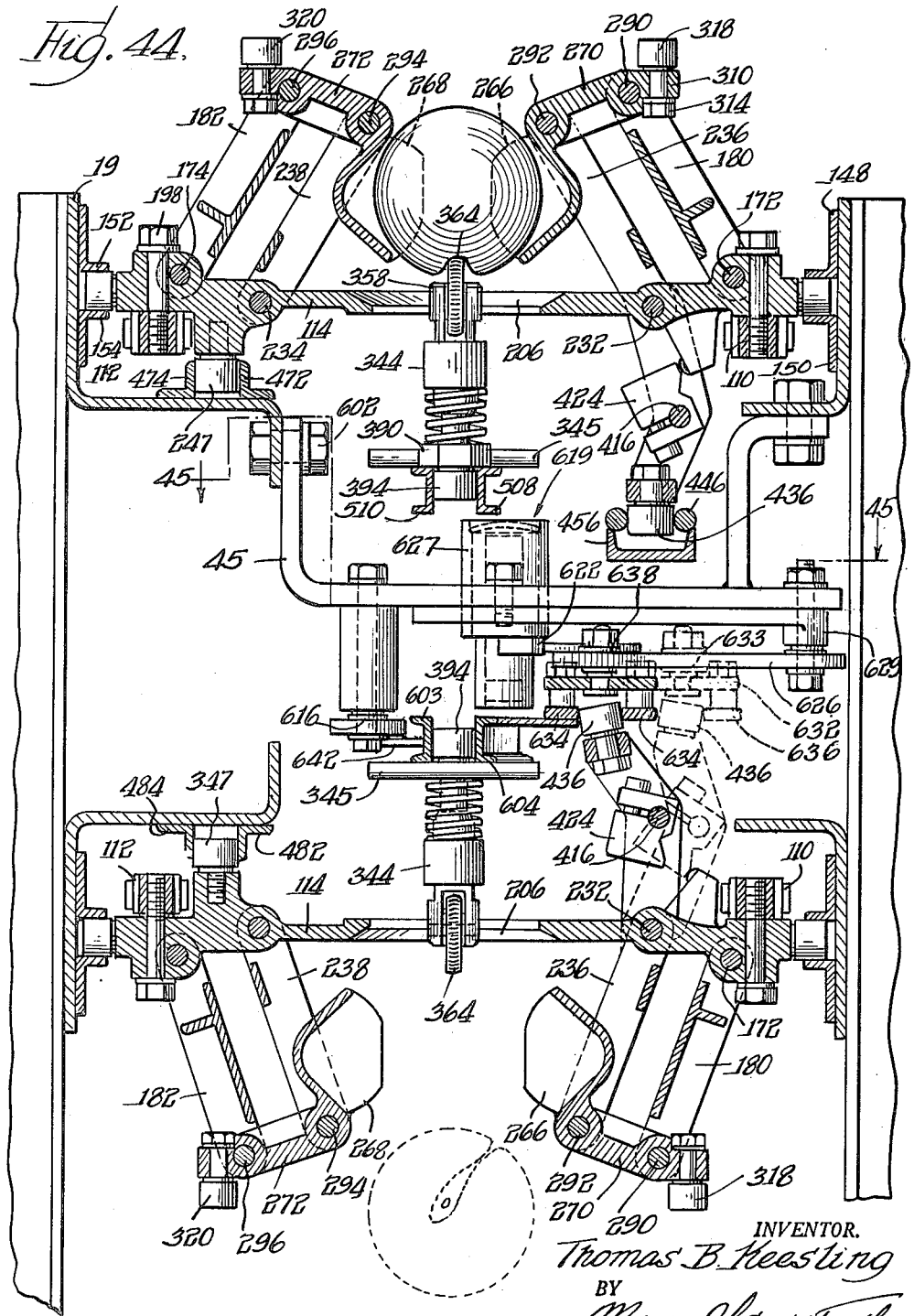

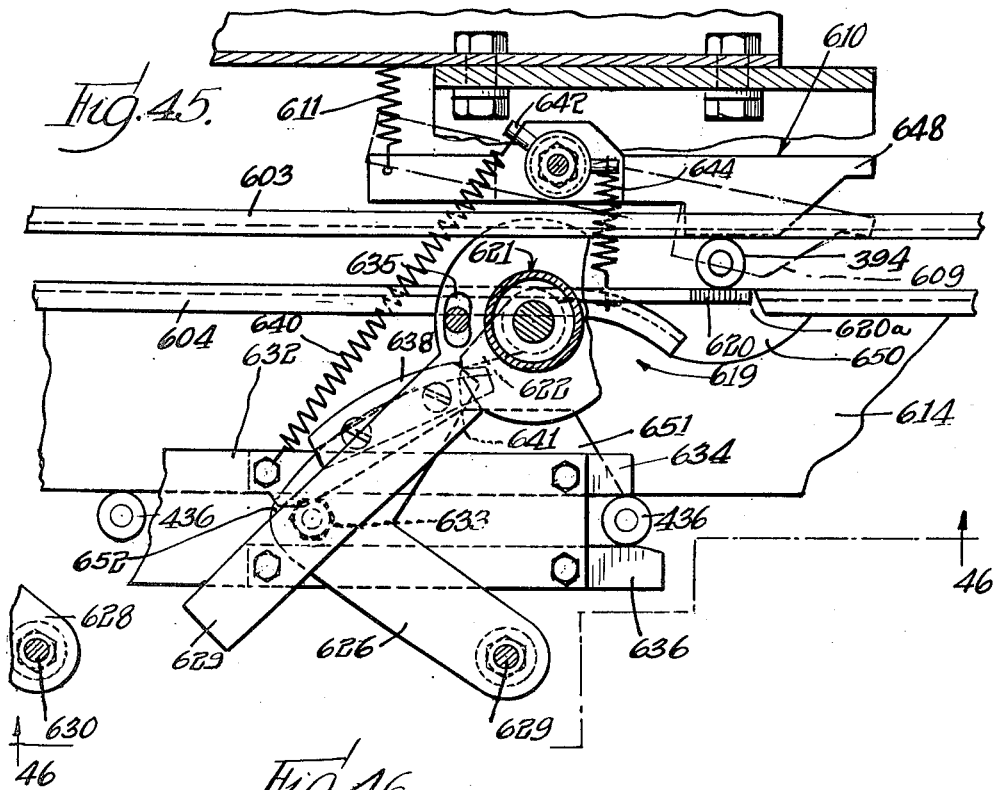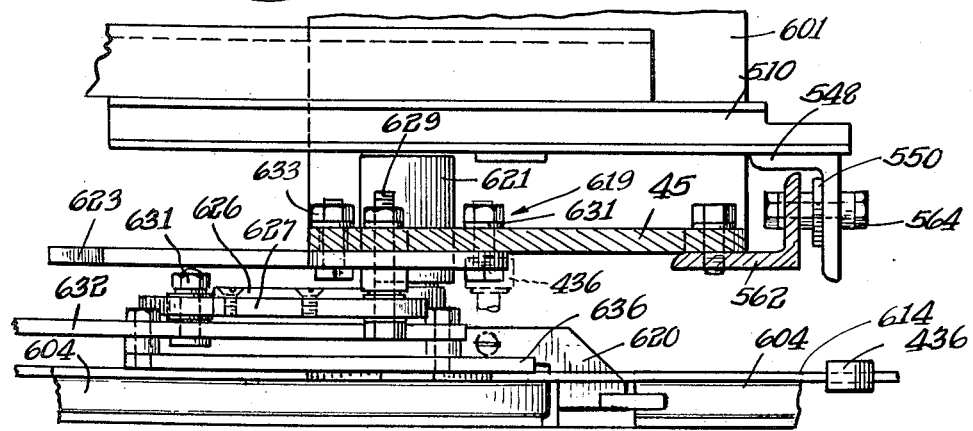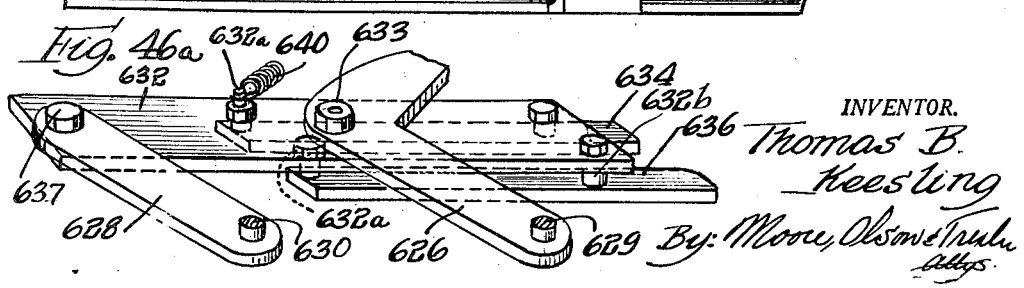

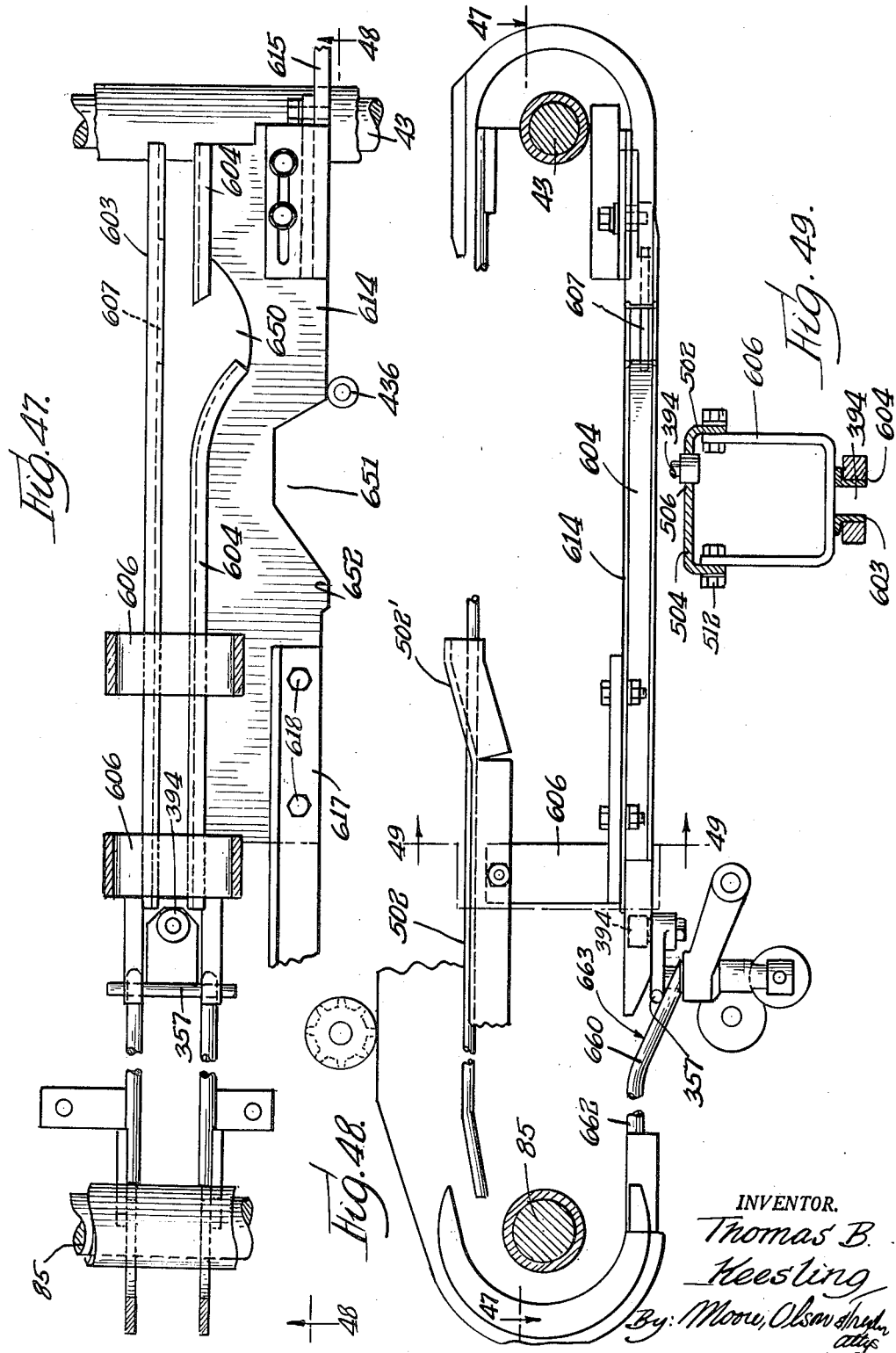

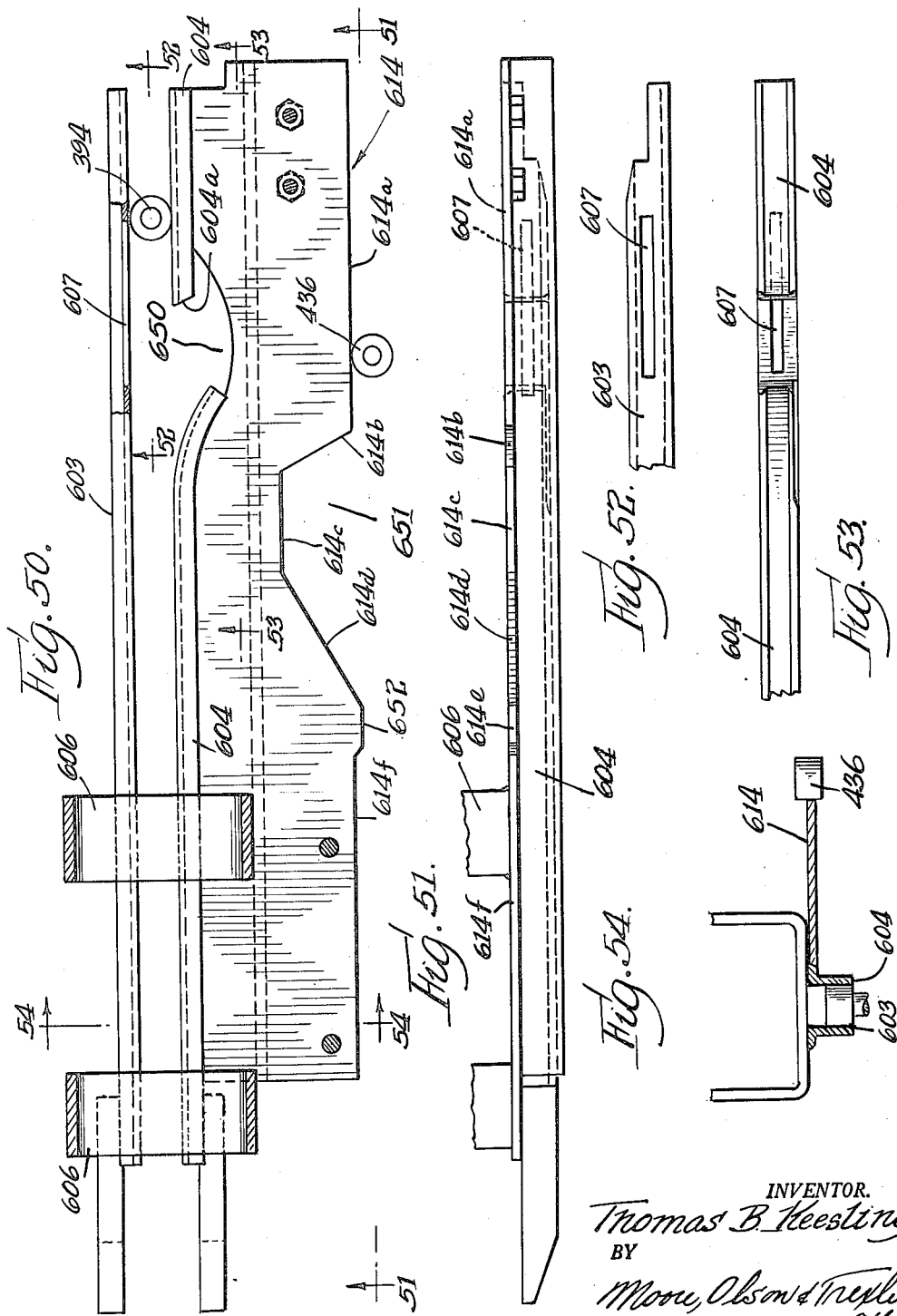

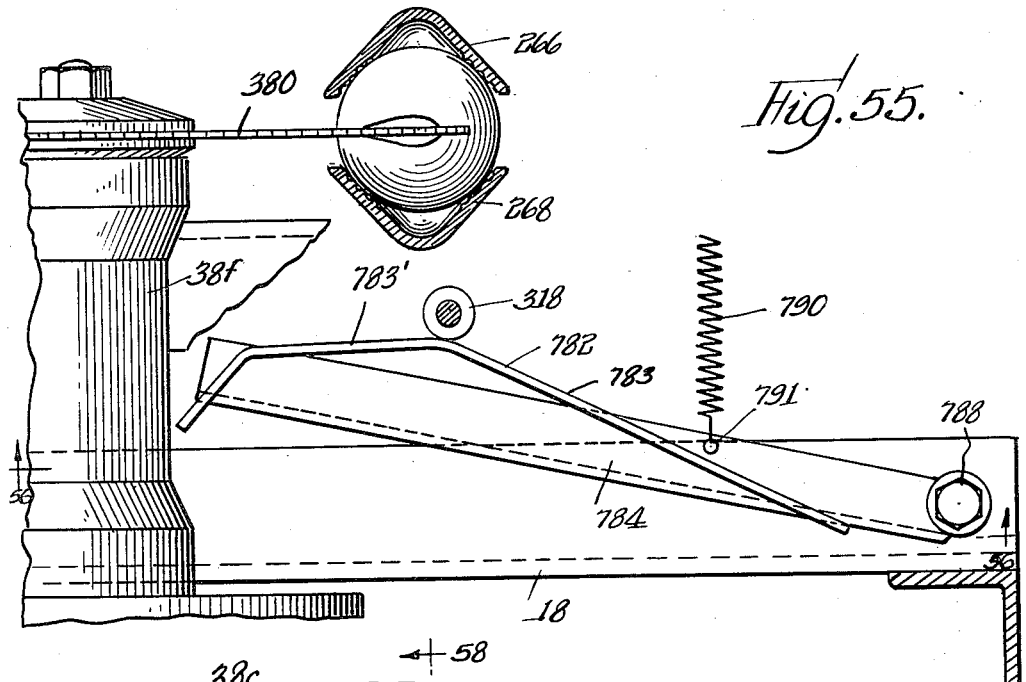
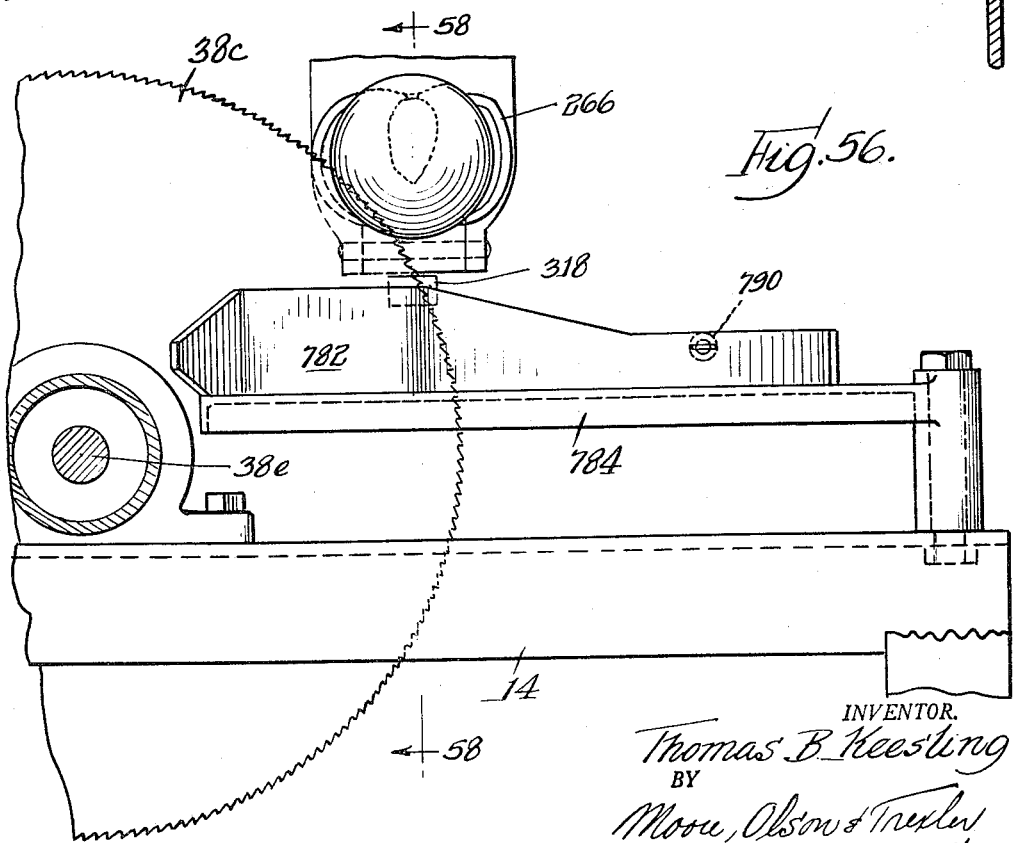

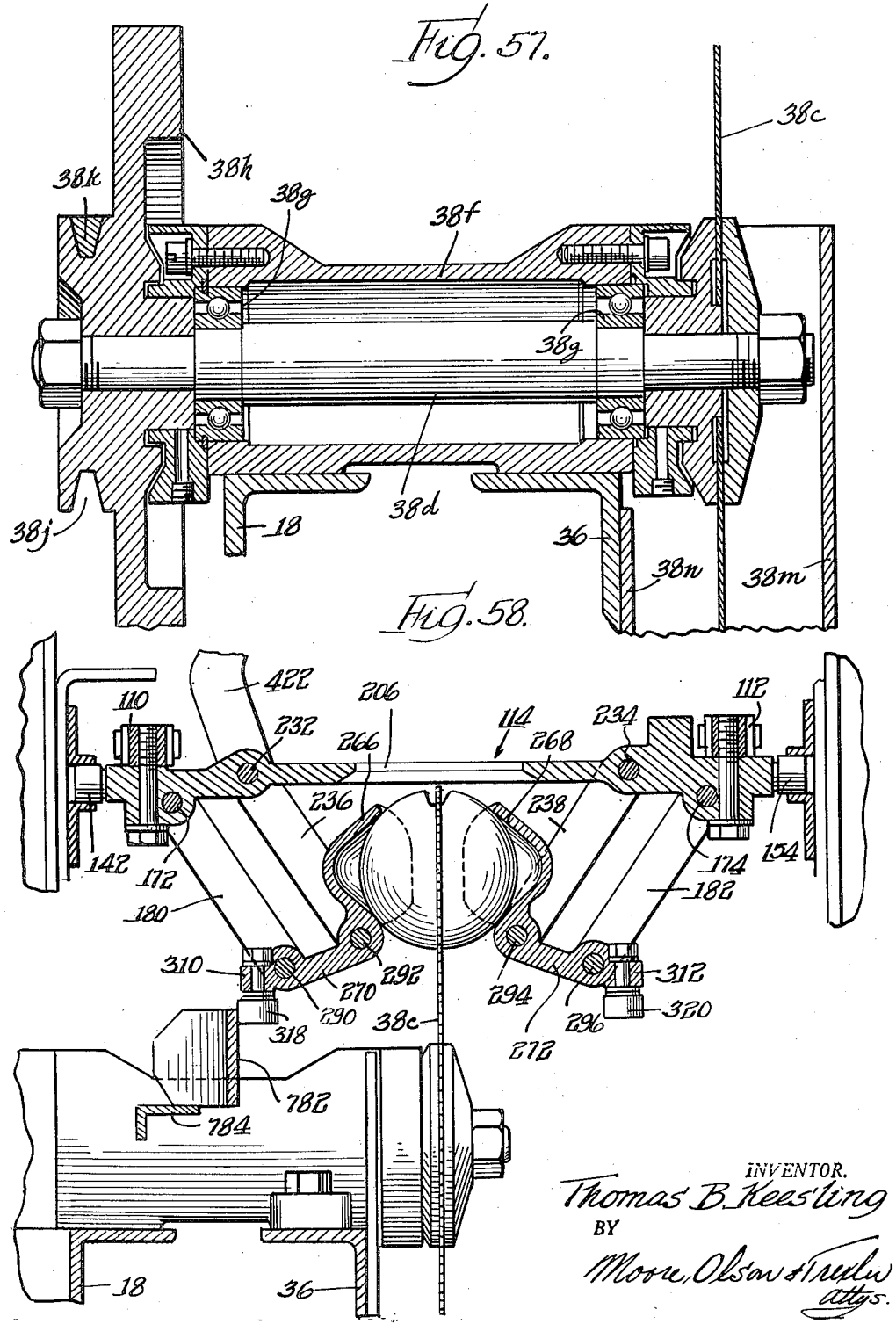

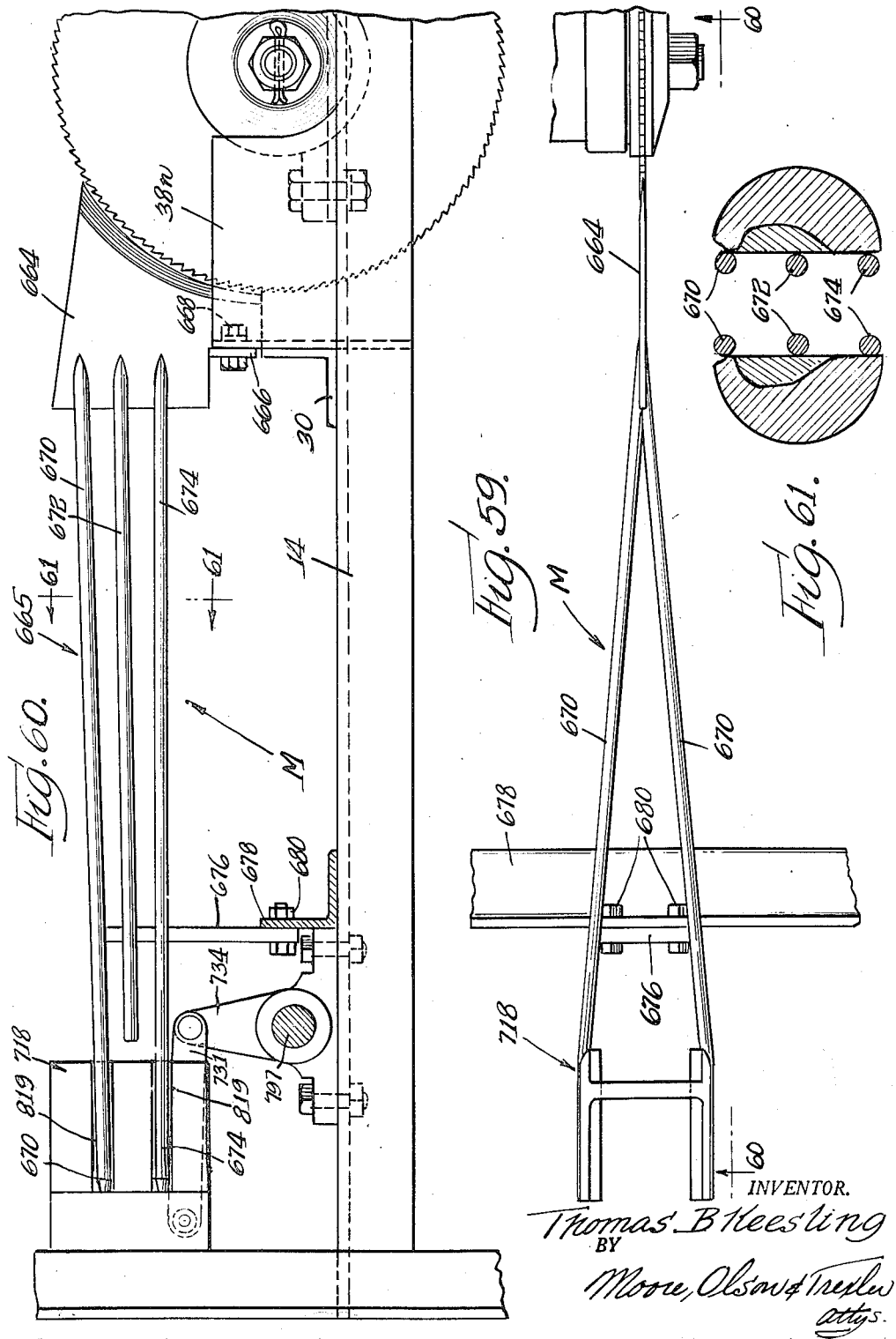

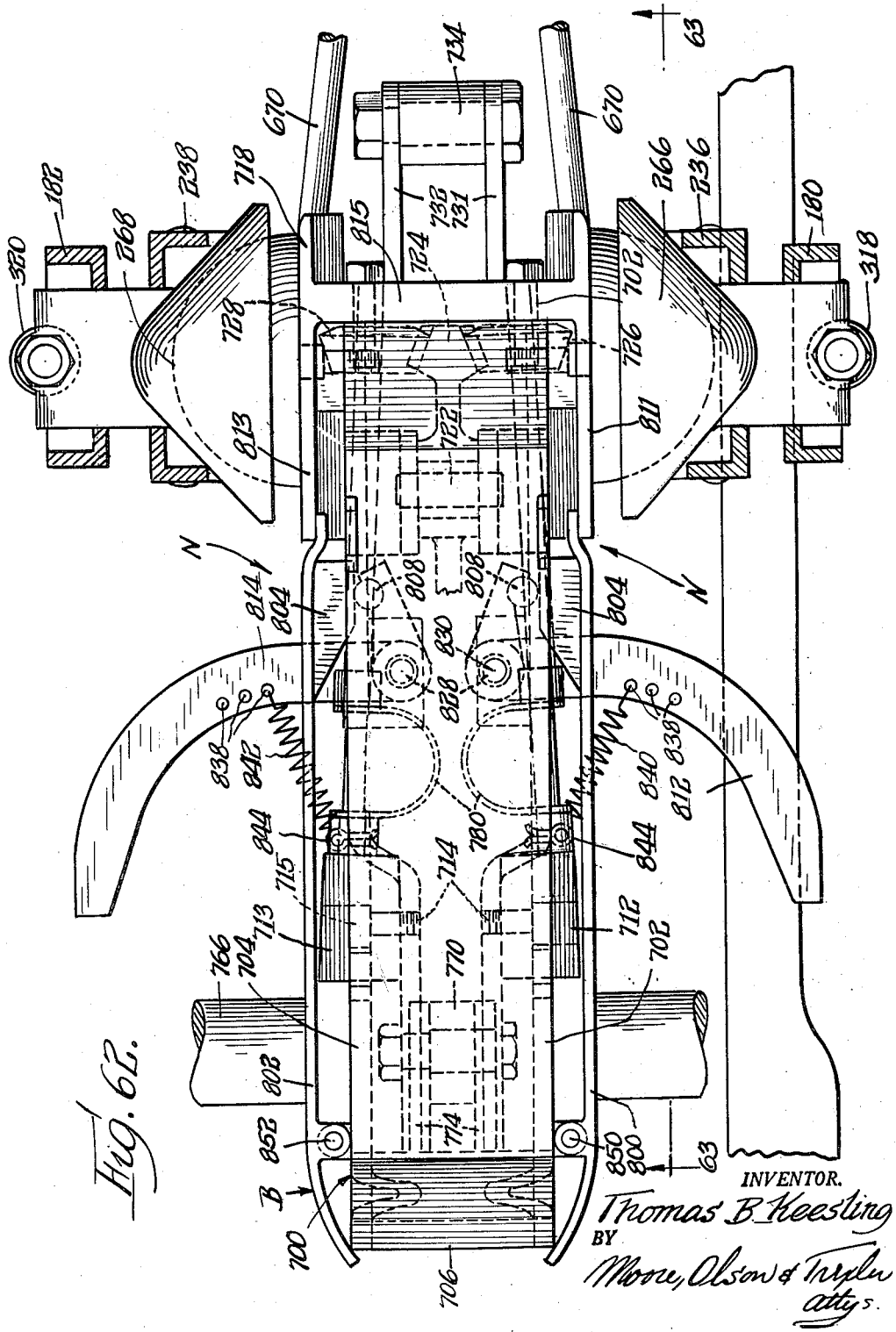

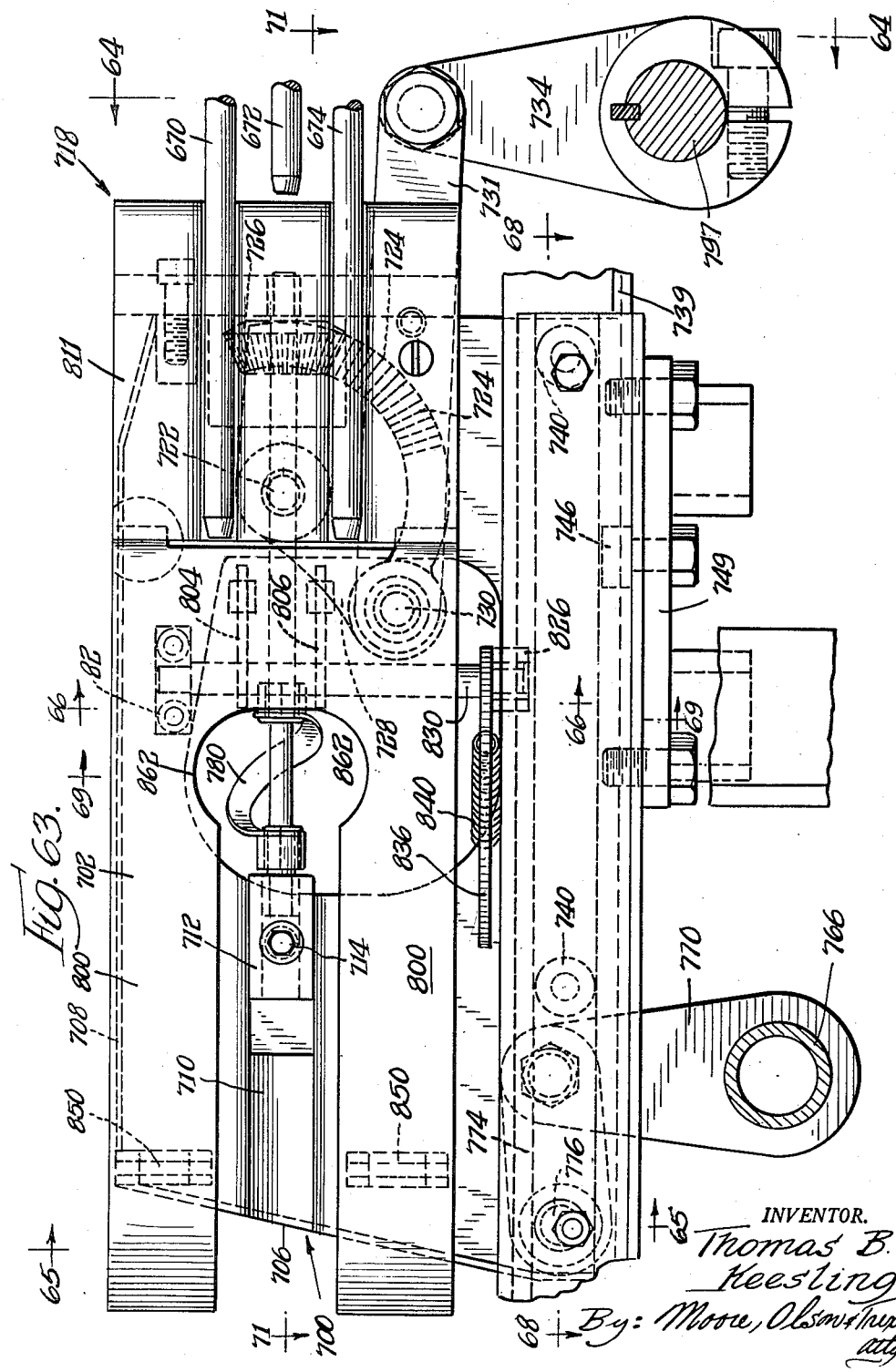

Dec. 22, 1959 T. B. KEESLING 2,918,098
FRUIT ORIENTATOR, SPLITTER AND PITTER
Filed March 3, 1953 45 Sheets-Sheet 35

INVENTOR.
Thomas B. Keesling
By Moore Olson & Trexler
attys.

Dec. 22, 1959 T. B. KEESLING 2,918,098
FRUIT ORIENTATOR, SPLITTER AND PITTER
Filed March 3, 1953 45 Sheets-Sheet 36
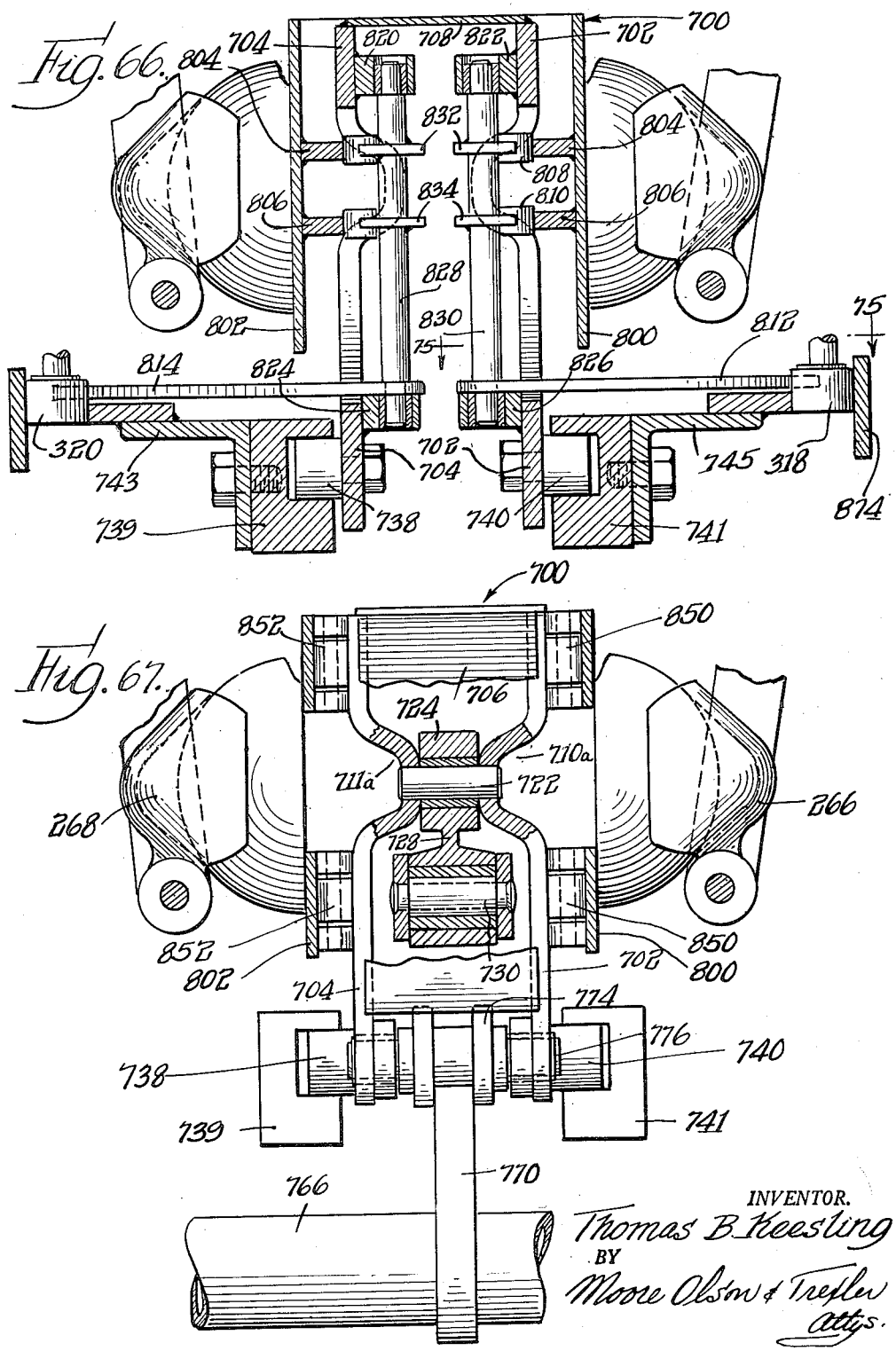
INVENTOR.
Thomas B. Keesling
BY
Moore Olson & Trefler
attys.

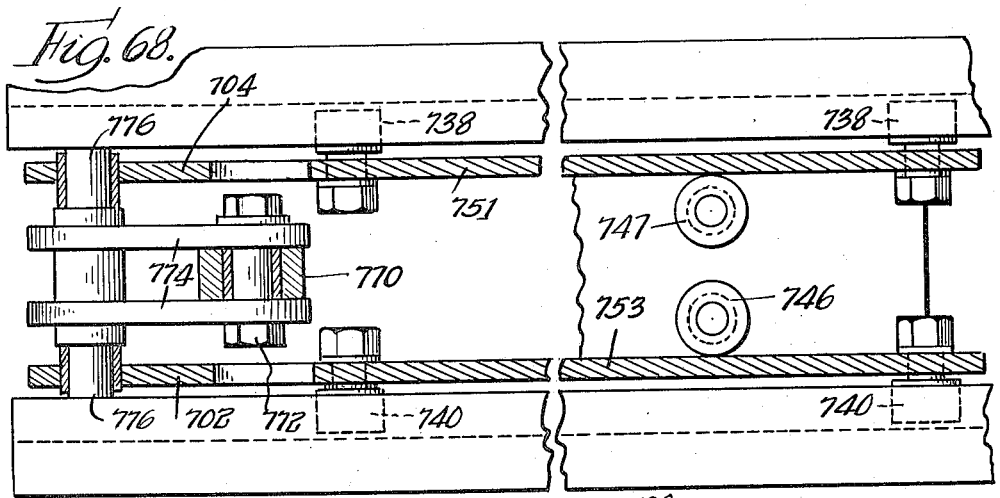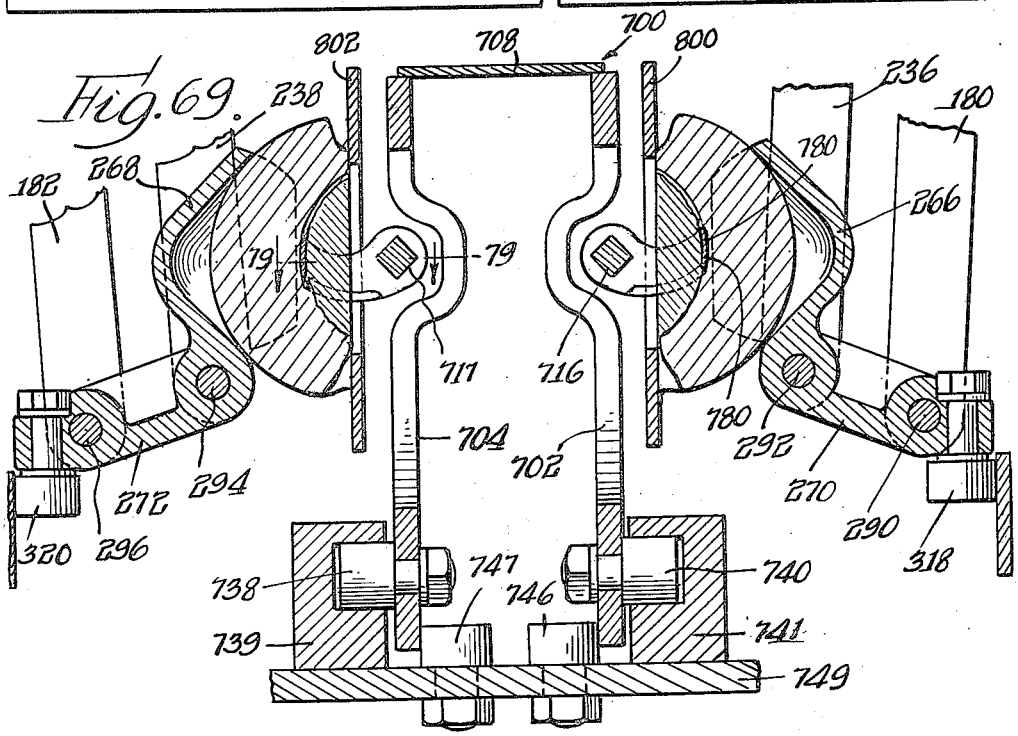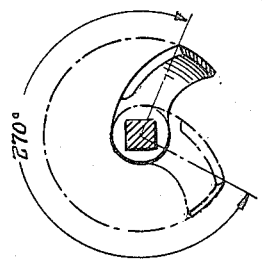

Dec. 22, 1959   T. B. KEESLING   2,918,098
FRUIT ORIENTATOR, SPLITTER AND PITTER
Filed March 3, 1953   45 Sheets-Sheet 38
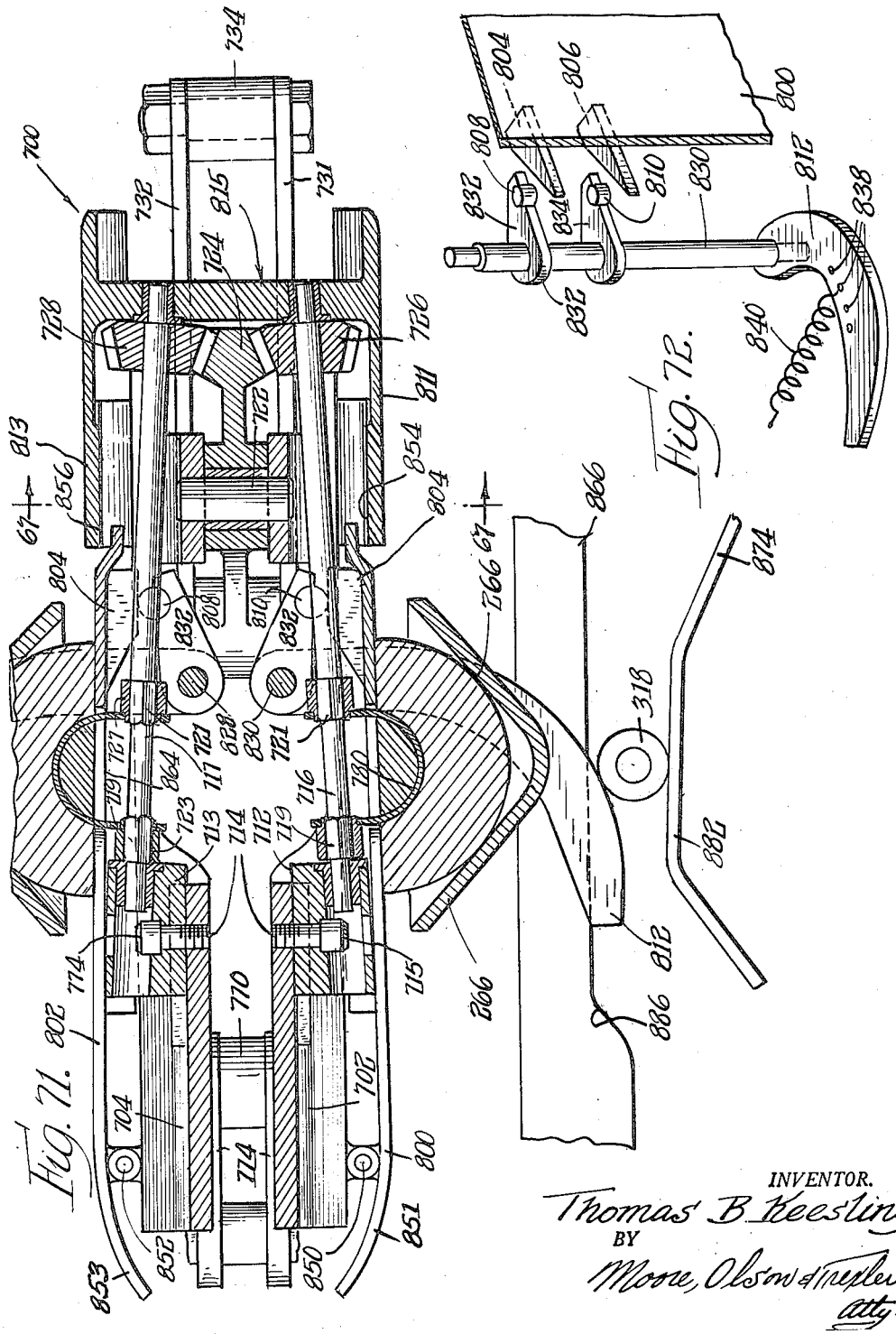
INVENTOR.
Thomas B. Keesling
BY
Moore, Olson & Trexler
Attys.

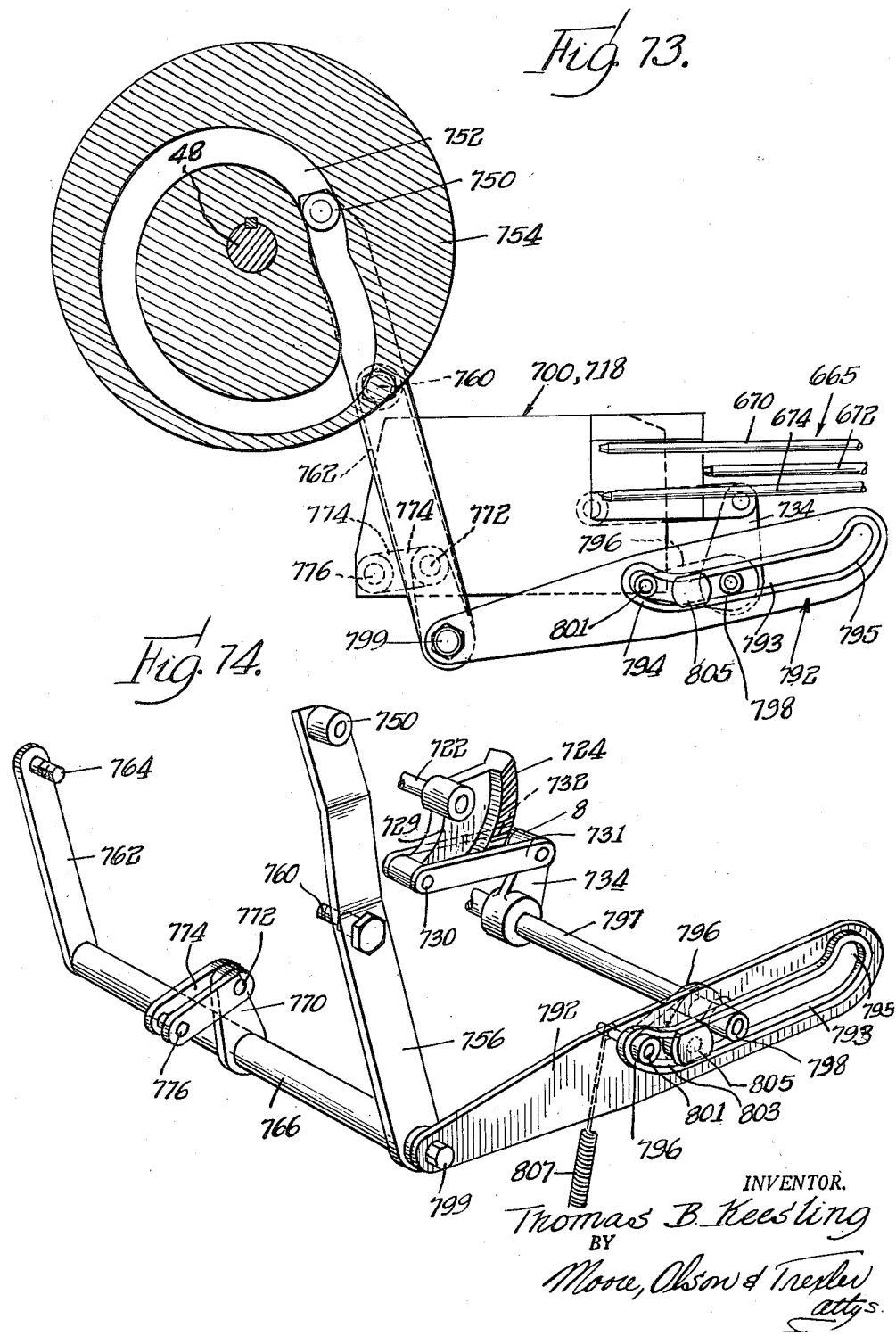

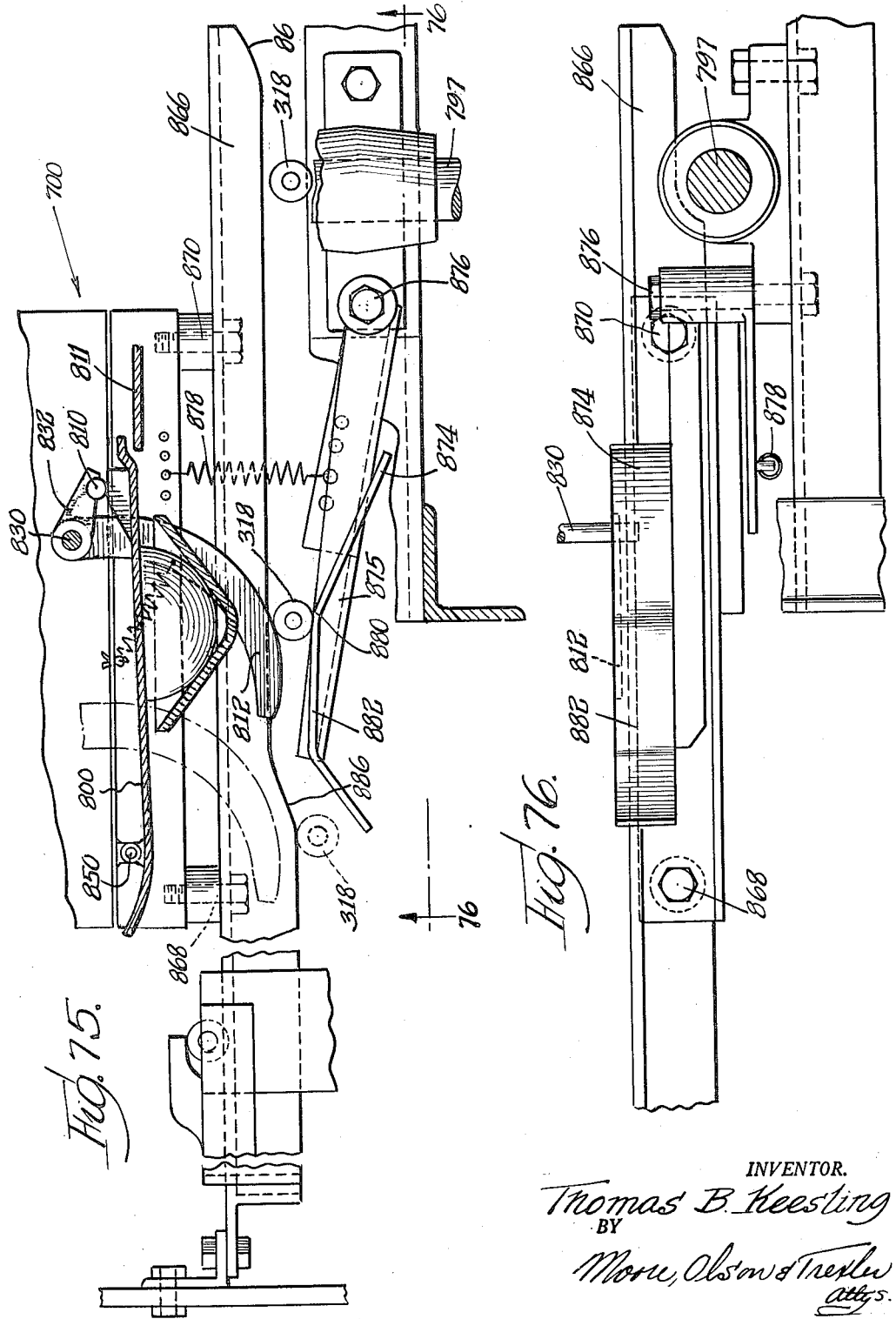

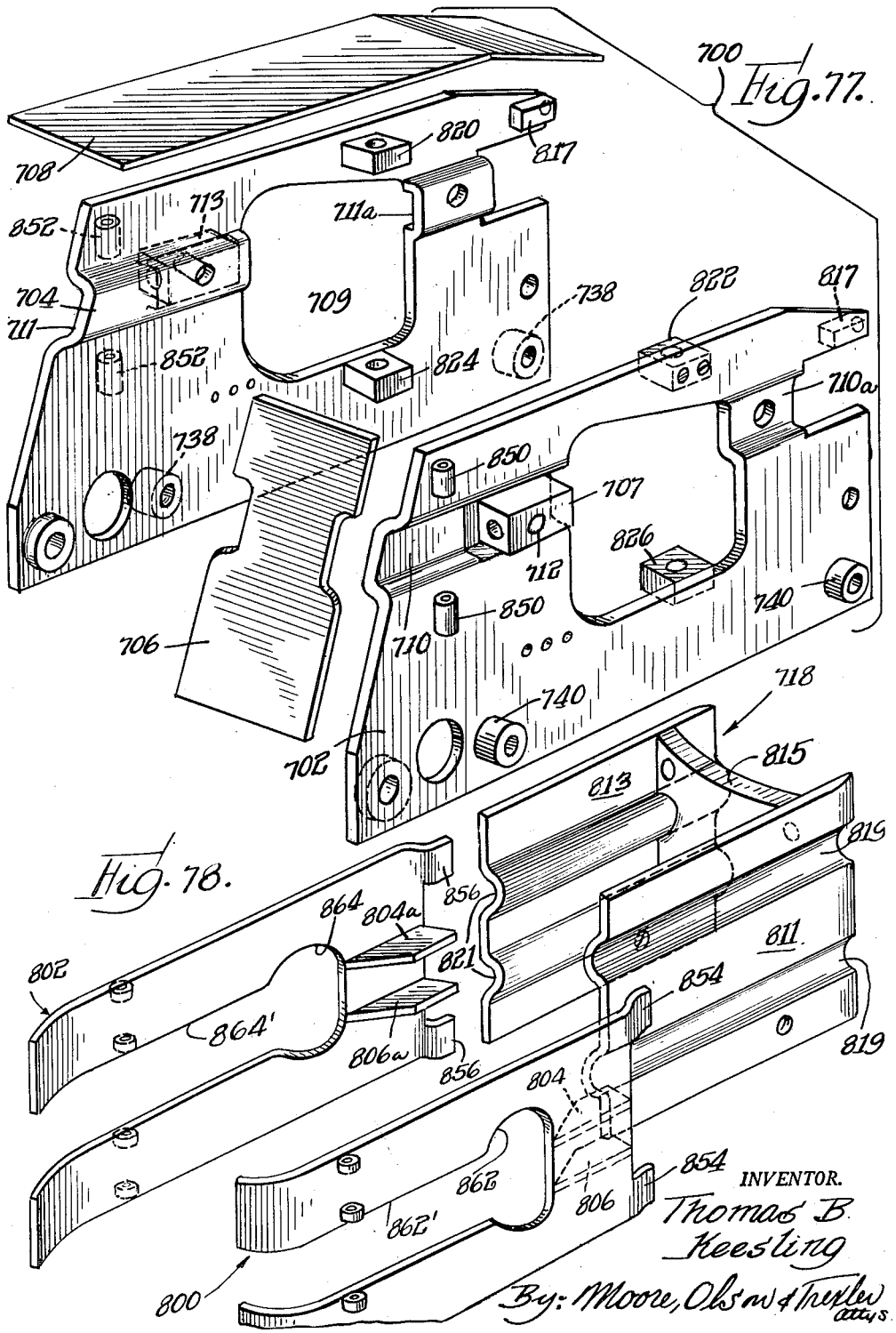

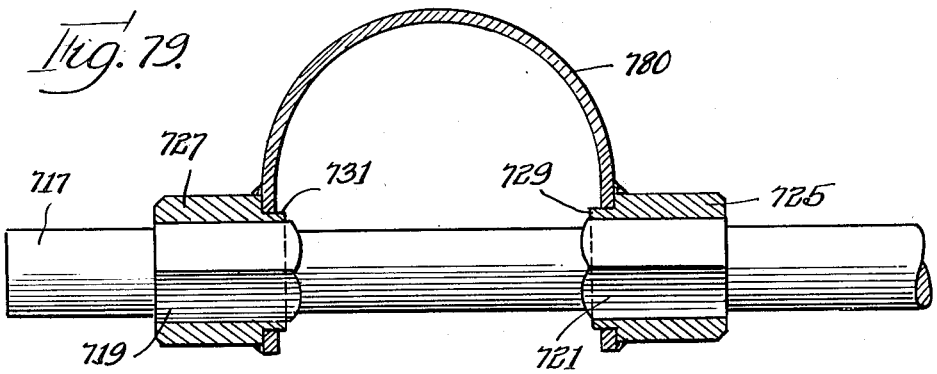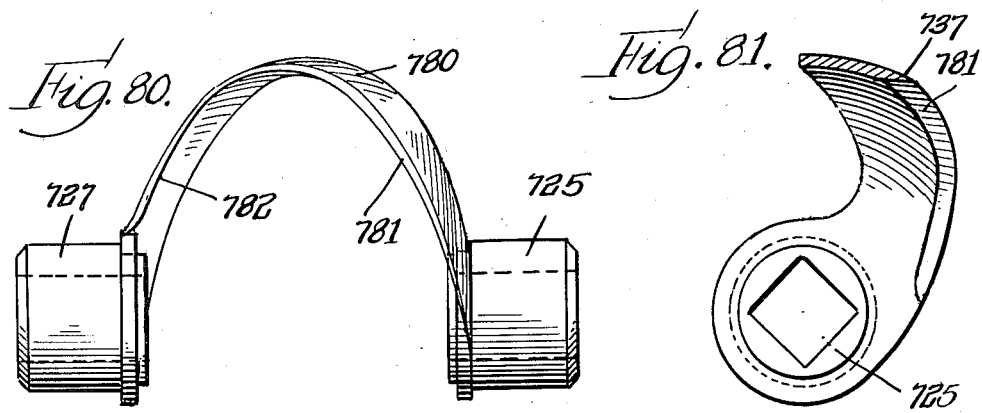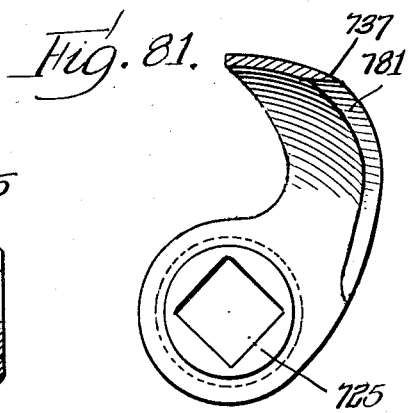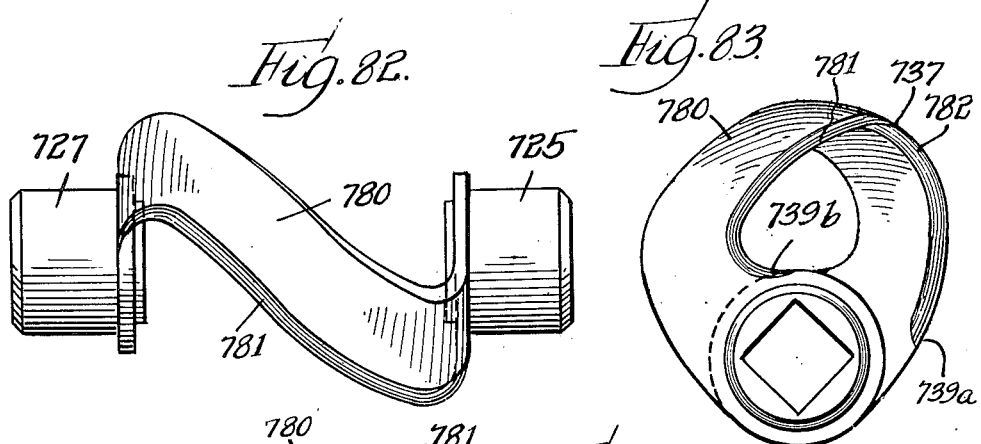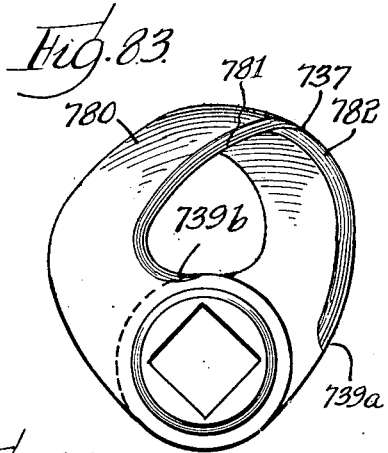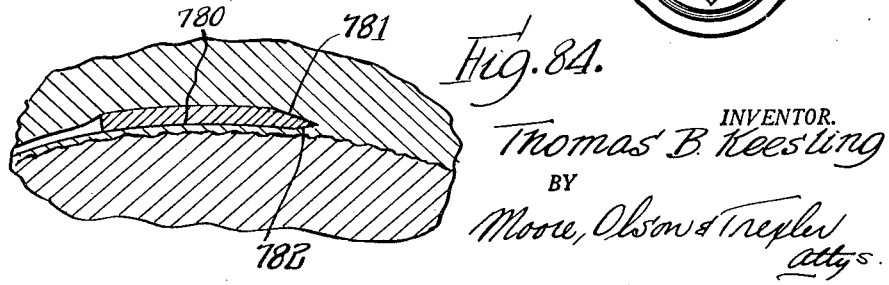

Dec. 22, 1959 T. B. KEESLING 2,918,098
FRUIT ORIENTATOR, SPLITTER AND PITTER
Filed March 3, 1953 45 Sheets-Sheet 43
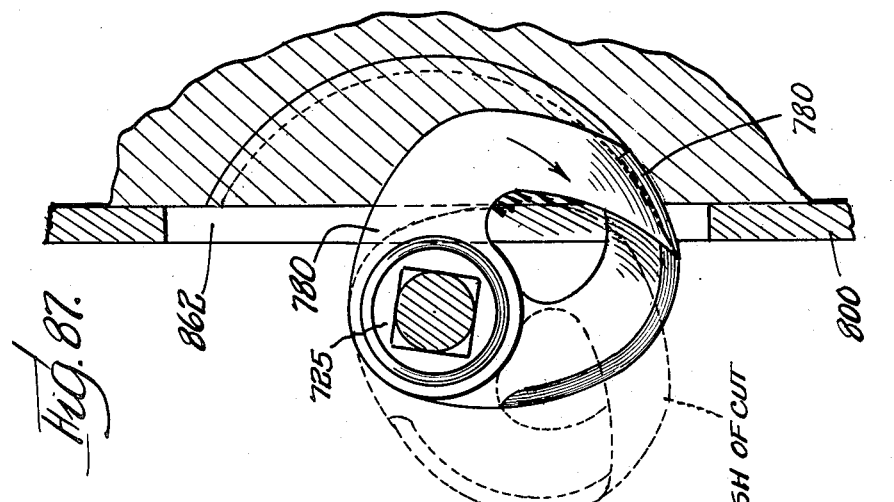
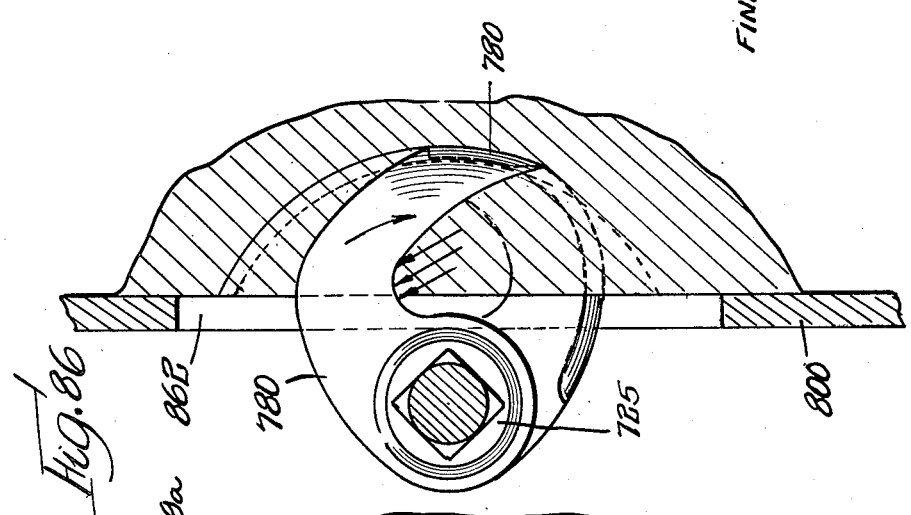
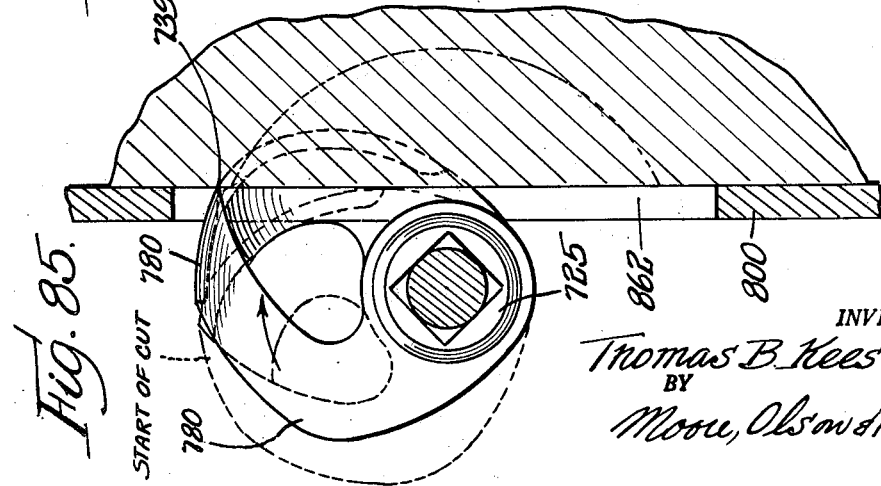
INVENTOR.
Thomas B. Keesling
BY
Moore, Olson & Trexler
attys.

Dec. 22, 1959     T. B. KEESLING     2,918,098
FRUIT ORIENTATOR, SPLITTER AND PITTER
Filed March 3, 1953     45 Sheets-Sheet 44
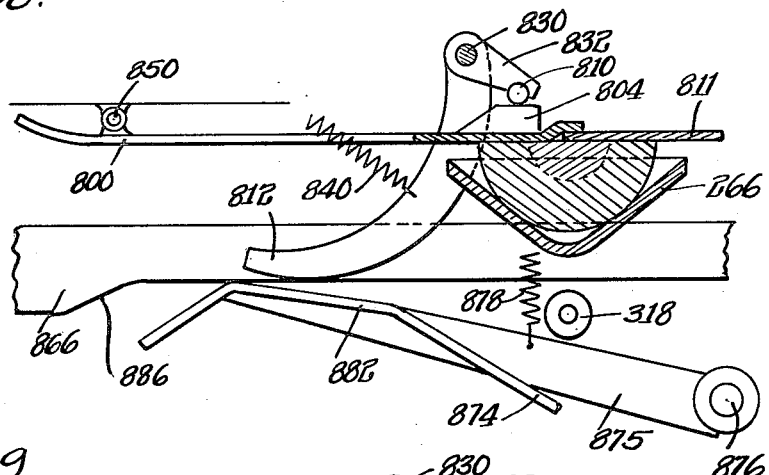
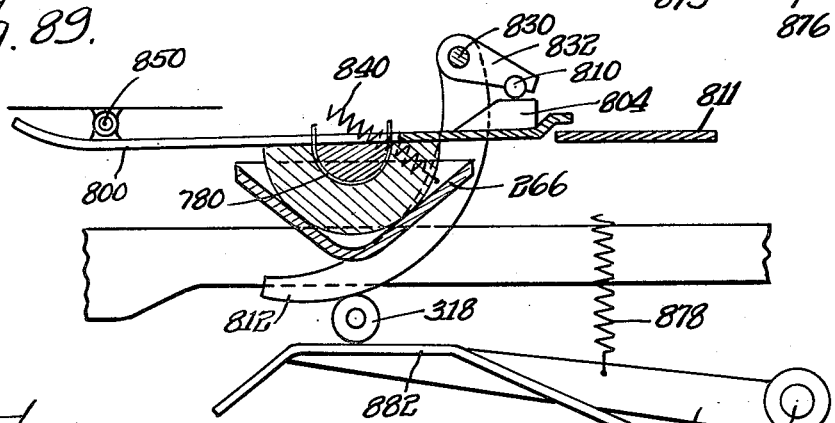
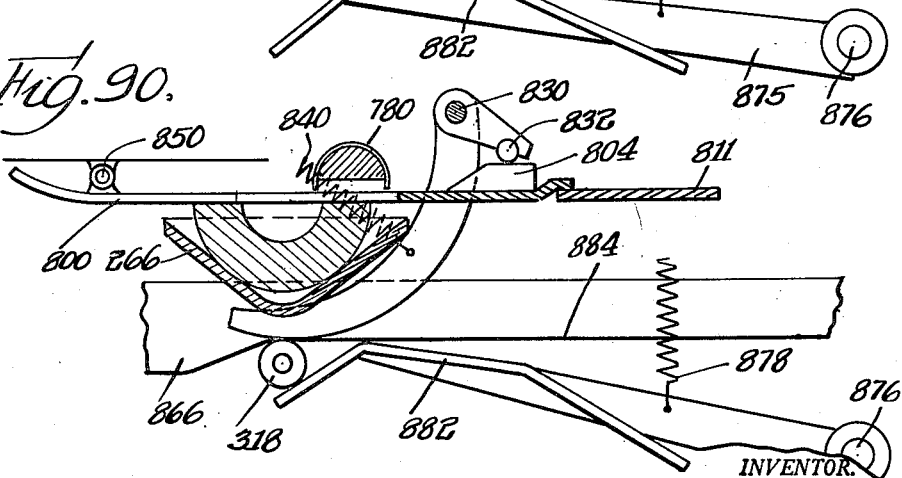
INVENTOR.
Thomas B. Keesling
BY
Moore, Olson & Tresler
attys.

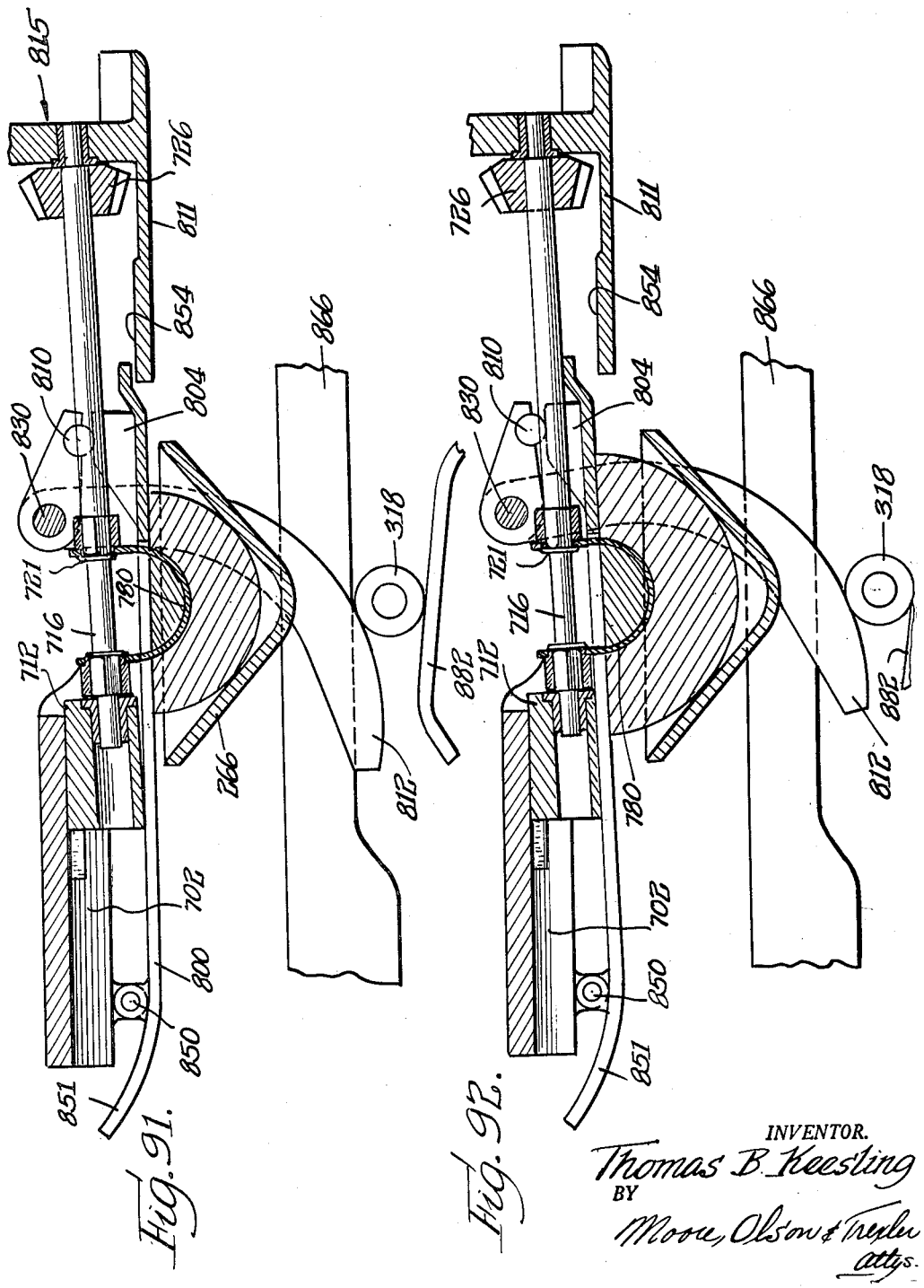

United States Patent Office 2,918,098
Patented Dec. 22, 1959

2,918,098

FRUIT ORIENTATOR, SPLITTER AND PITTER

Thomas B. Keesling, Los Gatos, Calif., assignor, by mesne assignments, to Canning Equipment Co., Olympia, Wash., a corporation of Washington Application March 3, 1953, Serial No. 340,047

5 Claims. (Cl. 146—28)

This invention relates to a method and apparatus for processing peaches and like fruit.

An object of the invention is to provide a new and improved machine for orienting peaches or like indented and sutured fruit as to indent and suture plane while the fruit is being fed at a uniform, constant, high rate of speed.

Another object of the invention is to provide new and improved means for inspecting fruit, while it is traveling at a high rate, to determine whether the fruit has been properly oriented for feeding to subsequently effective fruit processing mechanisms, such as splitting and pitting mechanisms.

Another, primary object of the invention is to provide a simplified, unitary machine requiring only a single fruit conveyor, for orienting peaches or like indented and sutured fruit for inspecting the fruit as to orientation, for splitting the properly oriented fruit and for simultaneously pitting the split fruit halves, all while the fruit is being moved continuously at a uniform, constant, high rate of speed.

Machines have heretofore been proposed for orienting peaches or like fruit, thereafter splitting the properly oriented fruit along its suture plane and thereafter pitting the split fruit halves, but such machines as heretofore proposed have required the use of two or more fruit conveyors and transfer mechanisms for transferring the fruit after orientation from one conveyor to another conveyor by which the fruit is carried to the splitting and pitting mechanisms. It is an essential object of this invention to provide a machine accomplishing those results but rendering unnecessary the use of more than one fruit conveyor.

A more specific object of the invention is to provide a fruit orienting, splitting and pitting machine in which the fruit is carried by a continuous or endless conveyor and is oriented as to indent or suture plane as the fruit is carried along the upper reach of the endless conveyor and in which the fruit thereafter is inspected as to orientation and split and pitted while being carried along the lower reach of the endless conveyor and also in which improperly oriented fruit is discharged by gravity from the machine while it is being carried along the lower reach of the endless conveyor and in advance of the splitting mechanism.

Other and further objects of the invention are to provide new or improved means for confining the whole fruit on fruit rotating and orienting wheels in such manner as to permit substantially free rotation of the fruit upon the rotation of said wheel; to provide in a fruit orienting mechanism fruit holding or confining means, cups or clamps which are movable between closed fruit gripping positions and partially opened positions in which the holding means is spaced from the confined fruit a predetermined distance which is uniform regardless of the size of the fruit in the holding means; to provide in an orienting machine or mechanism new or improved fruit holding means or clamps for centralizing the fruit in both vertical and horizontal planes and with respect to an orienting member or wheel; to provide new and improved fruit holding cups or clamps confining the whole fruit in engagement with an orienting member or wheel by which the fruit is rotated and constructed to facilitate the free and continuous turning of the fruit by the orienting member or wheel; to provide in a fruit orienting machine a continuously moving endless conveyor having a plurality of fruit receiving carriages each supporting an orienting unit including a rotatable member or wheel and means for continuously rotating said member or wheel about a horizontal axis during a predetermined portion of the path of conveyance of the carriages by the endless conveyor; to provide in an orienting, splitting and pitting machine new and improved fruit receiving and holding carriages; to provide new and improved means for feeding fruit into a continuous fruit orienting machine in such manner that each fruit receiving carriage of the orienting machine is supplied with a whole fruit and the machine thereby operated at all times at substantially full capacity; to provide a fruit orienting machine or mechanism in which the fruit orienting member is employed as an orientation sensing member for inspecting the fruit as to orientation and controlling mechanism for ejecting, or permitting the ejection of, improperly oriented fruit from the machine or mechanism; to provide fruit orientation inspection means employing a turnable sensing member engageable with the fruit and means responsive to the resistance of fruit by the engaged fruit to the turning of said member to control the operation of a fruit discharging mechanism; to provide new and improved means for mounting fruit orienting units upon a series of fruit receiving carriages, clamps or cups so as to effect the withdrawal of the orienting units from orienting positions in engagement with the fruit to permit splitting and pitting of the fruit without interfering with the movement of the fruit carriages, clamps or cups at a constant, uniform, high rate of speed; to provide in a fruit splitting, bisecting or sawing, pitting or deseeding machine, wherein the fruit is fed to the splitting, bisecting and pitting mechanisms at a continuous, uniform rate, new or improved means for spreading or separating the fruit halves after bisecting and while the fruit is being carried at such continuous, uniform rate, from the bisecting mechanism to the pitting or deseeding mechanism; to provide in a fruit pitting mechanism having a fruit pitting knife and an apertured fruit pitting plate movable toward and from each other, new and improved means for automatically adjusting a knife and plate relative to each other in accordance with the sizes of the half fruit brought into engagement with the pitting plate whereby to vary the pitting cut of the pitting knife in accordance with the sizes of the half fruit; to provide a new and improved pitting mechanism for pitting fruit halves as they are fed at a continuous, uniform rate; to provide improved or simplified driving mechanism for a traveling pitter and to provide a pitting mechanism capable of pitting fruit halves as they are fed at a continuous, uniform rate along the lower reach of an endless conveyor.

These and other objects and advantages of the invention will be evident from the following description when taken in connection with the accompanying drawings wherein:

Figs. 1 and 1a are related views in vertical elevation of a machine embodying the present invention;

Fig. 2 is a view in elevation of the opposite side of the machine of Figs 1 and 1a, illustrating however only part of the device for feeding fruit into the machine;

Fig. 3 is a fragmentary plan view of certain guide tracks and camways forming part of the machine;

Fig. 4 is a view in vertical section taken substantially along the line 4—4 of Fig. 2;

Fig. 5 is a plan view of the device for feeding or supplying fruit to the machine;

Fig. 6 is a side view of the device of Fig. 5;

Fig. 7 is a fragmentary view in vertical section taken substantially along the line 7—7 of Fig. 6;

Fig. 8 is an enlarged fragmentary view in horizontal section taken substantially along the line 8—8 of Fig. 2;

Fig. 9 is a fragmentary view in elevation, and partly in section, taken along the line 9—9 of Fig. 8;

Fig. 10 is a plan view, partly in section, of the driving mechanism of certain fruit orienting units forming part of the present machine;

Fig. 11 is a fragmentary view in vertical section taken substantially along the line 11—11 of Fig. 10;

Fig. 12 is a view illustrating the development of a drive cam for oscillating certain fruit orienting, or orientation sensing, members, forming part of the present machine;

Fig. 13 is a fragmentary plan view taken generally along the line 13—13 of Fig. 2 with certain parts removed for purposes of illustration;

Fig. 14 is a fragmentary view in vertical section taken generally along the line 14—14 of Fig. 8;

Fig. 14a is a fragmentary view in vertical section taken along the line 14a—14a of Fig. 4;

Fig. 15 is a fragmentary view in vertical section taken along the line 15—15 of Fig. 13;

Fig. 16 is a fragmentary view in horizontal section taken generally along the line 16—16 of Fig. 15;

Fig. 17 is a fragmentary view in vertical section taken along the line 17—17 of Fig. 13;

Fig. 18 is a view in horizontal section taken along the line 18—18 of Fig. 17;

Fig. 19 is a view in vertical section taken along the line 19—19 of Fig. 2;

Fig. 20 is a view in horizontal section taken along the line 20—20 of Fig. 14a;

Fig. 20a is a fragmentary view in vertical section taken generally along the line 20a—20a of Fig. 20;

Fig. 20b is a view in vertical section taken along the line 20b—20b of Fig. 20c;

Fig. 20c is a view in vertical section taken along the line 20c—20c of Fig. 20b;

Fig. 21 is a fragmentary view, partly broken away, in vertical section taken along the line 21—21 of Fig. 10;

Fig. 22 is a fragmentary view in horizontal section taken generally along the line 22—22 of Fig. 14a;

Fig. 23 is a view in vertical section taken along the line 23—23 of Fig. 21;

Fig. 24 is a view in vertical section taken substantially along the line 24—24 of Fig. 21;

Fig. 25 is an enlarged view in vertical section taken along the line 25—25 of Fig. 1;

Fig. 26 is a view in elevation looking along the line 26—26 of Fig. 25;

Fig. 27 is an enlarged fragmentary view in vertical section taken substantially along the line 27—27 of Fig. 14;

Fig. 27a is an enlarged fragmentary view in vertical section taken substantially along the line 27a—27a of Fig. 14;

Fig. 27b is an enlarged fragmentary view in vertical section taken substantially along the line 27b—27b of Fig. 14;

Fig. 28 is a view in horizontal section taken along the line 28—28 of Fig. 27a;

Fig. 29 is a view in perspective of a fruit orienting unit forming part of the present machine;

Fig. 30 is a view in exploded perspective of the unit of Fig. 29;

Fig. 31 is a view in vertical section taken along the line 31—31 of Fig. 27a;

Fig. 32 is a view in elevation looking along the line 32—32 of Fig. 27a;

Fig. 33 is a view in exploded perspective of a fruit transporting unit forming part of the present machine;

Fig. 34 is an enlarged view in vertical section taken generally along the line 34—34 of Fig. 29.

Fig. 35 is a view in vertical section taken along the line 35—35 of Fig. 34, but illustrating a fragment of a peach in engagement with the orienting wheel unit;

Fig. 35a is a view similar to Fig. 35, but illustrating the relative position of the fruit and wheel after orientation;

Fig. 36 is an enlarged view in section taken along the line 36—36 of Fig. 35;

Fig. 36a is a view in vertical section illustrating a portion of the mechanism shown in Fig. 36;

Fig. 37 is a fragmentary view in vertical section taken along the line 37—37 of Fig. 35a;

Fig. 37a is a fragmentary view in perspective of a fruit orienting wheel, or suture sensing member, forming part of the fruit orienting unit;

Fig. 38 is a view in elevation of a fruit receiving or restraining member, or receptacle half, forming part of the present machine;

Fig. 39 is a fragmentary view in elevation illustrating the manner in which the fruit receptacles grip the fruit;

Fig. 40 is a fragmentary view in vertical section taken generally along the lines 40—40 of Fig. 39;

Fig. 41 is a plan view illustrating the gripping of a fruit in the fruit receptacle;

Fig. 42 is a diagrammatic illustration of the fruit receiving or restraining receptacle half;

Fig. 43 is an enlarged view in vertical section taken substantially along the line 43—43 of Fig. 2;

Fig. 44 is an enlarged view in vertical section taken generally along the line 44—44 of Fig. 2;

Fig. 45 is a fragmentary view in horizontal section taken substantially along the line 45—45 of Fig. 44;

Fig. 46 is a view in elevation looking along the line 46—46 of Fig. 45;

Fig. 46a is a detail perspective view of part of the inspector mechanism;

Fig. 47 is a view in horizontal section taken generally along the line 47—47 of Fig. 48;

Fig. 48 is a view in elevation, partly in section, looking along the line 48—48 of Fig. 47;

Fig. 49 is a fragmentary view in vertical section taken along the line 49—49 of Fig. 48;

Fig. 50 is a fragmentary view of an inspector mechanism control track, forming part of the present machine;

Fig. 51 is a view in elevation looking substantially along the line 51—51 of Fig. 50;

Fig. 52 is a fragmentary view in vertical section taken substantially along the line 52—52 of Fig. 50;

Fig. 53 is a fragmentary view in vertical section taken substantially along the line 53—53 of Fig. 50;

Fig. 54 is a fragmentary view in vertical section taken along the line 54—54 of Fig. 50;

Fig. 55 is an enlarged fragmentary view in horizontal section taken substantially along the line 55—55 of Fig. 4;

Fig. 56 is a view in vertical section taken along the line 56—56 of Fig. 55;

Fig. 57 is an enlarged fragmentary view in vertical section taken along the line 57—57 of Fig. 1;

Fig. 58 is a view in vertical section taken along the line 58—58 of Fig. 56;

Fig. 59 is a fragmentary view in horizontal section taken along the line 59—59 of Fig. 2;

Fig. 60 is a view in elevation, and partly in section, looking along the line 60—60 of Fig. 59;

Fig. 61 is an enlarged fragmentary view in vertical section taken along the line 61—61 of Fig. 60;

Fig. 62 is an enlarged, fragmentary plan view looking along the line 62—62 of Fig. 19;

Fig. 63 is a view in elevation looking along the line 63—63 of Fig. 62;

Fig. 66 is a fragmentary view in vertical section taken along the line 66—66 of Fig. 63;

Fig. 67 is a view in vertical section taken along the line 67—67 of Fig. 71;

Fig. 68 is a fragmentary view in horizontal section, partly broken away, taken along the line 68—68 of Fig. 63;

Fig. 69 is a fragmentary view in vertical section taken along the line 69—69 of Fig. 63;

Fig. 70 is a view in vertical section illustrating the operation of a pitting knife forming part of the present machine;

Fig. 71 is a view in horizontal section taken along the line 71—71 of Fig. 63;

Fig. 72 is a detail perspective view of part of the gauging mechanism;

Fig. 73 is a fragmentary view in vertical section taken along the line 73—73 of Fig. 19;

Fig. 74 is a fragmentary perspective view of a portion of the drive mechanism for the pitting unit forming a part of the present invention;

Fig. 75 is a plan view, partly in section, taken along the line 75—75 of Fig. 66;

Fig. 76 is a sectional view taken on the line 76—76 of Fig. 75;

Figs. 77 and 78 are views in exploded perspective of parts of the pitting unit;

Fig. 79 is an enlarged view in horizontal section taken along the line 79—79 of Fig. 69;

Fig. 80 is a view in elevation of the pitting knife;

Fig. 81 is a view in vertical section through the pitting knife;

Fig. 82 is a plan view of the pitting knife;

Fig. 83 is an end view of the pitting knife;

Figs. 84 to 87 are diagrammatic views illustrating the movement of the pitting knife into and through the flesh of the fruit around the pit to pit the fruit.

Figs. 88 to 90 are views similar to Fig. 75 showing progressive movement of the fruit during the pitting operation;

Fig. 91 is a view similar to Fig. 71 showing a relatively small peach being pitted;

Fig. 92 is a view similar to Fig. 71 showing a relatively large peach being pitted.

Figure 64:
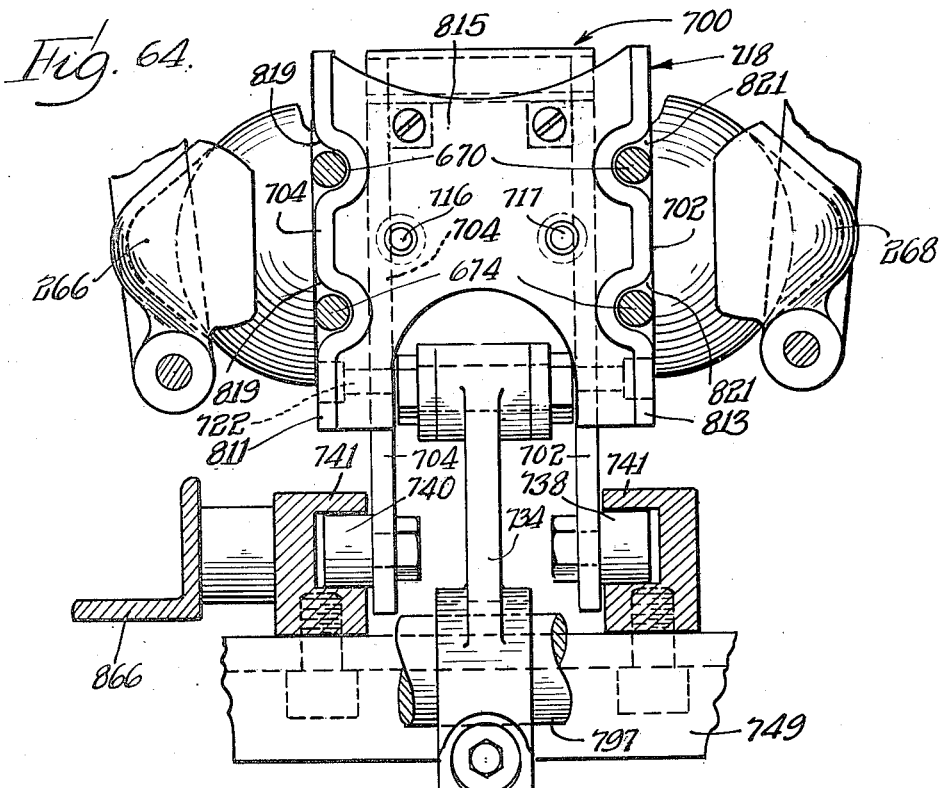
Fig. 64 is a view in vertical section taken along the line 64—64 of Fig. 63.

Referring now to the drawings in detail, a preferred embodiment of a machine constructed in accordance with the present invention comprises a main frame A, Figs. 1, 1a and 2; a main drive mechanism or unit B, Fig. 1; a fruit feeding or supplying device or means C; main fruit conveying means or conveyor D, including a plurality of identical fruit receiving, clamping and transporting units or carriages E carrying fruit orienting units, devices or means F, Fig. 4, one for each of the fruit transporting units or carriages E; driving means G, Fig. 11, for the fruit orienting units F; common actuating means H, Fig. 20, for vibrating or oscillating the orienting units in succession; orientation inspecting mechanism J, Fig. 13; a fruit rejecting mechanism or means K controlled by the inspector mechanism J and controlling the opening of the fruit receiving units E to discharge fruit not properly oriented by the time it passes the inspector mechanism; fruit bisecting or sawing means L, Figs. 1 and 2, for splitting the oriented whole fruit along its suture plane; fruit spreading means M, Figs. 2 and 59, receiving the fruit halves from the splitting or sawing means and moving the fruit halves and the clamps of the fruit receiving units E to a spread apart position as the units pass beyond the splitting or sawing means L, and pitting or deseeding means N, Figs. 2 and 62, receiving the fruit halves passing from the end of the spreading means and thereafter moving at the same rate as the moving fruit halves simultaneously to pit the fruit halves without interfering with the continuous movement of the fruit carriages, the fruit halves after pitting being discharged by gravity from the fruit carriages and deposited on a continuously moving belt conveyor (not shown).

*The main frame and the main driving mechanism*

The main frame A of the machine comprises four angle bar uprights 10, 11, 12 and 13, Figs. 1, 2 and 3, joined by lower angle bars 14, 15, 16 and 17, and by upper angle bars 18, 19, 20 and 21, Figs. 1, 2 and 4. Front end main frame castings 22 and 23 (Figs. 1 and 2) are bolted to the front uprights 10 and 13 and rear main frame castings 24 and 25 are bolted to the rear uprights 11 and 12. The side bars 14, 15, 16 and 17 are tied together by cross bars 26, 28, 30, 32 and 34 (Figs. 1, 2 and 4). The front end castings are joined by a rigidifying brace 35, and the rails 18, 19, 20 and 21 are joined by brackets 36, 37 and 39 (Figs. 2, 3 and 4). The side frame bars and end castings are also tied together by an oscillator shaft 41 (Figs. 2 and 20), by a rear end cross shaft 43 (Fig. 2), and also by an inspector supporting bracket 45 (Figs. 13, 14a, 20 and 44). As shown in Fig. 2, the channel irons 32 and 34 provide a rigid platform for the combined motor and gear unit 38. The high speed shaft M-1 of this unit is driven at a preferred standard speed of 1800 r.p.m. and carries a pulley 38b. The other shaft M-2 of the motor is the slow speed shaft of the combined motor and gear unit 38 and supports and drives a small sprocket 40 (see Fig. 1), which in turn drives a roller chain 42, which in turn drives a large sprocket 44, which is part of a clutch assembly shown in Figs. 1, 4, 19, 25 and 26.

With respect to this clutch assembly, it will be seen that the large sprocket 44 is mounted on a plate 46 which has a hub 47 which is supported on a bushing surrounding the cross shaft 48. Mounted upon the sleeve 47 of the clutch plate 46 is a disk 49 which is provided with an annular shoulder 50 which receives the large sprocket 44. The disk 49 is bolted to the plate 46 by means of bolts 51. The plate 46 has attached to its opposite face by means of bolts 52 a friction plate 53 the free face of which engages the friction plate 54 which is keyed as at 55 to the cross shaft 48. A cross pin 56 locks the clutch disk 54 to a pinion 57. A shear pin 58 drivingly connects the sprocket 44 with the disk 46. This shear pin has a shearing strength such as to carry the normal load of the machine, but if something should go wrong, or some part should get stuck, or something in the machine should break and jam, this extra load would shear off this pin, and thereby the power from the machine would be instantly disconnected, thereby saving many parts which might otherwise be broken.

Means for shifting the clutch parts between driving and released positions is shown particularly in Figs. 1, 19, 25 and 26. To this end, a bracket 59 is bolted as at 60 to the lower part of the casting 22. This bracket in turn supports a clutch yoke 61 which is pivoted as at 62. The upper end of this yoke 61 is pivotally connected to a cross link 63 which in turn is pivoted as at 64 to the base 65 of a handle 66 which base in turn is pivoted at 67 to an upper bracket 68 by the bolts 69 on the casting 22.

The central portion 70 of the yoke 61 is provided with a pair of rollers 71 which engage the flange of a collar 72 slidably mounted on the cross shaft 48. This collar is urged inwardly by a spring 73. The opposite end of this spring is anchored against a hand wheel 74 keyed to the shaft 48, by means of the key 75, and the hand wheel is prevented from being disengaged from the shaft by a disk and bolt 76. The casting 22 is provided with a boss 77 which receives a bearing bushing 78 for the cross shaft 48, the bushing being held in position by a collar 79 secured by a set screw 80 to the shaft 48. A collar 81 is interposed between the collar 72 and the hub 47 so that the spring 73 urges the plate 46 and friction disk 53 toward the plate 54.

As shown in Fig. 25 the clutch is in engaged position. To release the clutch the handle 66 is moved counterclockwise and through the linkage and the connections hereinbefore described, the collar 72 is moved to the left, against the spring pressure, and the collar 81, also moving to the left, causes the clutch members 53 and 54 to be disengaged and thereby disconnect the shaft 48 from the sprocket 44. On movement of the handle 66 in the clockwise direction, from the release position, the spring 73 moves the clutch disk 53 into driving relation with the clutch plate 54 and the pinion 57 is driven.

As shown in Fig. 1, a gear 84, meshing with gear 57, is fixed or attached to a sprocket 82 keyed to the shaft 85. This shaft 85 is one of the main shafts of the machine and provides the power for driving of the main fruit conveying means or chain conveyor D.

The fruit feeding or supplying device

As shown in Fig. 1, the sprocket 82 drives a roller chain 83 passing over a sprocket 87 secured to a cross shaft 88 journaled in brackets 98 adjustably secured to castings 22 and 23 (Figs. 1, 2, 5 and 6). A second sprocket 89 is secured to the shaft 88 and drives another roller chain 90, which in turn drives a sprocket 91 on a cross shaft 92. The shaft 92 is supported by a pair of bracket plates 93 (Figs. 5 and 6) which support an infeed trough or chute 94 into which the whole fruits are rolled (from a fruit feeding belt—not shown) and along which chute they are fed or assisted by a feed belt 96. The chute 94 may be horizontal so that the feed belt advances the peaches therealong although in the preferred embodiment shown herein the chute is inclined at a relatively small angle and comprises an elongated troughlike member, downwardly inclined, and preferably formed of spaced bars 95 arranged in substantially V-shaped formation and cross-connected to V-bars 95a as shown in Figs. 5 to 7. Between the bottommost slats 95 of the feed trough passes the V-belt 96 which is provided so that if a flat spot on any of the fruit should land on a bar 95, the V-belt keeps the peaches rolling downwardly. The belt 96 is driven by a pulley 96a secured to shaft 92 and passes at its upper end about a pulley 96b, mounted on a shaft 96c adjustably mounted in brackets 96d secured to bars 95. The pair of spaced brackets 98 are adjustably secured to the castings 22 and 23 by means of bolts 99 (Fig. 6) and slots 99a whereby these two brackets may be adjusted circumferentially of the main cross shaft 85.

As shown clearly in Fig. 5, two arcuate guideways 100 and 102 which are generally V-shaped in cross section are secured to the spaced bracket plates 93, hereinbefore described. A feed wheel 103 is pinned to shaft 88 and rotates between the guideways 100 and 102 so as to deliver the peaches individually to the fruit receivers of the main conveyor D. This feed wheel 103 is so designed that it will pick up only one peach at a time, whether a large peach follows a small peach or a small one follows a large one or if successive peaches are all of the same size.

The feed wheel 103 includes a plurality of equally spaced apart feeding members or arms 104 of the shape shown in Figs. 5 and 6. Each one of these feeding arms of the feeding member 104 includes a relatively broad feed surface 104a which is slightly of concave shape as shown at 104b, so as to center the fruit or peach transversely thereof and position the peach as it comes from the feed chute so that it will be delivered centrally between the fruit clamps as hereinafter described.

As shown in Figs. 1 and 6, the cross bracket 35, which is secured to the castings 22 and 23, supports a bracket 101 which carries an adjusting screw 101a fixed to a yoke 101b, the screw and nuts 101c and 101d permitting an adjustment of the yoke 101b with respect to the bracket 101 so that the inclination of the feed trough 94 may adjustably be determined. The yoke 101b is bolted to the bracket plates 93 formed with bosses 102a pivotally adjustable about shaft 88.

The two arcuate guideways 100 and 102 are secured to the inner faces of the bracket plates 93 and 94.

Within a range of peach sizes, the feed belt may be driven at a constant speed, but it has been found that it is necessary to adjust the speed of the belt to accommodate runs of peaches of widely different sizes. Thus, if a run of peaches of the smaller sizes is encountered, e.g., peaches of two and one-half inches in diameter, it is necessary to reduce the speed of the belt to prevent the feeding, from time to time, of two peaches at a time to the main conveyor. Similarly, if a run of peaches of the larger sizes is encountered, e.g., peaches of three and one-half inches in diameter, it is desirable to increase the speed of the belt to insure that each paddle of the feed wheel will receive, and therefore feed a peach to the main conveyor. Any variable speed element may, for that purpose, be inserted in the drive mechanism for the belt 96, but it is preferred to replace the drive sprocket 91 for the feed belt 96 (where such extreme sizes of peaches are likely to be encountered) with a quickly adjustable drive known as a "reeve drive."

Main fruit conveyor and carriages

The main fruit conveying means or conveyor D comprises, as best seen in Figs. 1, 4, 8, 13, 14, 14a, 19, 27 to 27b, 43, 44 and 58, parallel endless chains 106 and 108, passing at the forward end of the machine about drive sprockets 110 and 112 secured to the main drive shaft 85 and at the rear end of the machine about sprockets 114 and 115 journaled on cross shaft 43. Since the shaft 85 is driven continuously at a uniform, constant rate whenever the main clutch is engaged, the conveying chains 106 and 108 are driven continuously at a constant, uniform rate.

The fruit receiving, clamping, and transporting units or carriages E comprise a plurality of identical units spaced the same distance one from another throughout the entire length of the conveying chains 106 and 108, as best seen in Figs. 1 and 2.

Each such unit or carriage comprises, as best seen in Figs. 4, 14, 14a, 19, 27 to 28, 31 to 33, 43, 44 and 58, a plate-like member or base plate 114, best seen in Fig. 33. At its opposite ends this generally rectangular plate 114 is provided with vertical bosses 116 and 118 having openings 120 and 122 and outstanding arms 124, 126, 128 and 130. One end of the plate 114 is also provided with a depending lug 132 provided with a threaded hole 136 to receive an adjustable stop pin 138 (see Fig. 32) for a purpose presently to appear. The arms 124, 126, 128 and 130 provide supports for the carriage guiding and supporting rollers 140, 142, 144 and 146 journaled on pins bolted to the arms 124 to 130, inclusive. The rollers 140 and 142 of the carriages upon the upper reaches of the chains are guided between upper tracks 148 and 150 (see Fig. 27) bolted or otherwise secured to the rail 21 on one side of the machine and the opposite set of rollers 144 and 146 are guided between the upper tracks 152 and 154 similarly secured to the rail 18. In a similar manner, the guide rollers of the carriages on the bottom reach of the two chains are guided and supported in the lower tracks 156 and 158 secured to the rail 23 on one side of the machine and the lower tracks 160 and 162 secured to the rail 19 on the other side of the machine. As the carriages pass about the front end sprockets 110 and 112, Figs. 8 and 9, the guide rollers 140 and 142 move along an arcuate guideway 163 formed in the end casting 23 while the rollers 144 and 146 move along an arcuate guideway 165 in the end casting 22. Similar arcuate guideways are formed in the rear end castings 24 and 25 to guide the rollers 140 to 146 as the carriages pass about the rear end sprockets 114 and 115. The only points at which these rollers are not totally confined in the tracks are above and below the centers of the end sprockets. At these two places, it is necessary to offset the outer tracks because of the fact that the pair of rollers on each side are spaced apart four inches or more, two inches on either side of the center of the plate 114, and unless the tracks were offset the leading roller of the pair would cause the rear roller to bind in the track as the leading roller passes into or from an arcuate track and from or into a straight track.

Portions 164 and 166 (Fig. 33) adjacent the opposite ends of the plate are bored as at 168 and 170 to receive pivot rods or pins 172 and 174. The rod 172 passes through the openings 192 and 194 of bosses 176 and 178 of a double-link frame 180, and the opposite double-link frame 182 is provided with a pair of similar bosses 184 and 186, suitably bored as at 188 and 190 to receive the rod 174. In this manner the two links 180 and 182 are pivotally mounted upon the opposite ends of the plate 114.

The openings 120 and 122 in the two end lugs 116 and 118 receive the shanks of vertically extending bolts 196 and 198 (see also Fig. 27). The bolt 196 threads into a threaded opening 200 in a block 202 attached to the chain 108. In a similar manner, the bolt 198 passes through the hole 122 in the lug 118 and threads into a block 204 attached to the chain 106.

The plate-like support 114 is provided with a substantially oval central opening 206 which has an upwardly and outwardly bevelled peripheral surface 208. In addition, plate 114 is provided with a forwardly extending carriage-spacer portion 210. Opposite this extension, each plate 114 is provided with a pair of depending ears or lugs 212 and 214. These ears are perforated as at 216 and 218 for the purpose of receiving a mounting rod 220 (see Figs. 14, 29, 31 and 32) for a fruit orienting unit F, hereinafter described.

Each supporting plate 114 is also provided with a pair of spaced apart elongated bosses 224 and 226 which are bored as at 228 and 230 to receive rods 232 and 234 (Fig. 33). These rods 232 and 234 form pivot supports for another pair of double-link frames 236 and 238 provided with perforated lugs 240, 242, 246 and 248, lug 242 being provided with an elongated extension 244. The link frame 236 is also provided with a pair of spaced arms 250 and 252, perforated as at 254 and 256. In a similar manner, the link frame 238 is provided with a pair of parallel arms 258 and 260 perforated as at 262 and 264.

The link frames 180, 182, 236 and 238 form mounting means for a pair of whole fruit receiving clamps, cups or receptacles composed of individual cup sections 266 and 268, best seen in Figs. 27, 28, 31, 33, and 38 to 44, and hereinafter described in detail. These clamps, cups or cup sections 266 and 268 are provided with preferably integrally extending arms 270 and 272. These arms extend backwardly from the mouth or edges of the cup sections at an angle of 20°. As seen in Fig. 33, the arm 270 has a pair of elongated parallel bosses or sleeves 274 and 276 and the arm 272 is provided with parallel bosses or sleeves 278 and 280. These sleeve are bored as at 282, 284, 286 and 288 to receive pivot pins 290, 292, 294 and 296. The pivot pin 290 is received in a pair of spaced perforated ears 298 and 300 of the link frame 180. In a similar manner, the pivot pin 292 is received in the two lugs 250 and 252 of the link frame 236. Correspondingly, the pivot pins 294 and 296 are received in the openings 262 and 264 of the bosses 258 and 260 of link frame 238 and the perforations 302 and 304 of the bosses 302 and 308 of the link frame 182. In this manner, there is provided two pairs of parallel links or link frames for each cup section, so that the cup sections will always lie in the same vertical plane as they are moved toward and from each other to receive, clamp, and release the fruit. It should be noted that the plane of the axes of the upper pivot pins 290 and 292, or 294 and 296, is parallel to the plane of the axes of the lower pivot pins 172 and 232, or 174 and 234, and inclined to the plane of the plate 114 so that the cup sections approach and recede from the plane of the plate in accordance with the size of the fruit inserted between the cup sections.

The arms 270 and 272 are provided with vertical bosses 310 and 312 perforated to receive bolts 314 and 316, carrying rotatable cup control rollers 318 and 320 which are operated by certain cam tracks as hereinafter described.

The clamp or cup section 268 (see particularly Figs. 28, 33 and 38) is provided in its side walls (which are straight in vertical section and straight in horizontal section) with a series of substantially vertically extending spaced grooves forming ridges such as 326 and 328, the opposite clamp or cup section 266 similarly having grooves forming ridges 322 and 324, to minimize resistance to turning of the fruit when desired and yet firmly grip the fruit when desired. The base or central portion 330 of each cup (which is curved in both vertical and horizontal section) is not provided with these vertical ridges or grooves, because the peach is not contacted by that portion of the peach clamps or cups, as shown by Figs. 39 and 41. It will be noticed that each half cup is generally conical in form, so that regardless of the size of the peach received in the cups, the cups will centralize the fruit with respect to every horizontal plane through the apices of the confronting cup sections and with respect to the vertical midway between those apices.

The cups or clamp structures are further formed to assist in the orienting rotation of the peach therein, by minimizing cup-wall-resistance to turning of the peach, and for that purpose the uppermost corner or edge 330a (Figs. 38, 40, 41 and 42) from which the surface of the peach recedes when under rotation, in a counterclockwise direction, as seen in Figs. 38, 40 and 42, and from bottom to top in Fig. 41, is cut away or relieved both vertically and horizontally (or downwardly and inwardly) from the base edge of a true cone. It is also important that the uppermost corner 330b toward which the surface of the peach approaches when being rotated be unrelieved or be built up or protrude both vertically and horizontally (or upwardly and outwardly) from the base edge of a true cone.

The reasons for these two corners of the cup differing is that an unrelieved corner on the cup contacting the receding surface of a peach tends to bind the peach against rotation, but a low or relieved corner contacted by the approaching surface of the peach tends to cause the peach to slide or fall backwardly and downwardly and against the opposite wall of the cup thereby interfering with, or terminating, the free turning of the peach. For the same reasons, the lowermost corner of the cup diagonally opposite the corner 330a is relieved as at 330c and the lowermost corner diagonally opposite the corner 330b is unrelieved, or built up and caused to protrude as at 330d. It is to be borne in mind that the cups are used for a dual function. First, they are used to confine or control (but not to grip) the peach during its orientation rotation, and, secondly, they are used to center the peach, and also to grip the peach during orientation inspecting, sawing and pitting operations. Therefore, enough of the conical cup conformation must be retained and each individual cup is made substantially symmetrical so that any plane passing through the apex of the cup will contact surfaces of like conformation on either sidewall.

The extension 244 of the link frame 236 is interconnected with the link frame 238 by an L-shaped link or lever 400 pivoted to the link frame 238 as by stud bolt 402 and pivoted to the extension 244 by stud bolt 404. A lock place 406 is mounted on the end of the shaft 232 and secured by bolts 408 and 410 to the link frame 236 of its extension 244. The lock plate is formed with a lower edge 412 in the form of a segment of a circle 412 concentric with the shaft 232.

A U-shaped casting or yoke 414 is journaled on the shaft 232. A shaft or pin 416 is journaled in the arms 418 and 420 of the yoke 414 in spaced relation to the bottom or cross bar 422 of the yoke. A split stop block 424 is adjustably clamped, by bolt 425, Fig. 32, to the shaft 416 between arms 418 and 420. The stop block is adapted to engage the pin 136 carried by the depending lug 132 of the base plate or carriage 114. A locking dog or cam plate 426 is secured to the outer end of the shaft 416 and is formed with a knurled peripheral edge in the form of a segment of a circle eccentric to the axis of the shaft 416. A coiled spring 430, Fig. 27a, is secured at one end as by a pin 432 to the L-shaped lever 400, approximately at the elbow of the lever, and the other end of the spring is secured to a pin 434 threaded into the locking dog 426 adjacent its lower end and in spaced relation to the shaft 416. A cam roller 436 is journaled on a threaded mounting stud 438 which passes through the base 422 of the yoke 414 and is secured thereto as by the nut 440.

Referring to Fig. 27a, it will be noted that a roller 347 is supported on a pin 359 and attached to a depending lug 361 (Fig. 27) by a nut 363 (Fig. 27a), the lug 361 being an integral part of the base plate 114. The purpose of this roller 347 is to maintain the fruit carriages against side-to-side movement. This roller runs in a pair of opposed spaced apart tracks 472 and 474 (Figs. 8, 13 and 27a) mounted upon a bracket 476, which is in turn attached to the rail 18 of the main frame of the machine. These tracks extend longitudinally of the machine from the point 478 (Fig. 8) to 480 (Fig. 13) at the level of the upper reach of the conveyor chains. A lower pair of tracks 482 and 484 (Fig. 43) are mounted in spaced relation on a bracket 485 secured to the side rail 19. This lower pair of tracks start and stop at approximately the same points as the upper tracks 472 and 474. The roller is confined against lateral movement as the carriage moves around the end sprockets by flat plates 486 (Fig. 8) and 488 (Fig. 13), the plate 486 being mounted on a sleeve 490 (Fig. 8) surrounding the shaft 85 and is attached thereto by a pair of bolts 492 to an upright extension 494 which is welded to the sleeve 490. Similarly, the flat plate 483 is attached to a sleeve 496 (Fig. 13) which surrounds the shaft 43, a pair of bolts 498 attaching the plate 488 to an upright extension 500 which is welded to the sleeve 496. The plates 486 and 488 cooperate with the guides 452 and 615 which hold the rollers 436 against inward movement, as the carriages pass about the end sprockets, thereby to prevent side-to-side movement of the carriages.

The cup control roller 318 is operated or controlled by a cam track 442 (Figs. 1, 2, 8 and 9) and both that roller and cup control roller 320 are operated by certain auxiliary cams or pressure pads, later to be described. The cam track 442 is secured at its upper end to a bracket 443, Fig. 9, mounted on the head casting 23 and extends around the end and underside of the casting, in spaced relation thereto, to a point substantially in the plane of the front legs 10 and 13 where it is secured to any convenient bracket or plate (not shown) carried by the leg 10 or the side rail 14.

The roller 436 also serves as a cup control roller and is guided and controlled by a series of camming and guiding tracks. At the front end of the machine the roller 436 is guided and held in outward, cup-open, position by the segmental guide or cam track 452 (Figs. 8 and 9) mounted by bolts 454 on a radial arm of the stationary sleeve 490, the track 442 having at its upper end an inwardly inclined surface 455 (Fig. 8) permitting the roller to move inwardly in cup-opening direction. It may be here noted that while the roller 436 moves along the outer surface of the segmental guide 452 it does not prevent closing of the cups under the action of the spring 430, the cups being free to move inwardly when the roller 318 leaves the end of track 442.

From the end of the guide or track 452 the roller 436 passes into a guideway or trackway formed by guide rods 446 and 448 (Figs. 8, 20 27a, 27b, 43 and 44) welded or otherwise fastened to the flanges of a channel member 456 bolted to the cross straps 36, 37 and 39 (see Fig. 43). The rod 446 has at its forward end an inclined cam portion 444 (Fig. 8) which forces the roller 436 inwardly to move the cups in a cup-opening direction. The guide rod 448 extends from the front guide 452 to the segmental guide 615 (Fig. 20) mounted on the stationary sleeve 496 upon the shaft 43. The guide rod 446 terminates at the point 462, in advance of the track 615, so that the roller 436 may be moved in a cup-closing direction by an inclined cam surface 574 formed at the front end of the arcuate guide 615. As the cup carriages are carried by the lower reach of the chains from the rear end to the front end of the machine, the rollers 436 pass along other fixed, and movable tracks, later to be described, which move, or limit, the movement of the rollers to control the opening or closing of the cups and limit their inward movement, in the absence of the peaches in the cups.

*Orienting units*

Each orienting unit F comprises, as best seen in Figs. 29, 30 and 31, a mounting frame 222 swingingly and pivotally mounted on the pivot pin 220 passing through the lugs 212 and 214 depending from the base plate 114 as shown in Figs. 28 and 33. The orienting frame 222 comprises a carriage plate 334 provided with an integral arm 338 formed on its free end with a sleeve-like horizontal boss 340 having a perforation 342. In addition, the plate 334 is provided with a vertical boss 344 having an aperture 346. The boss 340 receives a rotatable shaft 348 to one end of which is pinned a sprocket 349 and to the opposite end of which is pinned a driving spool 350 of the general conformation of an hourglass having opposed driving cones 352 and 354.

In boss 344 is mounted a bushing 345 in which a spindle 358 is journaled, the shaft portion 358 of the spindle being split, as at 360, at its upper end to receive a cross pin 362 upon which is free to rotate an orienting wheel 364. By reference to Figs. 34 to 37a, it will be seen that the wheel has a curve or rounded edge as at 370, has parallel sides 372 and 374 which at their outer edges merge into opposed annular bevelled surfaces 376 and 378. These bevelled surfaces in turn merge into the central arcuate edge or peripheral surface 370. The peripheral surface 370 is provided with spaced apart elongated-oval shaped notches 382 forming relatively shallow gear-like teeth on the periphery of the orienting wheel The spindle 358 has a reduced portion 384 (Figs. 30 and 31) to which is rigidly secured an arm 386 carrying at one end a transversely extending cross bar 357. At the opposite end, the arm 386 is provided with a block-like portion 390 which is perforated to receive a threaded stud secured to the block by a nut 392. The stud carries a cam roller 394 which is free to rotate on the stud. The bushing 345 is provided with an internal annular shoulder 347 (Fig. 31) forming a seat for the shoulder formed by the reduced portion 384 of the roller orienting wheel spindle 358 to limit the relative downward movement of the spindle. The bushing 345 projects below the boss 344 and forms a guide for a coiled spring 396 confined between the boss and the plate 386 and urging the orienting wheel downwardly so as to maintain it in engagement with one of the driving cones 352 and 354.

The shaft 348, heretofore described, is journaled on the boss 340, and in addition to the sprocket 349 has at its outer end a roller 351 which is journaled on the boss 340 and journals the hub of the sprocket. At the opposite ends of the sleeve or ring 350 is mounted the cone shaped neoprene rubber driving members 352 and 354. The driving cone 352 is seated against a metal conical washer 353 which bears against a shoulder on the shaft 348 and against the hourglass sleeve 350. The driving cone 354 abuts the opposite end of the metal sleeve 350 and both cones are clamped on the shaft and forced into gripping engagement with the shaft by a conical metal washer 357 and nut 359 on the threaded outer end of shaft 348. The cones are formed on their outer faces with annular grooves or conical recesses 355 to provide relatively flexible flanges supplying a more resilient contact between the bevelled or conical driving surfaces and the periphery of the orienting wheel 364. This construction insures that the true driving surface will remain in shape and position during continued use as hereinafter described.

When originally installed, these two rubber driving cones 352 and 354 are provided with smooth wheel driving surfaces, such as 361, but after usage the teeth or serrations 382 (see Fig. 37a) of the orienting wheel automatically, from repeated usage, form spaced intermeshing complementary teeth or serrations in the surfaces 361 of the driving cones 352 and 354, as shown in Figs. 34 to 36a. Due to some inherent characteristic of neoprene, differing from that of rubber, these integral teeth are formed therein by the driving contact of the cones and the wheel and these teeth form in effect frictional driving teeth which cooperate with the driving teeth formed on the periphery of the orienting wheel to provide a more positive driving engagement between the orienting wheel and these two driving members. It should be noted that when the orienting wheel is at right angles to the axis of the shaft 348, the orienting wheel is out of driving contact with either of these two driving cones 352 and 354 and does not engage the central spool 350 of the orienting wheel when the wheel is so positioned.

Referring to Figs. 29 and 30, it will be noted that the block 386, attached to the shaft 384 of the orienting wheel, is provided with a cross bar 357. This bar engages certain cam tracks (later to be described) extending longitudinally of the path of travel of the conveyor chain, and this cam track and bar function as a means for raising the orienting wheel from driving engagement with the cones. At other times, the spring 396 resiliently urges the spindle 358 downwardly so as to hold the orienting wheel in position to contact the driving cones.

Roller 394, on orienting spindle 358, is adapted to engage in a cam slot 506 (Figs. 3 and 8) formed by spaced complementary undulating tracks 502 and 504, the rollers 394 of the orienting units upon the upper reach of the chains moving along the cam slot as the fruit carriages E move from the front end to the rear end of the machine. These tracks are mounted, as by bolts 510 (Fig. 4) on the cross brackets 36, 37 and 39, and extend only along the upper reach of the conveyor chains. The cam slot 506 is open at its forward end, as shown in Fig. 8, where a roller 394 is just entering the cam slot. These cam tracks 502 and 504 automatically swing the orienting wheels 364 about the axes of the spindles 358 through angles of 45° and 90° as the wheels progress along the upper reach of the chains.

It is to be noted that the rear ends of the control tracks 502 and 504 are inclined upwardly as at 502' and 504' (Figs. 13, 14a, 20 and 21) so as to engage the bar 357 of the spindle arm 386 and thereby raise the orientator wheel 364, for purposes which will later appear.

*Driving means for the orienting units*

This means for automatically rotating the orienting wheels of successive units includes a sprocket 580 (Figs. 10, 20 and 21) keyed to shaft 48, the sprocket 580 driving a roller chain 581 to in turn drive a sprocket 582 (see also Fig. 24) which in turn drives a stub shaft 524 to drive a sprocket 520. The sprocket 520 drives a chain 518 which passes over a sprocket 514 on a shaft 516.

The shaft 516 is mounted in a boss 517, Fig. 23, of an arm 519 having a hub 521 pivotally mounted on a bushing 523 carried by a bolt 524 secured to a side plate 524a fastened to the side rails 18 and 19. A spring 525 is anchored to pin 527 secured to side rail 18 and to a set screw 529 carried by boss 517 which tensions the chain 518 and adjusts the sprocket 514. A spring urged locking member 531, carried by a bolt 533 passing through a slot (not shown) in a plate 535 secured to the end of the shaft 41, Fig. 20, and through a slot 537 in plate 524a, regulates the chain tension. The sprocket 514 is secured to the hub of a drum cam 530, Fig. 23, which is journaled by a suitable bearing on the shaft 516.

It should be noted that the opposite end sprocket 520 is secured to the hub of the sprocket 582, as shown in Fig. 24, which is journaled on the shaft 524. The shaft 524 is mounted in a bracket 537 adjustably bolted to the side rail 18.

The free running roller 351 mounted on the drive shaft 348 of the orienting wheel unit is guided upon a rail or track 584 (Figs. 8, 10, 11, 14, 27a, and 27b) which is mounted upon plates 585 bolted to the track 584. The track 584 at its forward end merges into a track 591 having an inclined track surface 593, and the track 591 at the forward end converges into a segmental track 595, suitably mounted upon the stationary sleeve which surrounds the main shaft 85, the segmental track 595 having an arcuate guide surface 597 for the free running roller 351. The track 584 terminates at its rear end at a point to the rear of a vertical plane through the axis of the shaft 516, as shown in Fig. 11.

The upper reach of the roller chain 518 is guided upon a track 597 which is adjustably mounted in a suitable manner so that the upper reach of the chain is elevated above the points at which the chain leaves the drive sprocket 520 and engages the sprocket 514 so that the chain is inclined upwardly from the sprocket 520 toward the track 597 and inclined downwardly from the track toward the sprocket 514. Thus, as the orienting wheel units approach the driving chain 518, the sprockets 349 are caused, by the inclined front end section of the chain, to mesh properly and without jamming with the links of the chain and similarly, as the orienting wheel units approach the end of the driving chain the sprockets disengage, without jamming, from the chain by reason of the downwardly inclined rear end section of the chain. The drive tracks 584, 591 and 595, acting on the free running rollers 351, assure the proper positioning of the sprockets 349 for this meshing and demeshing with and from the drive chain 518.

It will be evident that the sprockets 349 are caused to rotate during the time of engagement with the chain 518, both by reason of the movement of the orienting wheel units longitudinally of the chain and also by reason of the fact that the chain 518 is driven by the drive sprocket 520.

As each orienting wheel unit leaves the end of the driving chain, the orienting wheel spindle roller 394 approaches the end of the cam tracks 502 and 504 and the cross bar 357 of each orienting wheel unit engages the inclined sections 502' and 504' of the tracks 502 and 504, and the orienting wheel is thereby swung to a position parallel to the path of movement of the fruit carriages and simultaneously raised so that the further rotation of the orienting wheel is terminated not only by the disengagement of the sprocket 349 from the driving chain 518 but also by the action of the cam tracks 502 and 504 in disengaging the orienting wheel from the driving cone 352— with which it was last in engagement as the roller 394 moved along the last offset portion of the cam slot provided by the tracks 502 and 504. Each orienting wheel unit, after being disengaged from its driving mechanism, passes directly into the actuating means for vibrating or oscillating the orienting wheels, now to be described.

*The actuating means for vibrating or oscillating the orienting units*

The means H for vibrating or oscillating the orienting units acts upon the orienting wheels 364 in succession and for that purpose comprises an oscillating or vibrating track consisting of spaced bars or channel members 508 and 510 (Figs. 14a, 20, 20a, 20b 20c and 21), forming therebetween a guideway for the rollers 394 and along which the rollers move in engagement with the members 508 and 510, as the fruit carriages in succession approach the rear end of the machine.

The drive cam 530 (Figs. 10 and 20), mounted on the shaft 516, has a cam track 532 formed therein, as seen in Fig. 12, and this cam track receives a roller 534 which is secured to a sleeve-like member 536 slidably mounted on the shaft 41. A depending stud 540 is journaled in a boss 542 of the sleeve 536 and is secured to a plate 544. This plate 544 interconnects the two channel-like members 508 and 510 to cause them to vibrate or oscillate together. It will be noted (see Fig. 20) that the tracks 508 and 510 are outwardly flared as at 546 to guide the roller 394 into the guideway and between the tracks 508 and 510, regardless of the instantaneous position of the tracks in their cycle of oscillation. During the time that the roller 374 is moving along the tracks 508 and 510, an oscillatory motion or vibration is imparted to the tracks, and hence to the roller 394. The rear ends of the tracks 508 and 510 are secured to an angle bracket 548, welded thereto. This angle bracket 548 is supported and journaled on a flexible member or block 550 which consists of a rubber core 552 having a radial flange 554 compressed and confined within a metal ring 556 which is mounted in an opening in the angle bracket 548, see Fig. 20c. The rubber block 552 is provided with a hole 558 to accommodate a bolt 560 which passes therethrough and is secured to an angle bracket 562, the bolt being held in position by a nut 564. The bracket 562 is rigidly attached to the bracket 45 as at 566. The rubber block or sleeve 552 possesses sufficient resilience or yieldability for the desired angular vibration or oscillation of the tracks 508 and 510, as though it is mounted on a vertical pivot in the plane of the radial flange 554 of the rubber sleeve 552. The tracks 508 and 510 may be provided with neoprene facings at their opening flared ends 546 to reduce the noise of the rollers 394 as they enter the tracks.

It should be noted that as a roller 394 enters the trackway it is swung laterally through a maximum angle, about the axis of the orienting spindle 358 (see Figs. 29 and 30) thereby vibrating or oscillating the orienting wheel 364, about the same axis through a maximum angle. As the roller 394 traverses the trackway the angle of swing of the roller progressively decreases, because the roller is approaching the phantom pivot of the tracks, until the roller reaches the end of the trackway when the angle of oscillation of the tracks is substantially zero.

The rollers 394 pass from the end of the vibrating trackway into a guide formed by spaced segments 576 and 578, Figs. 13, 14a, and 20, secured to the stationary sleeve 496 upon the rear end shaft 43, so that the rollers are properly guided to enter certain guideways on the lower side of the machine, as hereinafter described.

As the rollers 436 approach the cam surface 574 (Fig. 20), the cross bar 357 reaches downwardly inclined ends of auxiliary tracks 570 (Fig. 14a) and the orienting wheels are thereby allowed to drop down to permit the peaches to be horizontally re-centered by the closing of the cups as the rollers 436 are forced outwardly by the cam surface 574.

*Orientation inspecting and fruit rejecting mechanisms*

The inspecting mechanism J, Figs. 13, 14a, 15 to 18, 22, and 44 to 53, is mounted on the underside of the bracket 45 and attached to suitable brackets mounted upon the side bars of the machine, as by bolts 602 (Figs. 13 and 44). A double track or guide made up of two channel irons 603 and 604 is secured to the underside of the bracket 45 by the bracket 605 (Fig. 14a) and likewise secured to the tracks 502 and 504 by brackets 606 (Figs. 14a and 47 to 49). The track 603 has a horizontal slot 607 formed therein to allow the finger 609 of a gauge lever 610 to project into the path of the orienting rollers 394 on the bottom reach of the chain conveyor. A spring 611 is hooked to the opposite end of lever 610 and to an adjusting screw 612 projecting through the upright 12 and held by a wing nut 613. A plate 614, having surfaces 614a, 614b, 614c, 614d, 614e, and 614f (Figs. 47 and 50), abuts the track 604 and is supported by bracket 45, and is secured to the segmental guide track 615 by the bolt 616 and to the guide track 617 by the bolts 618. A track gate and trigger assembly 619, Figs. 15 and 16, is composed of a gate lever 620 having a stop projection 620a, a hub 621, and a hardened latch, dog or trigger 622. The hub 621 is secured to a pin 623 journaled by ball bearings 625 in a housing 627 having an adjusting handle 629 welded to it.

The housing is adjustably secured to the under side of the bracket 45 by a pivot bolt 631 and a locking bolt 633 passing through a slot 635 in the handle 629.

A cup control assembly comprises a pair of links 626 and 628 (Figs. 13, 14a, 22, and 44 to 46a) pivoted, by suitable ball bearings, on studs 629 and 630 secured to the bracket 45. The opposite end of the link 628 is pivoted on a stud 637 secured to a bar 632. The link 626 is L-shaped and pivotally mounted at its elbow on a stud 639 also carried by the bar 632.

Two track bars 634 and 636 are mounted on the bar 632 by bolts 632a and spacers 632b (Fig. 46a). Due to the parallelogram mounting of the bar 632, the two tracks 626 and 628 carried thereby move inwardly in parallel alignment with the center line of the machine. The L-shaped link 626 has secured to its free end a hardened sear 638 having a notch 641 to receive the trigger 622.

The bar 632 and hence the tracks 634 and 636 are urged inwardly by a spring 640 (Figs. 13, 18, 45 and 46a) anchored on one of the bolts 632a and to a pin 642 secured to a sleeve 643, welded or otherwise secured to bracket 45 (see Figs. 17 and 44).

The gate lever 620 is urged inwardly to track closing position, as shown in Figs. 16, 22 and 45, by a spring 644 anchored by a pin 645 to the lever 620 and by a pin 646 (Figs. 13, 17, 18 and 45) to the sleeve 643.

The sleeve 643 receives a pivot or stud bolt 645 on which the gauge lever 610 is pivoted. The lever 610 has a camming face or edge 646 which causes the lever to be retracted when engaged by an orienting wheel-control roller 394 and an actuating face or edge 647 which engages the roller 394, when the roller passes beyond the camming edge, so that the roller 394 is subjected to the force of the spring 611 tending to urge it in a lateral direction and also to the force of the spring 644 tending, through the gate lever 620, to resist movement of the roller in that direction. The lever 620 is also formed with a stop portion or nose 648 which is adapted to engage the side of the track 603 to limit the clockwise movement of the lever, as shown in Fig. 45.

The track 604 is formed with an outwardly curved cam portion 649 to be engaged by an outwardly moved roller 394 and return it to the guideway formed by the track 603 and the portion of the track 604 beyond the roller-escape opening 650 in said track.

It should be noted that the plate 614 provides a guide surface 614a for the roller 436 when it leaves the bottom of the segmental guide track 615, and that the opening 651 in the plate 614, formed by the surfaces 614b, 614c and 614d, permits the inward movement of the roller 436, under the action of the spring 640, when the tracks 634 and 636 are moved inwardly. A cam projection 652 on the track 614 moves the roller 436 outwardly at a proper time to reduce the trigger-sear friction between the trigger 622 and sear 638.

As the roller 436 approaches the end of plate 614 it engages a guide track 617 (Figs. 4, 9, 13, 19, 43 and 60) bolted to the plate 614 and other suitable brackets such for example as illustrated in Fig. 43, the track 617 extending to the front end of the machine and meeting the lower end of the segmental track 452.

Fruit bisecting or sawing means

As the roller 394 passes from the inspecting mechanism H the roller leaves the tracks 603 and 604 and enters into the space between track rods 660 and 662 (Figs. 4, 13, 14, 14a, 47, 48 and 50). The free end of each of the tracks 660 and 662, just ahead of the sawing station, are inclined to form cam section 663 for engaging the inverted cross bars 357 thereby to raise the orienting wheel 364 sufficiently to clear the saw, now to be described.

The fruit bisecting saw 38c, Figs. 1, 2, 4, 14a, and 55 to 58, is mounted in any convenient manner upon a saw arbor 38d, supported upon bearing 38g in a housing 38f. The housing is bolted to a suitable platform (not shown) secured to the side rails 14 and 16. A flywheel 38h is secured to one end of shaft 38d and is formed with a pulley 38j which is driven by a belt 38k in turn driven by pulley 38b on the high speed shaft M–1 of the combined motor and gear unit 38. Saw guards 38m and 38n (Figs. 1, 2 and 57) surround all but the upper part of the saw 38c and are fastened to the machine cross bars 30.

Means is provided for applying pressure on the peach cups on diametrically opposite sides of the peach as it passes across the rotating saw for the purpose of holding the peach rigidly during the sawing operation so that the saw makes a clean cut through the peach and the peach does not turn in the clamps or cups. This mechanism is best shown in Figs. 55, 56 and 58, and comprises a lever 784, pivotally mounted on stud bolt 788, and a cam bar 782 having cam surfaces 783 and 783', the bar being mounted on the top of the lever 784. A spring 790 is connected as at 791 to the arm 784 to urge the arm 784 inwardly toward the center line of the machine. The opposite end of this spring 790 has anchorage on any suitable fixed bar or bracket (not shown). As shown in Fig. 20, the cup control roller 318 cooperates with the cam surface 783 and 783' of the lever arm 784. By the time the roller 318 engages the cam bar 782 the roller 436 has passed beyond the rejecting tracks 634 and 636. Therefore, the spring 790 applies an auxiliary pressure through the cam 782 and the roller 318 to the clamps or cups, to augment the pressure of the spring 430 at the time that the peach is brought into contact with the continuously rotating saw. This auxiliary pressure increases as the roller passes along the cam surface 783 and is maintained effective, by the cam surface 783', until the roller passes the end of the cam bar.

The fruit spreading means

As each fruit carriage passes the bisecting saw, the cut faces of the fruit halves engage a separator blade 664, Figs. 2 and 60. Blade 664 is mounted upon a bracket 666 (Fig. 60) by bolt 668, the bracket being secured to the saw guard 38n. The blade 664 has rigidly attached to it a plurality of pairs of spaced fruit spreader bars 670, 672 and 674, which are arranged in substantially V-shaped formation, as shown in Fig. 59, and diverge in the direction of movement of the carriages so that as the severed peach halves are carried by the clamps or cups along these diverging bars the peach halves, and the clamps or cups, are spread apart as shown in Fig. 61. The opposite ends of these diverging bars 670 to 674 are secured to a supporting bracket 676 secured by means of bolts 680 to a cross bar 678 mounted on the side bars 14 and 16 of the machine. The central pair of bars 672 terminate short of the pitting or deseeding means N, whereas the upper and lower bars 670 and 674 on each side are extended farther to the left as shown in Fig. 60.

As shown in Fig. 60, the bars are spaced apart farther at their front ends than at their rear ends and as shown in Fig. 61, the bars 672 are so positioned (with reference to the horizontal centers of the cups) as to engage the faces of the severed pits for the purpose of overcoming or eliminating any tendency of the bars to cut into or form channels in the cut faces of the flesh of the fruit halves.

The pitting or deseeding means

Figure 65:
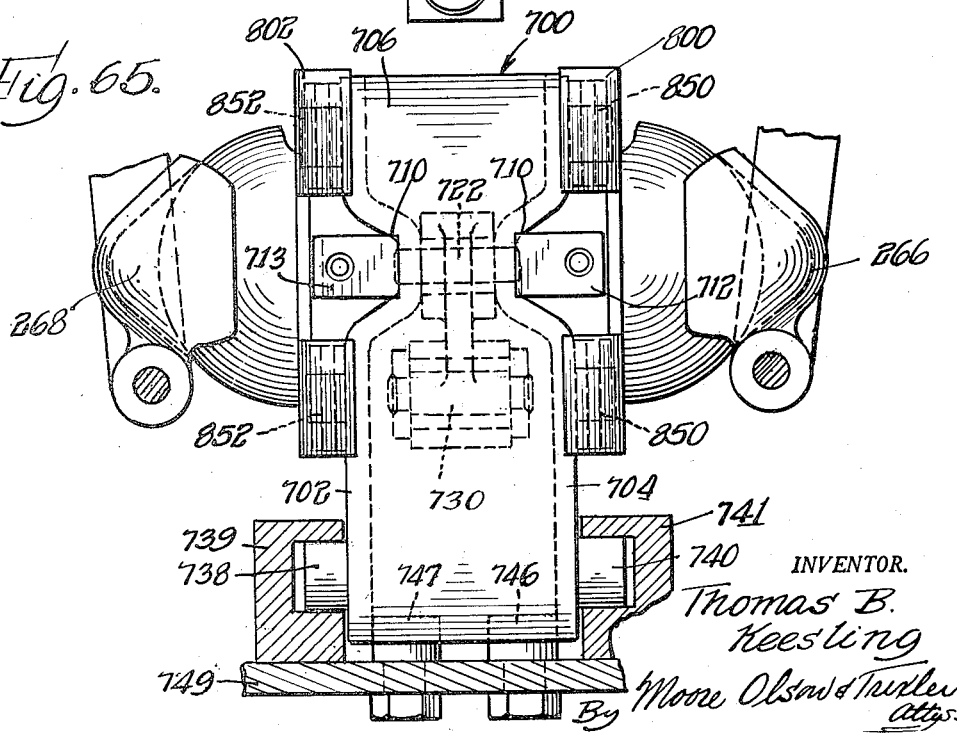
Fig. 65 is a fragmentary view in vertical section taken along the line 65—65 of Fig. 63.

The pitting or deseeding means N comprises, as best shown in Figs. 62 to 92, a pitting frame 700 consisting of side plates 702 and 704, Fig. 77, a front plate 706, and a top plate 708, all welded together to form a box-like frame. The side plates 702 and 704 have formed therein grooves 710, 710a, 711 and 711a and large openings 707 and 709. Knife mounting blocks 712 and 713 (Figs. 62, 63, 65, 71 and 77) are positioned in the grooves 710 and 711 and detachably secured to the side plates as by bolts 714 and 715. Pitter knife shafts 716 and 717 and their mounting bushings are detachably inserted in these mounting blocks as shown in Fig. 71. The opposite ends of these shafts are supported in a pitting head 718 (Figs. 62, 71 and 78). The knife shafts pass through the grooves 710a and 711a and the base walls of these grooves are apertured to receive, by a press fit, a cross shaft 722 on which a segmental, bevelled, double gear 724 is journaled, by a suitable bushing (Figs. 63, 67, 71 and 74). Two bevelled pinions 726 and 728 mesh with the double gear 724, and are secured to the pitting blade shafts 716 and 717. The gear 724 has a boss 728 which receives a stud 730. The stud 730 has pivotally mounted thereto two links 731 and 732, Fig. 74, which are pivotally secured to the end of a crank 734, the action of which will soon be explained.

As shown in Figs. 63 to 69, a pair of tracks 739 and 741 are bolted to a cross bar or plate 749, secured to the frame bars of the machine, and these tracks 739 and 741 receive a pair of rollers 738 and a pair of rollers 740 which are rotatably mounted upon stud bolts secured to the side plates 702 and 704 of the pitter frame 700. One or more pairs of rollers 746 and 747, Figs. 63, 65, 68 and 69, are rotatably mounted on the stationary frame plate 749. These two rollers engage the inside surfaces of the two side plates 702 and 704 of the pitter frame. Thus, the pitter head is guided, both vertically and horizontally, in a truly rectilinear path of travel by means of these two sets of guide rollers.

Means is provided for reciprocating the pitting frame and head through the desired distance of reciprocation, approximately $3^{11}/_{32}''$. This means comprises a roller 750, Figs. 1, 19, 73 and 74, which rides in the camway 752 of a cam 754. The roller 750 is mounted on a lever 756 which is pivoted on a stud 760 carried by the front end casting 23. Another lever 762 is pivoted on the same axis, by means of a bolt 764 carried by the casting 22 and both the levers 756 and 762 are fixed to a cross bar 766. A centrally disposed short lever 770, on the bar 766, is connected to the pitting frame 700 through links 774, pivoted to lever 770 by stud 772 and to the pitting frame by shaft 776, Figs. 63, 67 and 68.

Each of the pitting shafts, 716 and 717, is provided with spaced squared portions 719 and 721, see Figs. 71, 79, 91 and 92, and these squared portions receive the hubs 725 and 727 of a pitting knife 780. As shown in Fig. 79, the hubs 725 and 727 are provided with reduced end portions 729 and 731 over which the knife is slipped and then welded in place. Each knife blade 780 is generally helicoidal in shape (Figs. 80 to 83) and provided with a cutting edge 737 between points 739a and 739b, or substantially from hub to hub. The cutting edge 737 is formed by inner and outer bevelled surfaces 781 and 782 forming a true knife-like cutting edge forcing the pit and flesh apart as it passes through the flesh just about the pit.

Due to the helicoidal shape of the pitting blades 780, their shafts 716 and 717 cannot be driven for the full travel of the pitting frame 700 because in such a case the pitting blades 780 would project into the paths of the half peaches leaving the pitting head or into the paths of half peaches moving onto the pitting head.

In order to avoid such interference, a compensator cam lever 792, Figs. 2, 19, 73 and 74, is provided for oscillating the shaft 797 on which the crank 734 is mounted, so as to hold the pitting blades 780 at rest during the period of deceleration and acceleration of the pitting head when the peach halves are moving onto or from the pitting head.

The cam lever 792 is formed with a cam slot having a straight section 793 and curved, opposite end, camming sections 794 and 795. A crank 796 is secured to the end of the cross-shaft 797, upon which the pitting knife crank 734 is mounted. A roller 798, mounted on the end of shaft 797, is received in the slot of the lever 792 and forms a vertical guide for the lever as it moves to and fro under the action of the cam operated lever 756, to which the lever 792 is connected by a bolt 799 threaded into one end of the bar 766. A cam roller 801 mounted on the free end of the crank 796 is also received in the slot 792 and a stud 803, carried upon a lever journaled on the shaft 790, has formed on its outer end a guide plate 805 overlying the cam slot to provide a lateral guide for the cam lever. A spring 807 secured at one end to the crank 796 and at the other end to an adjusting rod 809 (Fig. 2) anchored to the side bar 15 urges the crank in a counter-clockwise direction.

As the pitting frame 700 moves to and fro, the cam lever 792 causes the shaft 797 to be oscillated, during the periods of acceleration, deceleration and reversal of the pitting frame and to remain stationary during the period when the pitting frame is moving at the same, uniform rate as the fruit carriages. The oscillations of the shaft 797 are sufficient to hold the pitter knife shafts 716 and 717 stationary during the periods of acceleration, deceleration and reversal of the pitting frame.

The pitting frame 700 carries and supports the pitting head 718 which comprises fruit guiding side plates 811 and 813 (Figs. 62 to 64, 71, 75, 78 and 88 to 92) secured at their rear ends to a cross-plate 815 bolted to blocks 817 (Figs. 63 and 77) secured to the pitting frame 700. The pitting head 718 also includes shiftable pitting plates 800 and 802 (as seen in Figs. 62, 63, 65 to 67, 69, 71, 75, 78 and 85 to 92).

The side plates have grooves 819 and 821 for receiving the free ends of the spreader rods 670 and 674, as illustrated in Fig. 60, when the traveling pitter reaches its rearmost position to receive the half peaches from the spreader means.

Each of the pitting plates 800 and 802 has welded thereto a pair of lugs 804 and 806 (Figs. 62, 63, 66, 71, 72, 75, 78 and 88 to 92) which coact with knobs 808 and 810 of fruit sizing gauge levers 812 and 814. The two side plates 702 and 704 of the pitter head 700 are provided with bearing blocks 820, 822, 824 and 826 (Figs. 62, 63, 66 and 77). These bearing blocks receive a pair of vertically extending shafts 828 and 830 which freely rotate in suitable bearings (not shown). Each of these shafts has fixed thereon a pair of crank arms 832 and 834 which arms have fixed thereto the knobs 808 and 810. The shafts 828 and 830 have fixed to their bottom ends the levers 812 and 814 which are generally sickle-shaped. Springs 840 and 842 are adjustably connected, by a series of holes 838, to each lever, pass through suitable holes 839 to cotter pin 844 in the side plates 702 and 704 of the pitter frame and are secured by cotter pins 844.

The pitting plates 800 and 802 are mounted on the side plates 702 and 704 of the pitter frame by means of pivot pins 850 and 852. The rear ends 851 and 853 of the pitting plates are curved inwardly to permit easy movement of the peach halves off of the pitting plates. The front ends of the pitting plates 800 and 802 are inwardly offset and underlie the side plates 811 and 813 so that the major portion of the plates 800 and 802 are co-planar with the plates 811 and 813. In addition, the pitting plates are provided with central openings 862 and 864 through which the pitting knives 780 and 781 swing to cut around half pits of the peach halves. It will be seen that these pitting plates are free to swing inwardly about their pivot pins 850 and 852 under the pressure of the peach halves pressing against the outside of these plates. The pitting openings 862 and 864 communicate with long openings 862' and 864' which are provided to permit "cocked pits" to move past the pitter freely and without jamming the pitter mechanism.

In order to hold the peach halves more firmly against the pitting plates during the pitting operation and to assist in adjusting the pitting plates for different sizes of half peaches, pressure cams 874 are provided. Each is secured to a lever 875 mounted on the side bar of the machine by a pivot pin 876 (Fig. 75) and is normally swung inwardly toward the path of travel of a cup control roller 318, or 320, by means of a spring 878 adjustably secured, in any convenient manner (not shown) to a fixed part. It will be noted that the cam 874 is provided with a surface 882 which is adapted to lie generally parallel to the traveling pitter to provide a uniform pitting plate pressure during the pitting action. This cam surface 882 is of such length as to maintain this uniform pressure during the pitting of the fruit by the pitting knives. The stationary guide track 442 extends sufficiently inward at its lower end to provide a cam track 866 and is bolted as at 868 and 870 to the guide tracks 739 and 741 for the pitting frame.

The track section 866 is formed with a cam surface 884, to engage a cam roller 318 of an empty carriage, or one having a below-size peach, and assure its proper positioning as it reaches the pitter. The track section 866 is also formed with a cam surface 886 to engage the cam roller 318, after the pitting operation, and move it outwardly thereby simultaneously to open both clamps or cups and permit the pitted half peaches to be discharged upon a suitable conveyor (not shown) beneath the front end castings 22 and 23.

*Operation of the machine*

When the clutch is engaged, as hereinbefore described, the combined electric motor and gear unit 38 drives the endless chains uninterruptedly so as continuously to progress the spaced series of fruit carriages E, carried by the endless chains, first along the upper reach of the conveyor, thence around the rear end sprockets, thence along the lower reach of the conveyor, and thence around the front end sprockets and then again along the upper reach of the conveyor, in endless fashion. At the same time, the feed belt 96, shown in Figs. 5 and 6, is driven in the direction of the arrows to augment the action of gravity in effecting the feeding of peaches down the chute 94 to the constantly rotating feed wheel 104, which wheel in turn picks up a single fruit, carries it upwardly from the stream of fruit in the chute and drops it in position upon a carriage plate 114, as shown in Fig. 14, and between a pair of opened clamps or cups 266 and 268, the fruit being approximately centered between the cups by the opening 206 in the feed tray or plate 114, as shown in Fig. 27. The contact of the whole peach with this centralizing hole 208 of the plate 114 is but momentary, lasting somewhere between $\frac{1}{60}$ and $\frac{1}{5}$ of a second before the roller 318 is allowed to move in a cup-closing direction by the cam track 442 so that the cups are snapped together to grasp the peach, the spring 430 moving the cups to that position (see Fig. 27a). The opening in the plate 114, in addition to having a substantially instantaneous peach centering function, also permits the orienting wheel mechanism to move through the plate to engage and raise the peach a distance of about $\frac{1}{4}$" about the plate, and the peach does not thereafter as it moves through the machine contact the plate 114.

The raising of the orienting wheel is occasioned by the movement of the roller 351 along the inclined front end 593 of the track 591, see Fig. 11, and this raising of the wheel is so timed with relation to the closing of the associated cups that the fruit is lifted an instant before the cups close and the cups thereupon, as is previously described, center the fruit in the plane of the wheel and center the fruit horizontally and in proper engagement with the wheel. The roller 436 almost immediately contacts the front inclined end 444 of the track 446 (see Fig. 8) and the yoke 414 is thereby moved inwardly to move the cup to a fruit clearance position, as shown in Fig. 27b. The first increment of this inward movement causes the cam 426 to rotate anti-clockwise on shaft 416 and engage the lock plate 406. This is due to the eccentricity of the semi-circular cam member. This amount of movement has been predetermined by using a thickness gauge, or shim, of desired thickness, inserted between the cam 426 and the lock plate 406 when in unlocked position, to determine the angular setting of dog 424 on the shaft 416 necessary to engage the stop pin 138. It may be noted that each one of the multiple locking units on the conveyor chain is adjusted exactly alike. This adjusted, fixed extent of inward movement of the control roller 436 causes engagement of the cam with the lock plate, regardless of the spacing of the cups for different fruit sizes. The second increment of inward movement of the roller 436 and yoke 414 moves the opposed cups sufficiently away from the peach to provide between the peach and the cups a fixed, uniform clearance which is the same for all sizes of peach. This uniform clearance permits each peach to turn under the influence of the orienting wheel on which it is supported and is riding, so to speak. Peaches are substantially round, but not perfectly round, and insufficient clearance between a peach and the cup walls will prevent rotation of the peach because of the resistance between opposite portions of the peach and the cups. For instance, if the opposed cups contacted a peach on a smaller axis and the peach on being turned by the wheel would present a larger axis to the cups the cup walls would bind the peach against further rotation. On the other hand, an excessive clearance between the cups and the peach would permit the peach to fall sidewise off the orienting wheel and against the bottom lip of a cup and out of driving engagement with the wheel. The best orienting is accomplished when the peach is resting nearest to a vertical position directly over the rotating wheel 364 and confined in that position by the two halves of the cups but free for rotation without undue restriction by the cup walls. It is understood that the two halves of the cups do not grip the peach but merely act as a confining means for keeping the peach directly over the orienting wheel so that substantially all of the weight of the peach is borne by the wheel.

During the orienting period when the peach is positioned on top of the rotating orienting wheel, the cups are positioned in spaced relation from the peach to permit the peach freely to revolve on the orienting wheel between the cups, and the inner walls of the cups are shaped to prevent a binding of the peach between the inner wall surfaces of the opposed cups. However, in the majority of instances when during the rotation of the wheel the stem cavity of the peach registers with the upper rim of the orienting wheel, the peach may no longer be held free of the cups and the peach may lose its central relationship to the cups and may fall against the lower lips of the cups which provides a desirable resistance to turning so that when the orienting wheel is moved quickly through an angle of 90° about its vertical spindle-axis the orienting wheel moves relative to the peach until it registers with the long axis of the stem indent and the peach turns with the wheel about the vertical axis but is no longer rotated by the wheel about a horizontal axis. In these circumstances the suture plane is found quickly by the wheel.

After the cups have been moved to the fruit-clearing position the roller 394 reaches the first offset cam section of the tracks 502—504 (see Figs. 3, 8 and 20) and the wheel is positioned at an angle of 45° to the path of the fruit carriages and simultaneously brought into engagement with a driving cone 352, or 354 (Fig. 36), so that the fruit is rotated in a plane at that angle to its path of conveyance.

Thereafter as the carriages and orienting units move along the upper reach of the conveyor, the orienting wheels are periodically swung about a vertical axis through an angle of 90°, first in one direction and then in the opposite direction, by the offset cam sections of the tracks 502 and 504 (see Figs. 13 and 14). In the illustrated embodiment these tracks are formed with nine offset sections, the first of which swings the wheel to an angle of 45° to the vertical central plane of the machine, the last of which returns the wheel to a position parallel to, or in, said plane and the other seven of which cause the wheel periodically to zig-zag between positions at 45° to said plane.

During this period of rotation and zig-zagging of the wheel the fruit is, in substantially all, but not all, instances, brought into suture plane alignment with the wheel and the wheel penetrates to maximum extent into the stem cavity of the fruit. Immediately upon the completion of this rotation and zig-zagging of the wheel the driving mechanism G is automatically disconnected from the orienting wheel and the wheel is then lifted, by the cam surfaces 502' and 504' (Figs. 14a, 20 and 21) of the tracks 502 and 504, approximately a distance of one half inch, thereby lifting the peach so that the axis of the fruit lies above the horizontal plane of the cup apices so that during the subsequent rapid oscillation of the fruit and wheel the fruit will be more closely confined, by the upper lips of the cups, and also so that as the cups are closed the cups will exert a downward force tending to keep the peach in alignment with the wheel. The roller 384 now enters the rapidly oscillating tracks 508 and 510 (Figs. 14a and 20) which serves the purpose of aligning the suture plane of the fruit with the orienting wheel in those instances of slight failure of alignment and in those instances where bumps or projections in the stem cavity have prevented the fruit from becoming vertically aligned with the plane of the wheel. It has been found that the rapid, decreasing oscillation imparted to the fruit by the oscillating tracks 508 and 510 admirably serves those purposes.

As a fruit carriage carrying a peach therein approaches the rear end sprockets of the conveyor chains the cups are brought to a closed position firmly against the peach, and as the cups close the orienting wheel is allowed to drop a predetermined distance of substantially one-eighth inch to facilitate the re-centralizing of the fruit in the cups without affecting their orientation. Then, as the carriages start forwardly along the lower reach of the conveyor the cross bar 357 is forced downwardly by the rear end of the cam track 604 (Fig. 48) and the wheel is forced more firmly into the stem indent of the peach.

It should be noted that the cups are closed, by cam 574 (Fig. 20), to fruit gripping position as the roller 436 approaches the segmental guide 615 and the cam 426 moved out of engagement with the lock plate 426 so that the spring 430 applies a resilient, yielding, cup-closing force to grip the peach. At the time that the wheel is lowered by the rear end of lower cam track 604 (Fig. 48) it is of the utmost importance that the wheel be firmly locked into the stem indent of a peach properly oriented as to suture plane or held firmly into contact with a peach not properly so oriented.

As the fruit carriage reaches the inspecting mechanism J, the edge 609 of the gauge 610 is contacted by the roller 394 (see Figs. 22 and 45) and the gate lever 620 is positioned in alignment with the track member 604 and the notch 641 in the sear 638 is engaged by the trigger 622. When a peach is properly oriented as to suture plane, the orienting wheel 364 is firmly locked in the stem cavity of the peach and turning of the orienting wheel about a vertical axis most strongly resisted. Now, since the resistance to turning of this orienting wheel is greater than the difference between the forces of the springs 611 and 644, the roller 394 will pass straight through between the track 603 and the gate 620 and the so properly oriented peach will be carried by the conveyor to the fruit bisecting means L.

If, however, the peach is not properly oriented as to suture plane, the resistance of the peach to the turning of the orienting wheel 364 is less and the spring 611 forces the face 642 of the gauge 610 to push the roller 394 and the gate lever 620 laterally thereby disengaging the trigger 622 from the notch 636 of the sear 638 and the spring 640 by moving the tracks 634 and 636 inwardly moves the roller 436 into the opening 651 in the track 614 thereby opening the cups 266 and 268 to discharge the peach from the machine. After the improperly oriented, or unoriented, peach has been discharged from the machine, the roller 436 engages the cam surface 614d, thereby through the tracks 634 and 636 resetting the sear 638 and allowing the pawl 622 to re-engage the notch 641.

In order to assure the proper functioning of the sear and trigger the hump 652 is provided on the cam track 614. As the roller 394 associated with one cup assembly passes the gage 610, the roller 436 of the preceding cup assembly climbs the hump 652 and causes the sear 638 to turn anti-clockwise a sufficient amount to eliminate sear-trigger friction by providing a gap between the sear notch 641 and the trigger 622 so that the arm 620 may turn freely under the action of the differential springs 611 and 644, and the trigger release the sear if the peach is not oriented as to suture plane. As that roller 436 passes the hump 652 it passes from the tracks 634 and 636 and the next roller 436 enters the tracks and the spring 640 returns the sear to the position shown in Fig. 45 unless the trigger 622 has been moved to sear-releasing position.

It should be noted that the springs of the inspecting mechanism may be, and preferably are, adjusted to cause rejection of peaches, or like fruit, oriented as to indent but not suture plane, as well as wholly unoriented fruit.

It should be noted that the track 617, acting on the roller 436 prevents the cups from being completely closed, so that the bisecting saw may subsequently pass between them.

After passing the inspecting and rejecting mechanisms, a properly oriented fruit is carried directly to the bisecting saw 38c, and just prior to the time that the fruit engages the saw the auxiliary pressure pad or cam lever 782 engages the cup control roller 320 and applies an auxiliary cup-closing, fruit-gripping, pressure to more firmly hold the fruit against rotation in the cups during the splitting operation.

The saw having passed almost completely through the fruit, the cross bar 357 of the orienting unit engages the cam end 660 of the track 662 (Figs. 14, 14a and 48) and raises the orienting unit so that the orienting wheel clears the saw.

From the saw the fruit conveyor carries the fruit halves along the dividing plate 664 (Figs. 59 and 60) and along the horizontally diverging fruit spreading rods 670 to 674 from which the fruit halves pass directly onto the opposed fruit guiding plates 811 and 813 of the pitting head 718 (see Figs. 71, 72 and 78) as the pitting head reaches its rearmost position as shown in Figs. 60, 62 and 63.

As the pitting frame 700 and pitting head 718 begin to accelerate in traveling toward the front end of the machine, the fruit halves are carried by the carriage, then traveling at a higher speed, across the fruit guiding plates 811 and 813 and along the pitting plates 800 and 802 until the pits of the fruit halves are properly registered with the apertures in the pitting plates. By that time the pitting frame and head have reached a speed equal to the speed of the carriage. It may be noted that in the illustrated embodiment the traveling pitter reaches that uniform speed in $11/32''$ of travel and thereafter moves at that speed for a distance of approximately $21\frac{1}{32}''$ after which it decelerates and reaches a point of reversal in a travel distance of $1\frac{1}{32}''$, during which deceleration the pitted half fruits are carried past the pitting plates and thereafter the roller 318 is engaged by the cam portion at the lower rear end of the track 442 and the cups moved to open position as shown in Fig. 43 to discharge the fruit halves by gravity from the cups.

As the fruit halves are moved from the guide plates 811 and 813 along the pitting plates 800 and 802, the rollers 318 and 320 engage the auxiliary pressure pads or cams 874 (see Figs. 62, 66, 69, 71, 75 and 88 to 92) and the springs 878 acting upon the rollers 318 and 320, through the cams, force the pitting plates 800 and 802 inwardly against the action of the springs 840 until the sickle-shaped, adjustment determining, levers 812 and 814 engage the rollers 318 and 320 and thereby lock the rollers and pitting plates against further inward movement. The inward movement of the pitting plates relative to the pitting knives determines the depth of pitting cuts made by the knives. The extent of inward movement of the pitting plates is determined, in inverse proportion, by the size of the fruit halves, as illustrated in Figs. 91 and 92. Such proportioning of movement of the pitting plates results from the fact that when the cups close upon the fruit the rollers 318 and 320 are spaced from the central vertical plane of the machine, and hence from the planes of the pitting plates, distances which are determined by the size of the fruit. Hence, as the rollers approach the pitting mechanism and the fruit halves pass from the fruit guiding plates onto the pitting plates the rollers are spaced from the pitting plates distances which vary directly in proportion to the size of the fruit. As soon as the rollers engage the cams 874 the rollers and pitting plates begin to move inwardly and the levers 812 and 814 begin to rotate in a counter-clockwise direction, as seen in Figs. 62, 66, 69, 71, 75 and 88 to 92, and the extent of such rotation is of course dependent, inversely, upon the initial distance of the rollers from the pitting plates.

During the time when the pitting head and frame are being decelerated, reversed and accelerated, the pitting knives are held stationary by reason of the compensating action of the driving cam lever 792 (Figs. 73 and 74) and during the period when the pitting head and frame are travelling at the speed of the fruit carriages the shaft 797 is stationary and consequently the crank 734 is stationary and the receding movement of the pitting head and frame causes the links 731 to pull backwardly upon the lower edge of the double, bevelled gear 724 and hence rotate the pitting knives through an angle of 270° as diagrammatically illustrated in Fig. 70. This angle of rotation is sufficient to cause each of the helicoidal pitting knives to pass from the position shown in Fig. 85 to the position shown in Fig. 87 in which latter position the pits have been completely severed from the fruit by the knives and the knife, after having been projected through the pitting aperture has been rotated to a position wherein it again lies wholly within the pitting head. Thereafter, the pitting head and frame are decelerated, the knife remains stationary and the fruit is carried from pitting position to fruit discharging position beyond the pitting head. Following the reversal of the pitting head and frame, the pitter is rapidly returned to its original position at the end of the spreader rods and during that return movement the knives are flipped in the opposite direction (dislodging any retained pit) and to a position for pitting the fruit halves carried upon the next successive fruit carriage which is advancing toward the pitter mechanism.

It should be noted that the helicoidal pitting knife passes through the fruit in a sort of "threading action" so as progressively to cut through fruit without compressing or tearing the flesh of the fruit as it penetrates the fruit. The end 739a of the knife edge first engages the fruit near the front end of the pit and the end 739b is the last to leave the fruit—at the rear end of the pit.

It should also be noted that during the operation of the machine water is constantly sprayed upon the carriages as they pass along the upper reach of the chain— through conventional water jets or nozzles (not shown)— to keep the carriages and associated parts clean or free of fruit acids and lubricate the orienting wheel, neoprene driving cones. Neoprene, or equivalent synthetic rubber material, is especially advantageous because of its easy lubrication with water and its ability to withstand fruit acids and the ever present oil necessary to keep the metal members of the machine properly lubricated.

It is apparent that many widely different embodiments of this invention may be made without departing from the spirit and scope thereof, and therefore it is not intended by this description to limit the invention except as indicated in the appended claims.

Having thus described the invention, what I claim as new and desire to secure by letters patent is:

1. A fruit processing machine comprising a frame, an elongated endless conveyor having an upper and a lower flight mounted on said frame, at least one fruit gripping means on said conveyor, fruit orienting means on said conveyor operatively associated with said frame adjacent the upper flight of said conveyor, fruit splitting means on said frame adjacent the lower flight of said conveyor, a fruit pitter on said frame in trailing relationship to said fruit splitter and having operative association with the lower flight of said conveyor, and a fruit discharge means on said frame in trailing relationship to said fruit pitter and having operative association with the lower flight of said conveyor.

2. A fruit processing machine comprising a frame, an elongated endless conveyor having an upper and a lower flight mounted on said frame, a plurality of fruit gripping means secured in spaced relation to said conveyor throughout the entire extent of said conveyor, fruit orienting means on said conveyor including fruit rotating members operatively associated with said fruit gripping means and drive means for said members operatively associated with said frame adjacent the upper flight of said conveyor, fruit splitting means on said frame adjacent the lower flight of said conveyor, a fruit pitter on said frame in trailing relationship to said fruit splitting means and having operative association with the lower flight of said conveyor, and fruit gripper operating means on said frame in trailing relationship to said fruit pitter and having operative association with the lower flight of said conveyor to discharge the fruit.

3. A fruit processing machine comprising a frame, an elongated endless conveyor having an upper and a lower flight mounted on said frame and driven at a continuous uniform rate, a plurality of fruit receiving carriages operatively associated with said frame and secured to said conveyor in spaced relation, fruit gripping means on each carriage, fruit rotating means shiftably secured to each carriage and operatively associated with the gripping means, driving means for said rotating means operatively associated with said frame adjacent the upper flight of said conveyor, a first fruit gripper actuating means operatively associated with the frame along the upper flight of said conveyor and operatively associated with the fruit gripping means to effect a slight clearance between the gripping means and the fruit engaged thereby, fruit splitting means on said frame adjacent the lower flight of said conveyor, a second fruit gripper actuating means operatively associated with the frame adjacent the conveyor between the upper and lower flights of said conveyor and in advance of the fruit splitting means to move the gripping means to closed position on the fruit engaged thereby, a first fruit rotating actuator means operatively associated with the frame and adjacent the fruit splitting means for shifting the fruit rotating means away from the fruit gripping means, a traveling pitter on said frame in trailing relation to said fruit splitting means and having operative association with the lower flight of said conveyor, fruit gripper actuator means on the frame in trailing relationship to said fruit pitter and having operative association with the lower flight of said conveyor to move said fruit gripping means to a discharge position after pitting of the fruit halves, and fruit rotating actuator means operatively associated with the frame adjacent the conveyor between the lower flight and the upper flight of the conveyor for shifting the fruit rotating means toward the fruit gripping means.

4. A fruit processing machine comprising a frame, an elongated endless conveyor having an upper and a lower flight mounted on said frame, a fruit holder support on the frame and secured to said conveyor, fruit gripping holders mounted on the support for movement therewith and relative thereto from an open position to a closed position, fruit orienting means shiftably secured to the support and operatively associated with the holders to move from a position to engage fruit by said holders, fruit orienting drive means operatively associated with said frame adjacent the upper flight of said conveyor, fruit splitting means on said frame adjacent the lower flight of said conveyor, orienting actuator means on the frame and operatively associated with the lower flight of the conveyor and adjacent the fruit splitting means to move the orienting means away from the holders, a fruit pitter on said frame in trailing relation to said fruit splitting means and having operative association with the lower flight of said conveyor, said pitter having a common support and dual pitter blades on said support and operatively associated with the lower flight of the conveyor simultaneously to pit fruit halves.

5. In a fruit processing machine as set forth in claim 4 including fruit orientation inspecting means on the frame and operatively associated with the lower flight of said conveyor in advance of said fruit splitting means, and fruit holder actuator means on the frame adjacent said inspecting means and operatively connected to said inspecting means and said holders to move the holders to open position.

References Cited in the file of this patent

UNITED STATES PATENTS

| 1,139,292 | Jirotka | May 11, 1915 |
| 1,578,525 | Ireland | Mar. 30, 1926 |
| 1,799,571 | Smith | Apr. 7, 1931 |
| 1,807,360 | Wehr | May 26, 1931 |

(Other references on following page)

UNITED STATES PATENTS

| | | |
|---|---|---|
| 1,915,447 | Robbins | June 27, 1933 |
| 1,918,830 | Bem | July 18, 1933 |
| 2,023,660 | Bartlett | Dec. 10, 1935 |
| 2,058,045 | Thompson | Oct. 20, 1936 |
| 2,103,383 | Russell | Dec. 28, 1937 |
| 2,226,664 | Jepson | Dec. 31, 1940 |
| 2,232,210 | Carroll | Feb. 18, 1941 |
| 2,268,696 | Carroll | Jan. 6, 1942 |
| 2,283,615 | Skinner et al. | May 19, 1942 |
| 2,309,321 | Jepson | Jan. 26, 1943 |
| 2,346,912 | Deakin | Apr. 18, 1944 |
| 2,406,311 | Ashlock | Aug. 27, 1946 |
| 2,443,863 | Lindley | June 22, 1948 |
| 2,540,020 | Waters | Jan. 30, 1951 |
| 2,556,122 | Thompson | June 5, 1951 |
| 2,568,947 | Carroll | Sept. 25, 1951 |
| 2,609,913 | Doering et al. | Sept. 9, 1952 |
| 2,687,206 | Carroll | Aug. 24, 1954 |
| 2,705,036 | Fox | Mar. 29, 1955 |
| 2,706,030 | Carroll | Apr. 12, 1955 |
| 2,788,818 | Skog | Apr. 16, 1957 |

FOREIGN PATENTS

| | | |
|---|---|---|
| 154,128 | Australia | June 12, 1952 |